US012283780B1

(12) United States Patent
Baldwin

(10) Patent No.: US 12,283,780 B1
(45) **Date of Patent: *Apr. 22, 2025**

(54) LOCKING ELECTRICAL DEVICE

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,931

(22) Filed: Dec. 13, 2023

Related U.S. Application Data

(63) Continuation of application No. 17/992,511, filed on Nov. 22, 2022, now Pat. No. 11,862,905, which is a continuation of application No. 17/323,929, filed on May 18, 2021, now Pat. No. 11,509,101, which is a continuation of application No. 16/851,105, filed on Apr. 17, 2020, now Pat. No. 11,011,878, which is a continuation-in-part of application No. 16/581,096, filed on Sep. 24, 2019, now Pat. No. 10,916,899, (Continued)

(51) Int. Cl.

| | |
|---|---|
| ***H01R 13/71*** | (2006.01) |
| ***H01R 13/20*** | (2006.01) |
| ***H01R 13/453*** | (2006.01) |
| ***H01R 13/639*** | (2006.01) |
| ***H01R 24/76*** | (2011.01) |
| ***H01R 35/04*** | (2006.01) |
| *H01R 13/703* | (2006.01) |
| *H01R 24/78* | (2011.01) |
| *H01R 25/00* | (2006.01) |
| *H01R 103/00* | (2006.01) |

(52) U.S. Cl.

CPC ............. *H01R 13/71* (2013.01); *H01R 13/20* (2013.01); *H01R 13/4532* (2013.01); *H01R 13/4538* (2013.01); *H01R 13/639* (2013.01); *H01R 13/6397* (2013.01); *H01R 24/76* (2013.01); *H01R 35/04* (2013.01); *H01R 13/703* (2013.01); *H01R 24/78* (2013.01); *H01R 25/006* (2013.01); *H01R 2103/00* (2013.01)

(58) Field of Classification Search

CPC ........ H01R 13/71; H01R 13/20; H01R 13/02; H01R 13/4532; H01R 13/4538; H01R 13/639; H01R 13/6397; H01R 13/703; H01R 24/76; H01R 24/78; H01R 35/04; H01R 25/006; H01R 2103/00

See application file for complete search history.

(56) References Cited

U.S. PATENT DOCUMENTS

| | | | |
|---|---|---|---|
| 1,933,592 | A | 11/1933 | Hubbell, Jr. |
| 2,239,653 | A | 4/1941 | O'Brien |

(Continued)

*Primary Examiner* — Harshad C Patel

(74) *Attorney, Agent, or Firm* — Jeffrey D. Merrill; Kenneth C. Booth; Booth Udall Fuller, PLC

(57) ABSTRACT

An electrical receptacle including a body having a plurality of electrical connections, a device face connected to the body and movable with respect to the body, a plurality of electrical plug contacts positioned behind the device face, and wherein the electrical plug contacts retain an electrical plug prong at a first tension when the device face is in a first position and the electrical plug contacts retain the electrical plug prong at a second tension when the device face is in a second position.

19 Claims, 50 Drawing Sheets

Related U.S. Application Data which is a continuation of application No. 15/893,663, filed on Feb. 11, 2018, now Pat. No. 10,424,871, which is a continuation of application No. 15/250,919, filed on Aug. 30, 2016, now Pat. No. 9,905,969, which is a continuation of application No. 14/694,377, filed on Apr. 23, 2015, now Pat. No. 9,450,365.

(60) Provisional application No. 62/104,832, filed on Jan. 18, 2015, provisional application No. 62/047,022, filed on Sep. 7, 2014, provisional application No. 61/991,590, filed on May 11, 2014, provisional application No. 61/988,256, filed on May 4, 2014, provisional application No. 61/987,400, filed on May 1, 2014, provisional application No. 61/987,409, filed on May 1, 2014, provisional application No. 61/987,403, filed on May 1, 2014, provisional application No. 61/984,261, filed on Apr. 25, 2014, provisional application No. 61/984,042, filed on Apr. 25, 2014.

(56) References Cited

U.S. PATENT DOCUMENTS 2,524,250 A 10/1950 Bierce
3,478,297 A 11/1969 Gimpel
4,037,901 A * 7/1977 Kaszuba ............ H01R 13/4532 439/138
4,600,258 A 7/1986 Hu
4,659,161 A 4/1987 Holcomb
4,722,693 A 2/1988 Rose
4,909,749 A 3/1990 Long
5,277,602 A 1/1994 Yi
5,350,310 A 9/1994 Chen
5,484,299 A 1/1996 Schlessinger
5,551,884 A 9/1996 Burkhart, Sr.
5,551,893 A 9/1996 Johnson
5,791,931 A 8/1998 Burkhart, Sr.
5,934,931 A * 8/1999 Castaldo .............. H01R 13/595 439/467
5,967,815 A 10/1999 Schlessinger
5,975,941 A * 11/1999 Castaldo .............. H01R 13/502 439/469
5,984,700 A 11/1999 Chang
6,056,588 A * 5/2000 Castaldo .............. H01R 13/595 439/469
6,193,539 B1 2/2001 Chang
6,196,851 B1 3/2001 Gerard
6,224,401 B1 5/2001 Yu
6,332,794 B1 * 12/2001 Tzeng Jeng ........... H01R 35/04 439/13
6,461,176 B1 10/2002 Haas
6,537,089 B1 3/2003 Montague
6,695,639 B2 * 2/2004 Castaldo ................ H01R 24/28 439/465
6,805,578 B2 * 10/2004 Chiou ................ H01R 13/5812 439/469
6,893,275 B2 5/2005 Ng
6,984,141 B1 1/2006 Beski, Sr.
7,041,918 B1 5/2006 Wu
7,101,218 B2 * 9/2006 Castaldo ............ H01R 13/5829 439/467
7,121,834 B2 10/2006 Gerard
7,125,256 B2 10/2006 Gerard
7,238,028 B2 * 7/2007 Gerard ................... H01R 31/02 439/954
7,381,894 B1 6/2008 Shotey
7,753,682 B2 * 7/2010 Gerard ................. H01R 13/652 439/13
7,794,283 B2 9/2010 Wang
7,902,458 B2 * 3/2011 Eshelman ................ H02G 3/14 174/67
7,931,484 B2 4/2011 Chen
7,967,620 B1 6/2011 Baldwin
8,007,283 B2 8/2011 Gerard
8,210,853 B2 7/2012 Gerard
8,344,251 B2 1/2013 Eshelman
8,475,175 B2 7/2013 Gerard
8,840,418 B2 9/2014 Chien
9,450,365 B1 * 9/2016 Baldwin ................ H01R 24/76
9,502,808 B1 11/2016 Baldwin
9,728,908 B1 8/2017 Baldwin
9,769,620 B1 9/2017 Khider
9,905,969 B1 * 2/2018 Baldwin ................ H01R 24/76
10,170,872 B1 1/2019 Baldwin
10,424,871 B1 * 9/2019 Baldwin ................ H01R 13/20
10,756,495 B1 8/2020 Baldwin
10,916,899 B1 * 2/2021 Baldwin ............ H01R 13/4538
11,011,878 B1 * 5/2021 Baldwin ............ H01R 13/4538
11,011,896 B2 5/2021 Gibson
2002/0097546 A1 7/2002 Weinberger
2014/0106601 A1 * 4/2014 Matsumoto ............ H01R 13/62 439/352
2014/0259651 A1 * 9/2014 Fletcher ................. H01R 13/71 29/825
2015/0226925 A1 * 8/2015 Lambourn ........... G02B 6/3817 385/75

* cited by examiner

LOCKING ELECTRICAL DEVICE

CROSS-REFERENCE TO RELATED APPLICATIONS

This application is a continuation of U.S. patent application Ser. No. 17/992,511, filed on Nov. 22, 2022, which is a continuation of U.S. patent application Ser. No. 17/323,929, filed on May 18, 2021, which issued as U.S. Pat. No. 11,509,101 on Nov. 22, 2022, and titled LOCKING ELECTRICAL DEVICE to Baldwin, which application is a continuation of U.S. patent application Ser. No. 16/851,105, filed on Apr. 17, 2020, which issued as U.S. Pat. No. 11,011,878 on May 18, 2021, and titled AN ELECTRICAL RECEPTACLE WITH PRONG RECEPTACLES WITHIN A FRONT PLATE THICKNESS to Baldwin, which is a continuation-in-part of U.S. patent application Ser. No. 16/581,096, filed on Sep. 24, 2019, which issued as U.S. Pat. No. 10,916,899 on Feb. 9, 2021, and titled LOCKING ELECTRICAL DEVICE to Baldwin et al., which is a continuation of U.S. patent application Ser. No. 15,893,663 filed on Feb. 11, 2018, which issued as U.S. Pat. No. 10,424,871 on Sep. 24, 2019, and titled LOCKING ELECTRICAL DEVICE to Baldwin et al., which is a continuation of U.S. patent application Ser. No. 15/250,919, filed on Aug. 30, 2016, which issued as U.S. Pat. No. 9,905,969 on Feb. 27, 2018, and titled LOCKING ELECTRICAL DEVICE to Baldwin et al., which is a continuation of U.S. patent application Ser. No. 14/694,377, filed on Apr. 23, 2015, which issued as U.S. Pat. No. 9,450,365 on Sep. 20, 2016, and titled LOCKING ELECTRICAL DEVICE to Baldwin et al., which claims priority to Provisional U.S. Patent Application No. 61/987,400, filed on May 1, 2014 and titled LINEAR LOCKABLE ELECTRICAL DEVICE to Baldwin et al., and claims priority to Provisional U.S. Patent Application No. 61/987,403, filed on May 1, 2014 and titled INWARD LOCKABLE ELECTRICAL DEVICE to Baldwin et al., and claims priority to Provisional U.S. Patent Application No. 61/987,409, filed on May 1, 2014 and titled LOCKABLE ELECTRICAL DEVICE WITH BUTTON RELEASE to Baldwin et al., and claims priority to Provisional U.S. Patent Application No. 61/984,042, filed on Apr. 25, 2014 and titled LOCKABLE ELECTRICAL DEVICE to Baldwin et al., and claims priority to Provisional U.S. Patent Application No. 61/984,261, filed on Apr. 25, 2014 and titled WEATHERPROOF SELF-SECURING ELECTRICAL RECEPTACLE to Baldwin et al., and claims priority to Provisional U.S. Patent Application No. 61/988,256, filed on May 4, 2014 and titled CAM ENGAGEMENT ROTATABLE DEVICE to Baldwin et al., and claims priority to Provisional U.S. Patent Application No. 61/991,590, filed on May 11, 2014 and titled LOCKING ROTATABLE DEVICE AND CORD LOCK to Baldwin et al., and claims priority to Provisional U.S. Patent Application No. 62/047,022, filed on Sep. 7, 2014 and titled WATER RESISTANT CORD END to Baldwin et al., and claims priority to Provisional U.S. Patent Application No. 62/104,832, filed on Jan. 18, 2015 and titled ELECTRICALLY ISOLATED RECEPTACLE to Baldwin et al., all of the disclosures of which are hereby incorporated herein by reference.

BACKGROUND

Electrical devices and receptacles are well known to provide electrical current to a number of devices within a building once connected to the electrical receptacle. Some features of electrical devices include tamper resistant shutters to prevent inappropriate access to the device and to make sure the electrical device is as safe as possible. Electrical cords or extension cords are well known to provide electrical current to remote locations.

SUMMARY

Aspects of this disclosure relate to an electrical receptacle and an electrical cord. The electrical receptacle including a body having a plurality of electrical connections, a device face connected to the body and movable with respect to the body, a plurality of electrical plug contacts positioned behind the device face, and wherein the electrical plug contacts retain an electrical plug prong at a first tension when the device face is in a first position and the electrical plug contacts retain the electrical plug prong at a second tension when the device face is in a second position.

In an aspect, a plurality of electrical receptacle apertures may be located on the device face. The device face movement may be rotational movement. The electrical plug may not be removed when the electrical receptacle is moved to the second position. The electrical plug prong may be positioned within at least one aperture in the electrical plug when the device face is moved to the second position. A removal force between 20 to 50 pounds may be required to remove the electrical plug from the electrical receptacle when the device face is in the second position. A removal force between 32 and 40 pounds may be required to remove the electrical plug from the receptacle when the device face is in a second position.

A tab may compress the electrical plug contact in the second position. The device face may further include a rubberized surface. The electrical receptacle may be positioned on an extension cord. A power strip may include a plurality of electrical receptacles on a power strip or a power tap. A release button may permit moving the device face from the second position. The movement from the first position to the second position may pull the electrical plug towards the device face. The device face may further include a compliant rubber surface which is a waterproof seal between an electrical plug face and the device face.

In another aspect, an electrical receptacle includes a body having a plurality of electrical connections, a device face connected to the body and movable with respect to the body, a plurality of electrical plug contacts positioned behind the device face, at least one projection, and wherein the at least one projection interacts with an electrical plug prong when inserted into the device face.

In an implementation, the at least one projection may be positioned within an aperture in the electrical plug prong when the device face is rotated. The at least one projection may move axially away from the device face. The axial movement of the at least one projection may pull the electrical plug towards the device face. The electrical plug prong may be removable with less force in an unlocked position than in a locked position.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DETAILED DESCRIPTION

Figure 1:
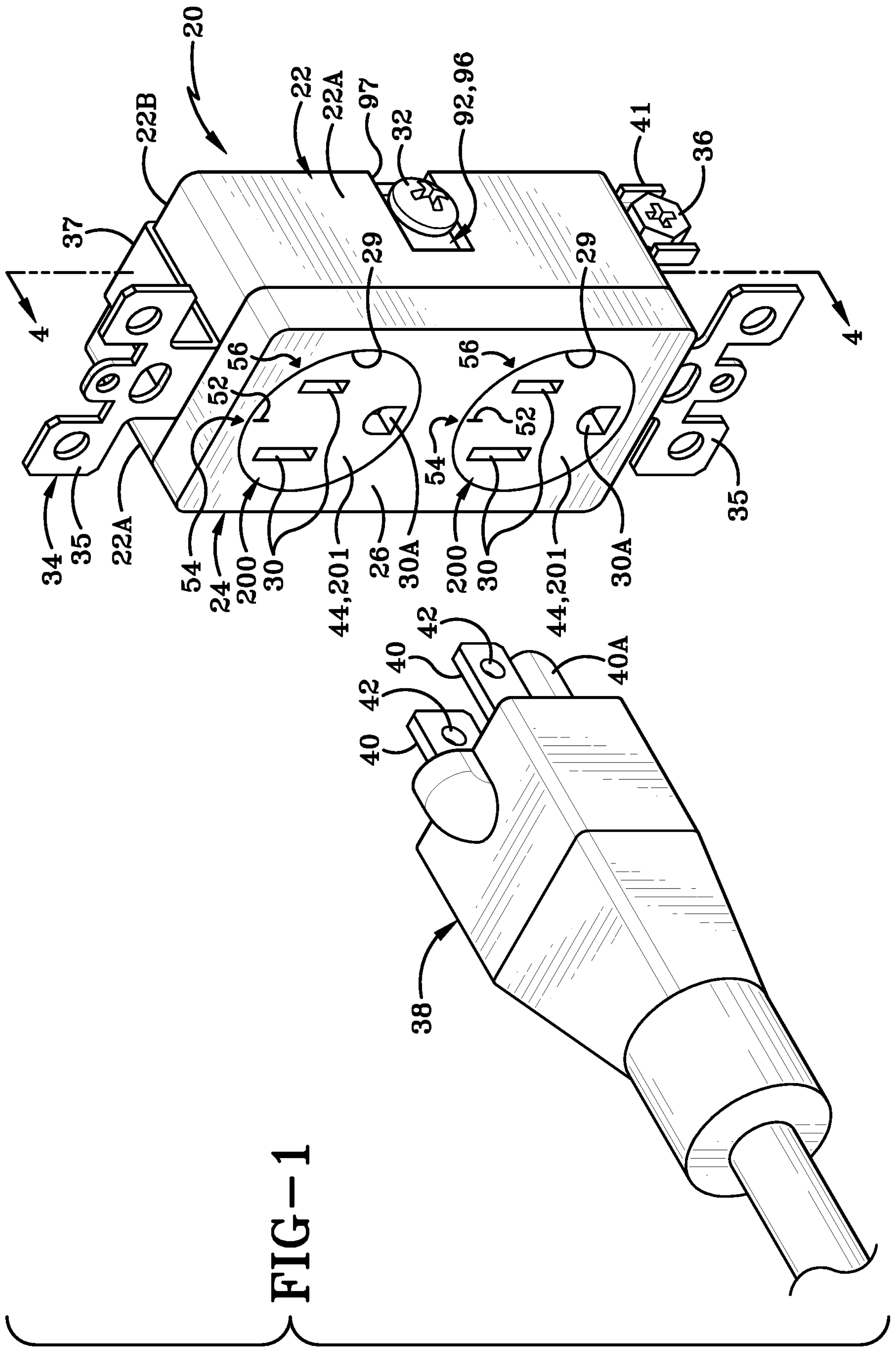
FIG. 1 is a perspective view of an electrical receptacle with a locking feature.

This disclosure, its aspects and implementations, are not limited to the specific components or assembly procedures disclosed herein. Many additional components and assembly procedures known in the art consistent with the intended operation and assembly procedures for an electrical receptacle or electrical cord will become apparent for use with implementations of an electrical receptacle or electrical cord from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical receptacle or electrical cord. In various descriptions, electrical receptacle or electrical cord is utilized, but a person of skill in the art will immediately appreciate that the description will apply equally to power taps, surge protectors, power strips, cord reels, extension cords, cord end replacements and the like which may utilize components similar to the electrical receptacle or electrical cord.

FIGS. 1-10 illustrate various views of electrical receptacle 20 having a rear body 22 with sidewalls 22A and back wall 22B. A front body 24 which may be a separate piece from rear body 22 and they may be connected together while front body 24 includes a front surface 26 having at least one aperture 29 for receiving an electrical device 200. Electrical device 200 may include a device face 44 and include a plurality of openings 30 and ground prong opening(s) 30A and a chamber 211. Electrical receptacle 20 may also include electrical connection screws 32, yoke 34, and grounding screw 36 as is commonly known in the electrical receptacle art. Grounding screw 36 may be positioned on a ground wire connection tab 41 having a hole 43, while connection screws 32 may be positioned in apertures 97 in sidewalls 22A of rear body 22 for accessing receiving arms 96 of connectors 92 while in rear body chamber 242. Yoke may include mounting flanges 35 on each end with a vertical portion 37 having a hole 37 therein which is positioned to mount the yoke to rear body 22 at a hole (not shown) in the rear body back wall 22B.

Referring to FIG. 1, an electrical plug 38 is shown separated from electrical receptacle 20. Electrical plug 38 may include plug blades 40 and ground prong 40A extending therefrom and having apertures 42 in the plug blades. While a 3 prong electrical plug and plug blades is shown, it is within the spirit and scope of the present disclosure to incorporate a two prong electrical plug or any other suitable numbers of prongs.

Electrical device 200 may include a pointer line 52 on front surface 44, while front surface 26 may include a first arrow 54 and a second arrow 56. In the unlocked position, electrical device pointer line 52 is aligned with first arrow 54. In the locked position, electrical device pointer line 52 is aligned with second arrow 56.

Figure 2A:
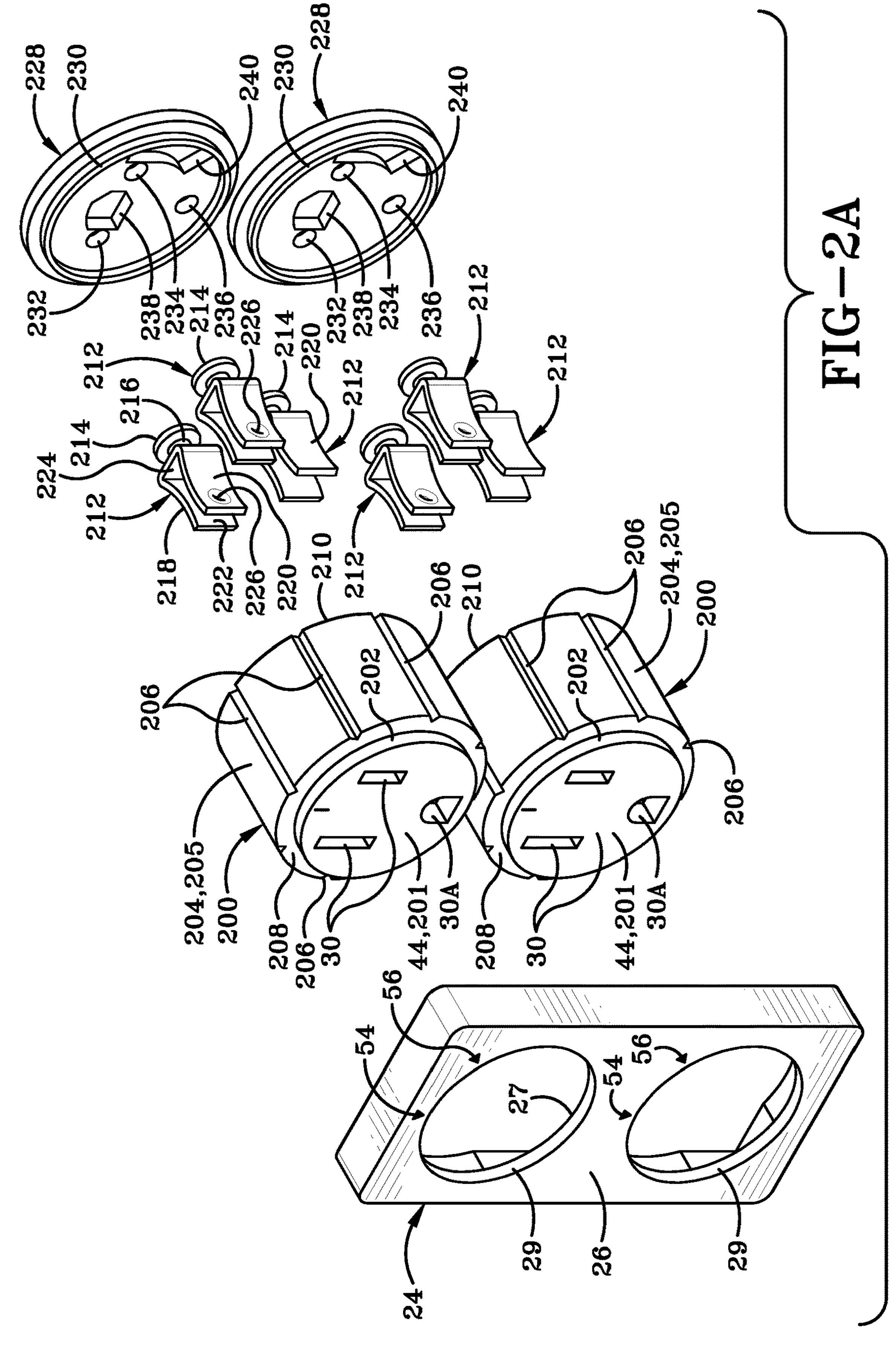
FIG. 2A is a perspective view of some internal components of the electrical receptacle.

FIG. 2A illustrates devices 200 having a face 201, a recessed portion 202, an outer surface 205 with a rounded portion 204 and notches 206. Notches 206 preferably extend from a front end 208 to a rear end 210. Electrical contact prongs 212 may each include a mounting portion 214 and a shaft 216. A first arm 218 and a second arm 220 together with a wall 224 form a receiving region 222 for receiving electrical plug blades 40 or ground prong 40A as appropriate. Still further, electrical contact prongs for electrical plug blades 40 may also include projections 226 extending inward from either first arm 218 or second arm 220. In one implementation, electrical contact prong arms may be curved inward to assist with retaining the electrical plug blades therein. In another implementation, the electrical plug 38 may be removed after a specified amount of force, such as 50 pounds of pulling force overcoming the projections 226 and thereby permitting the electrical plug to be removed without inadvertently dislodging the electrical receptacle. In yet another implementation, the electrical plug may only be removed when the projections 226 are disengaged from blade apertures 90. Specifically, the electrical plug is removable from the electrical device with less than 15 pounds of removal force in the unlocked position and in one implementation between 3 to 15 pounds of force removes the plug as identified in UL498. In another implementation, the removal force in the unlocked position is between 0 and 30 pounds of removal force. A person of ordinary skill in the art will immediately appreciate that the retention force is a function of the frictional engagement between the electrical contact prong arms and/or design of projections 226, both of which may be designed to provide any required plug retention force.

A cap 228 may include a ring 230 and a first hole 232 to receive a first electrical contact prong, a second hole 234 to receive a second electrical contact prong, and a third hole 236 for receiving a third electrical contact prong. An aperture 238 and a slot 240 may also be positioned in cap 228 and are arranged to receive shafts 248 and 250 as will be described in greater detail below.

Figure 2B:
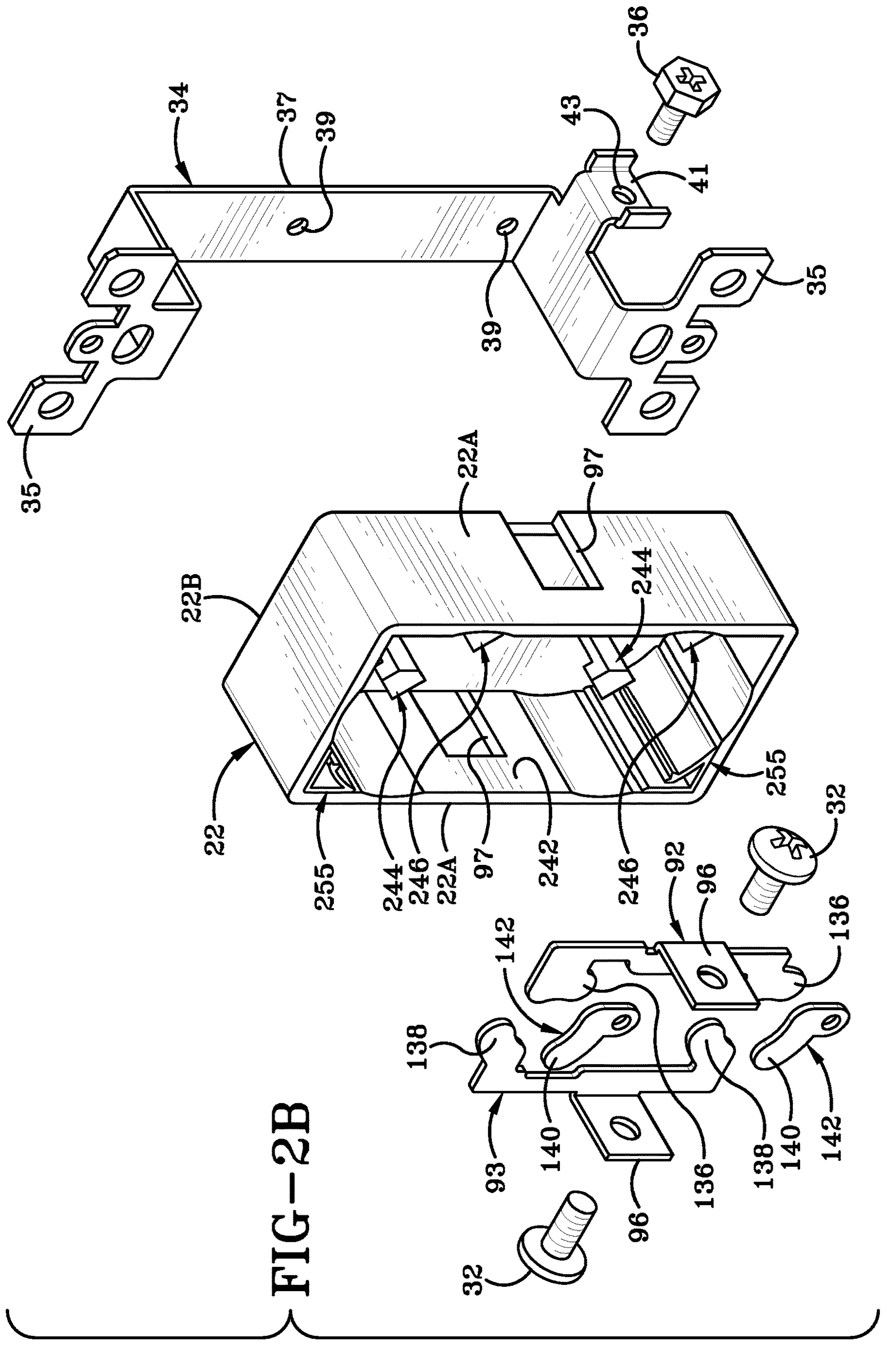
FIG. 2B is a perspective view of some internal components of the electrical receptacle.
Figure 3:
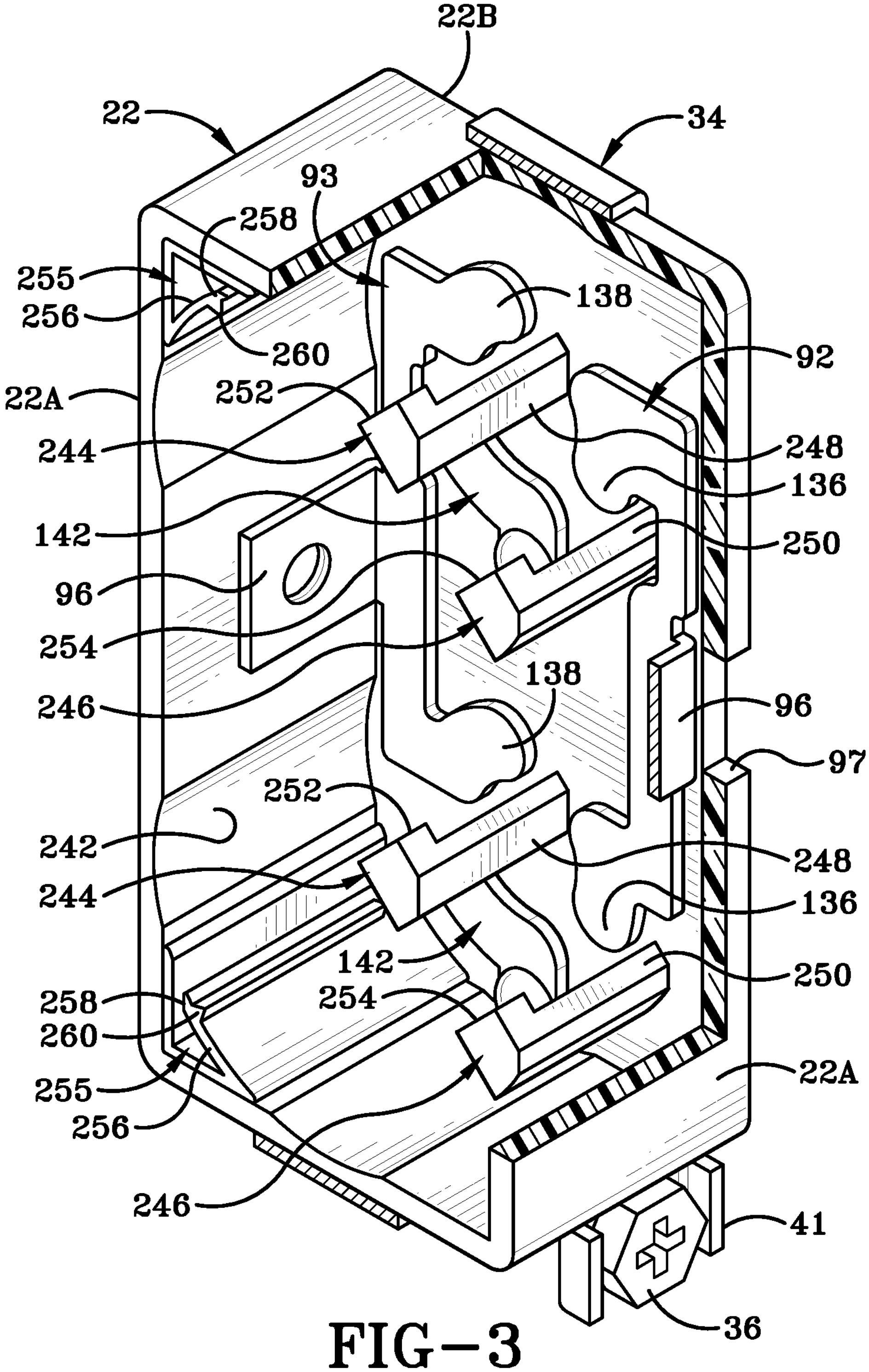
FIG. 3 is a perspective view of the body of the electrical receptacle with a portion of the sidewall removed.

FIGS. 2B and 3 illustrate rear body 22 and various components removed from chamber 242. Chamber 242 includes tabs 244 and 246 each having an appropriate shaft 248 or 250. Each of tabs 244 and 246 also includes a face 252 or 254 which are used to compress electrical contact prongs 212 as will be discussed in greater detail below. A rotation tab 255 may be positioned within chamber 242 or may be formed as part of rear body 22 and includes a pivotable arm 256 having an end 258 with a protrusion 260. Protrusion 260 moves with pivotable arm 256 to provide tactile feedback to the user when rotating the electrical device 200. Specifically, protrusion 260 selectively fits within each notch 206 as the electrical device is rotated and helps to secure the electrical device in the current position by providing additional frictional engagement due to the protrusion 260 and notch 206 interaction. Preferably, one of notches 206 is aligned so that protrusion 260 fits therein when the electrical device is rotated to the locked position.

Electrical receptacle 20 includes connectors 92 and 93 which include contactor ends 136 which are arranged to contact mounting portion 214 of electrical contact prongs 212, while contactor ends 138 are arranged to contact mounting portions 214 of different electrical contact prong mounting portions. Ground contactor ends 140 connect still other electrical contact prongs 212 to grounding contactor 142.

Figure 4:
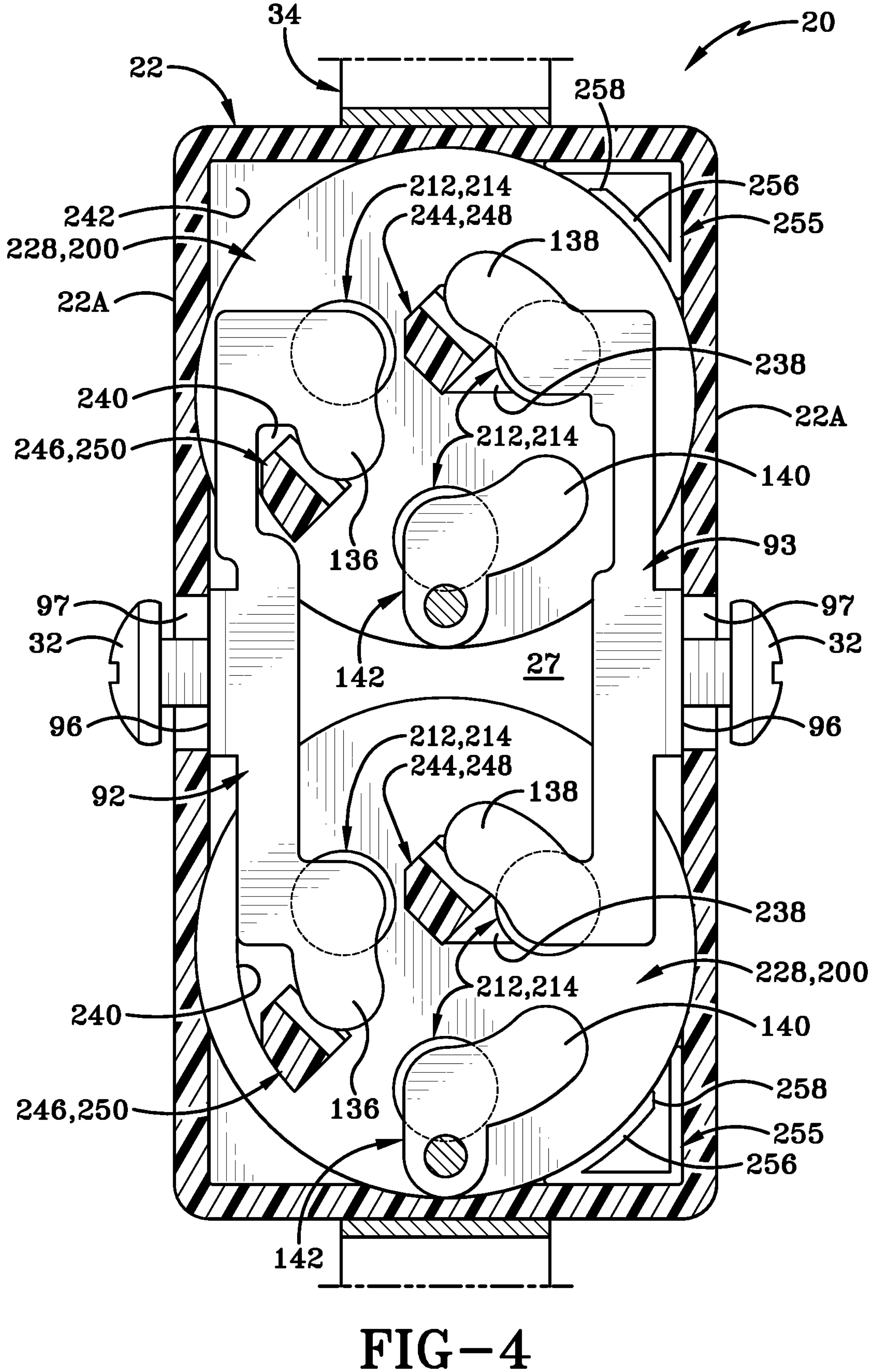
FIG. 4 is a sectional view taken generally about line 4-4 in FIG. 1.

FIG. 4 illustrates the electrical contactors in electrical communication with electrical contact prongs 212 in the unlocked position and the electrical contact prongs uncompressed. As can be seen, the electrical contact prongs 212 remain in contact with connectors 92, 93 and 142 in the unlocked position and the locked position as shown in FIG. 10.

Figure 5:
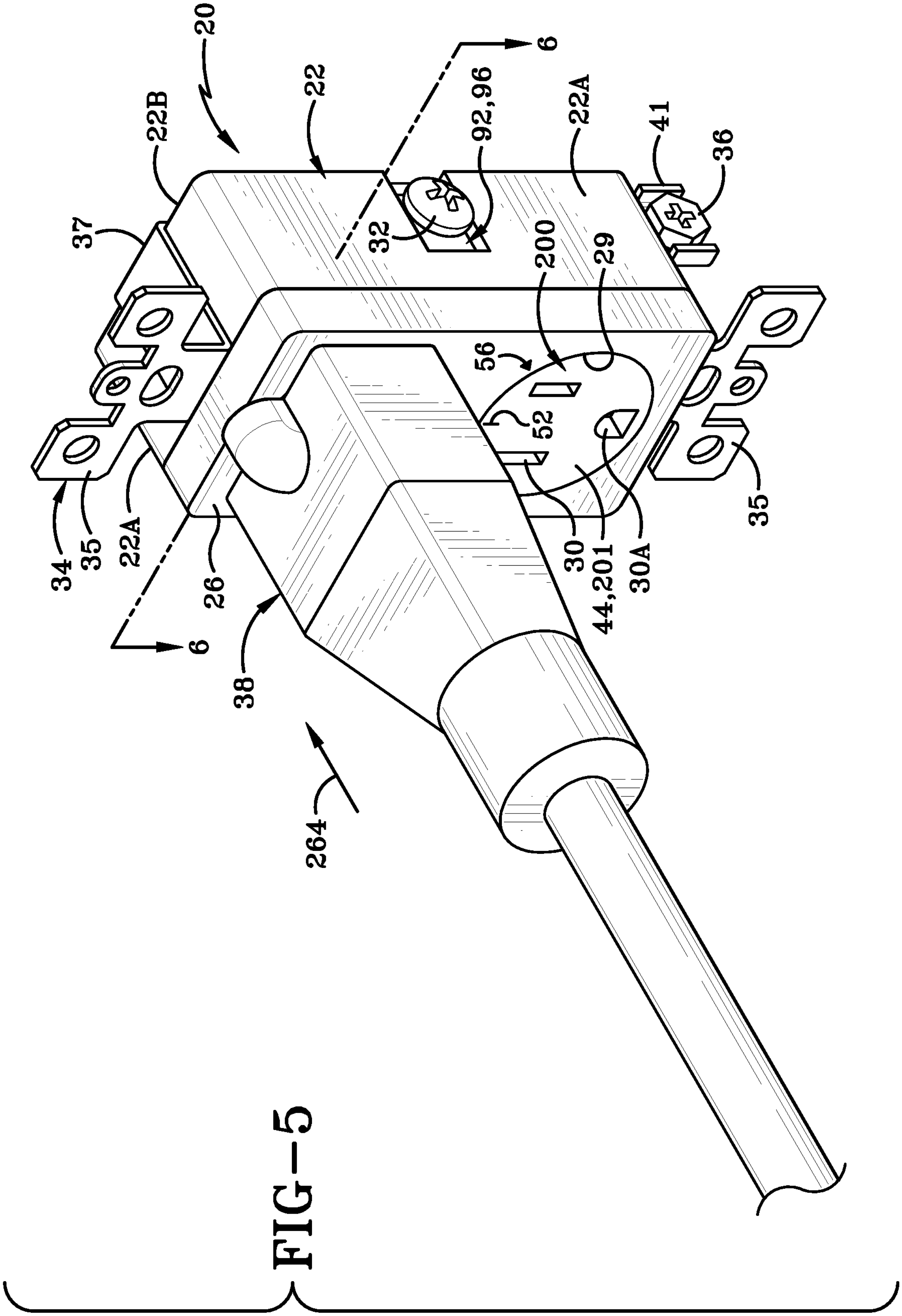
FIG. 5 is a perspective view of the electrical receptacle with an electrical plug inserted.
Figure 6:
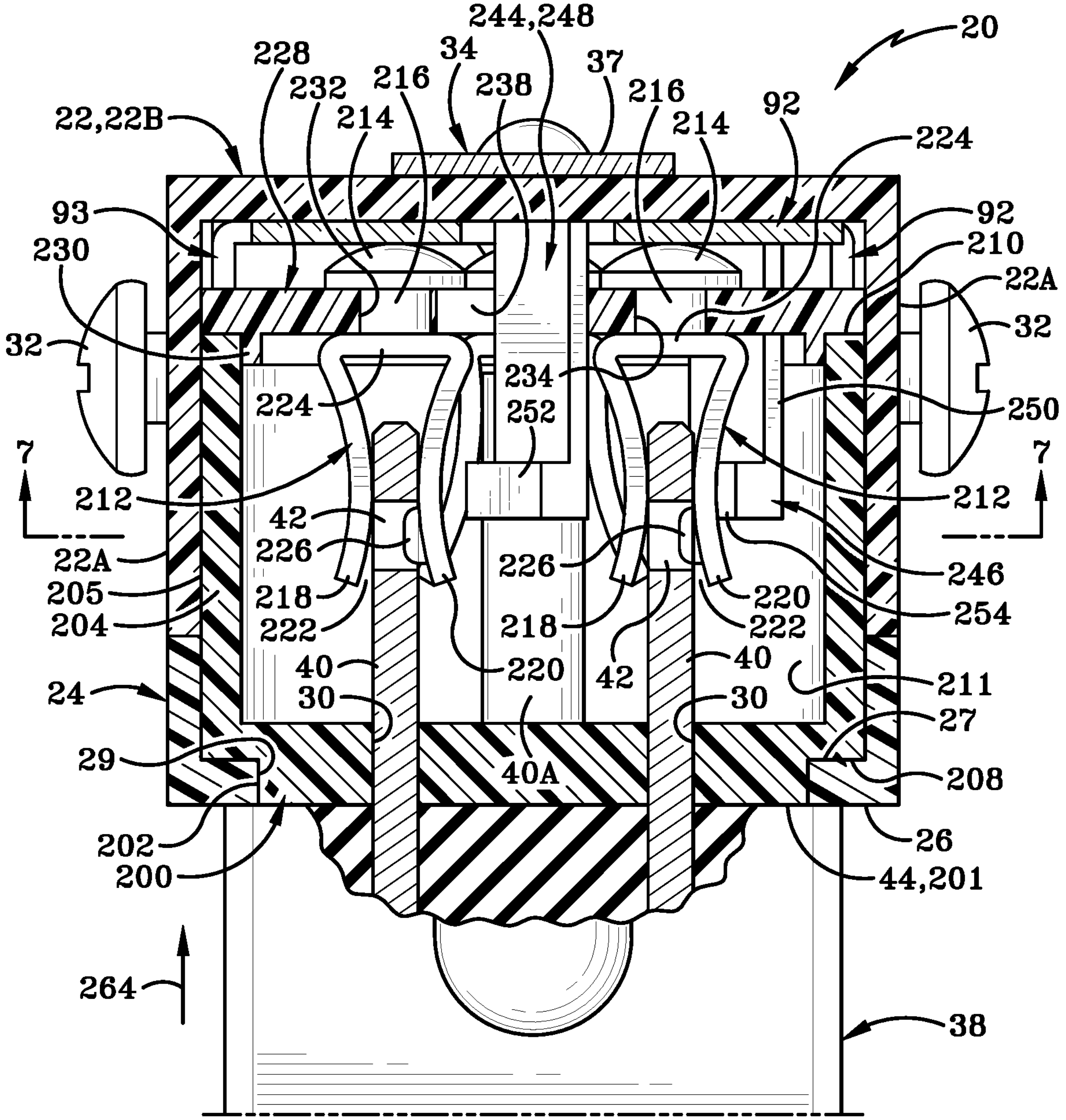
FIG. 6 is a sectional view taken generally about line 6-6 in FIG. 5.
Figure 7:
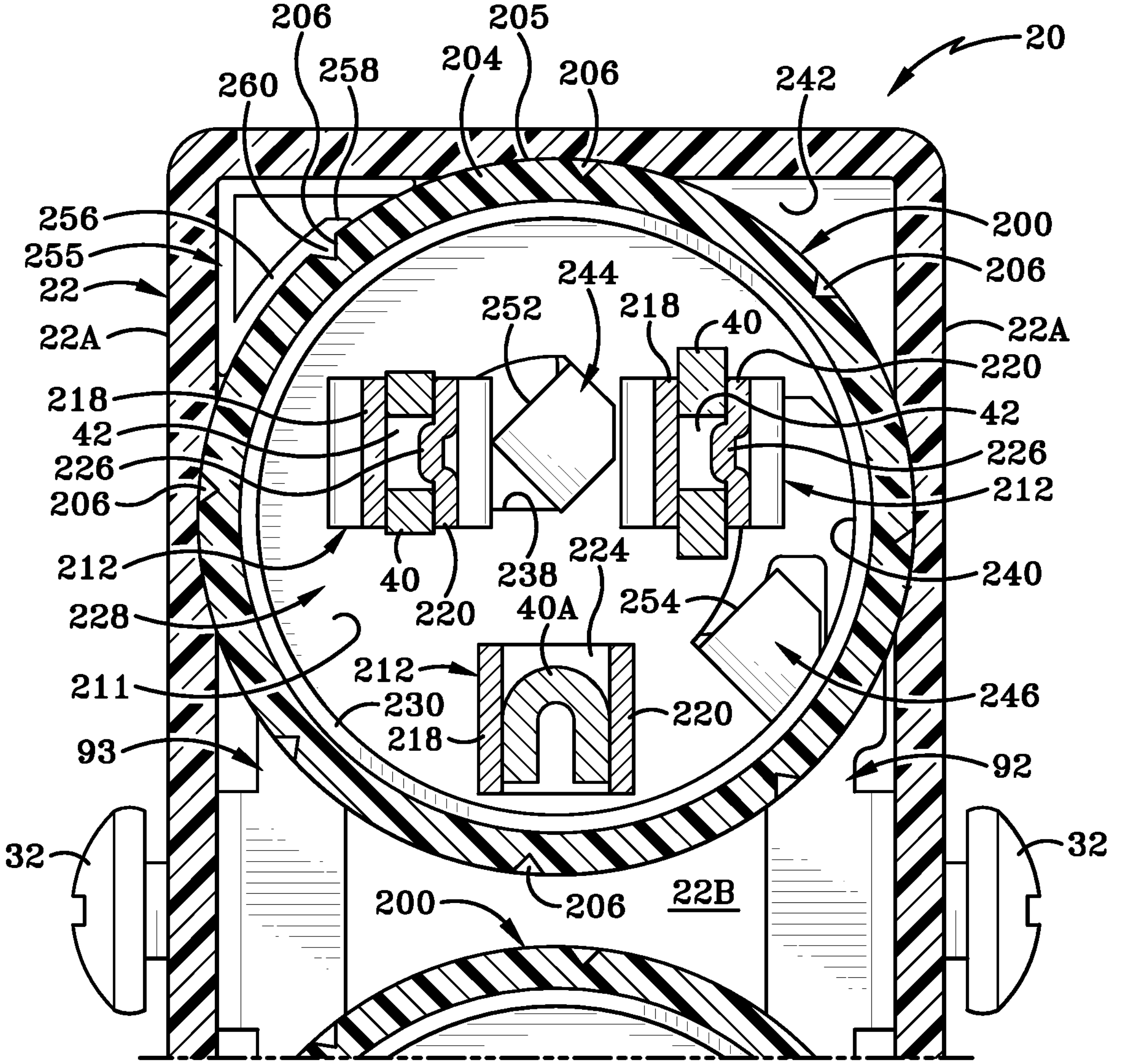
FIG. 7 is a sectional view taken generally about line 7-7 in FIG. 6.

FIG. 5-7 illustrate electrical plug 38 inserted in the direction associated with arrows 264 into electrical receptacle 20 through receptacle openings 30 and ground prong opening 30A. As can be seen, electrical plug blades 40 are positioned within electrical contact prongs 212 and specifically within retaining regions 222. Projections 226 may be positioned at least partially within plug blade apertures 40 but still permit removal in this position due to the flexibility of first arm 218 and second arm 220.

Electrical continuity is achieved by the interaction between electrical contact prongs 212 interaction with connectors 92, 93, and 142 and screws 32. This electrical continuity is then conveyed through electrical contact prongs 212 to the electrical plug prongs 40 therein. While this and other embodiments illustrate the use of a side-wired receptacle, a person of skill in the art will immediately appreciate that a back wired, side wired, hard wired, or any other suitable connection method to the structural wiring system may be utilized without departing from the spirit and scope of the present disclosure.

Figure 8:
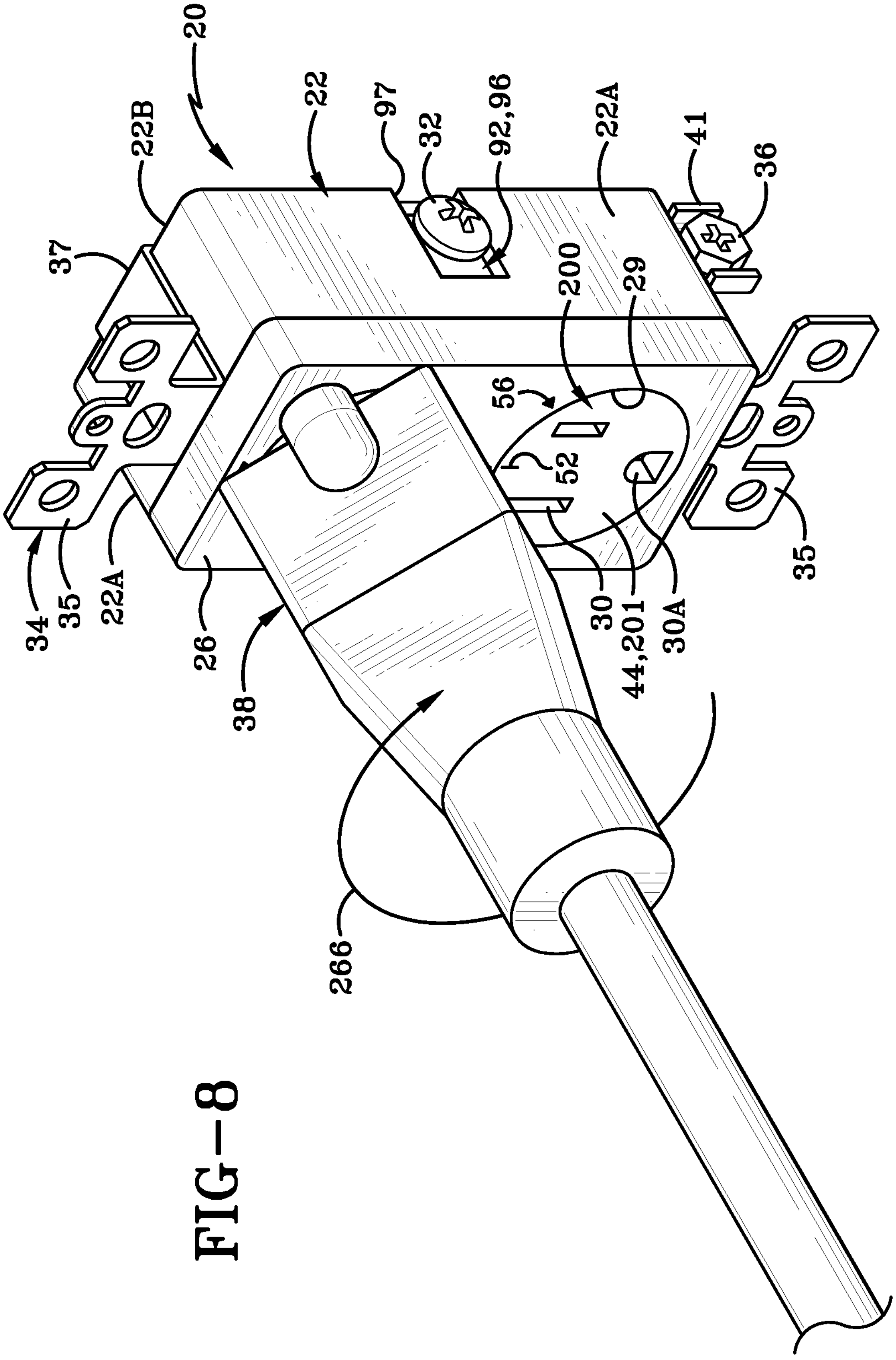
FIG. 8 is a perspective view of the electrical receptacle with an electrical plug inserted and rotated to a locked position.
Figure 9:
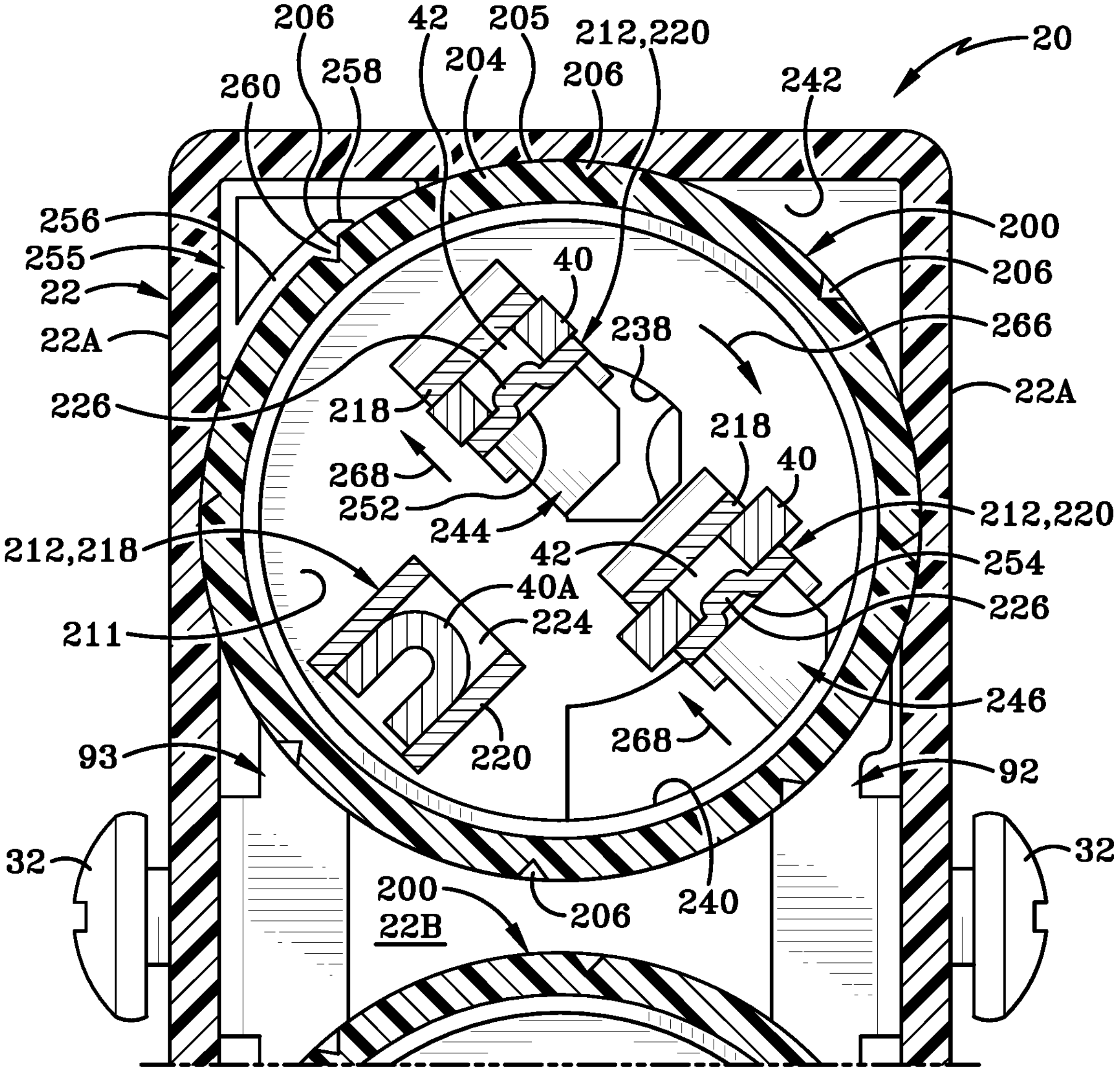
FIG. 9 is a rear view of the electrical receptacle front body from FIG. 8.
Figure 10:
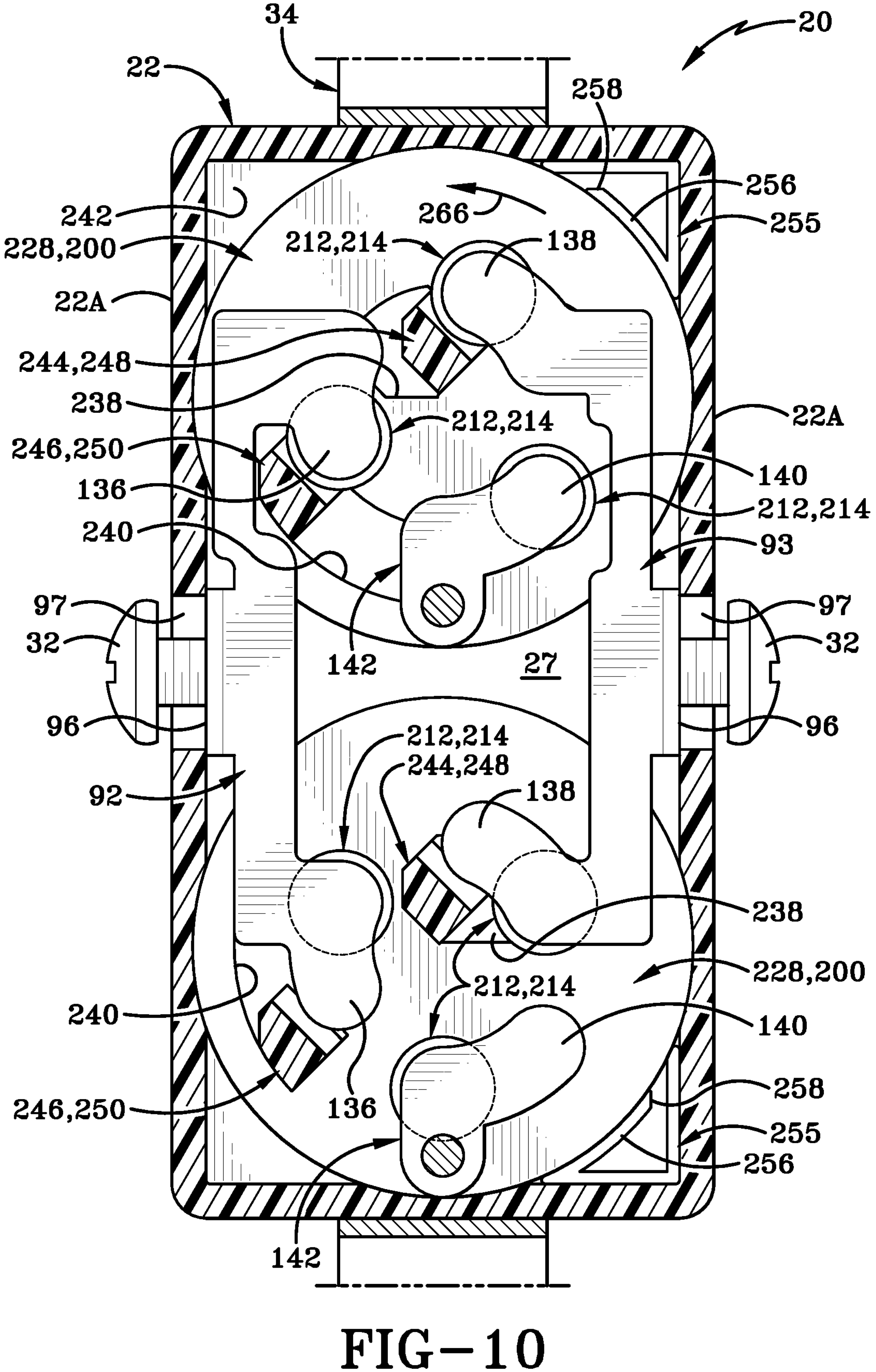
FIG. 10 is a front view of the rear body of the electrical receptacle from FIG. 8.

FIGS. 8-10 illustrate various views of the electrical receptacle rotated in the direction associated with arrow 266 to the locked position. In this position, rotation tabs 255 are positioned with pivot arm 256 and protrusion 260 positioned within notch 206 to help prevent the electrical device 200 from rotating out of the locked position. Further, the rotation in the direction associated with arrows 266 orients electrical contact prongs 212 into a position in contact with faces 252 and 254 respectively. This rotation thereby imparts a respective force in the direction associated with arrow 268 which compresses electrical contact prongs 212 and particularly projections 226 into plug blade apertures 42. In this manner, removal of the electrical plug 38 is more difficult because the additional frictional engagement increases the retention force to a desired amount, including but not limited to, force sufficient to completely prevent removal. Nevertheless, certain electrical code restrictions may require that the retention force is limited to a certain threshold before the electrical plug must be removable.

As previously discussed, the electrical receptacle remains in electrical continuity throughout the full rotation between locked and unlocked positions. Still further, the faces of tabs 244 and 246 assist, in addition to other features disclosed, to limit the rotation of the electrical devices.

Figure 11:
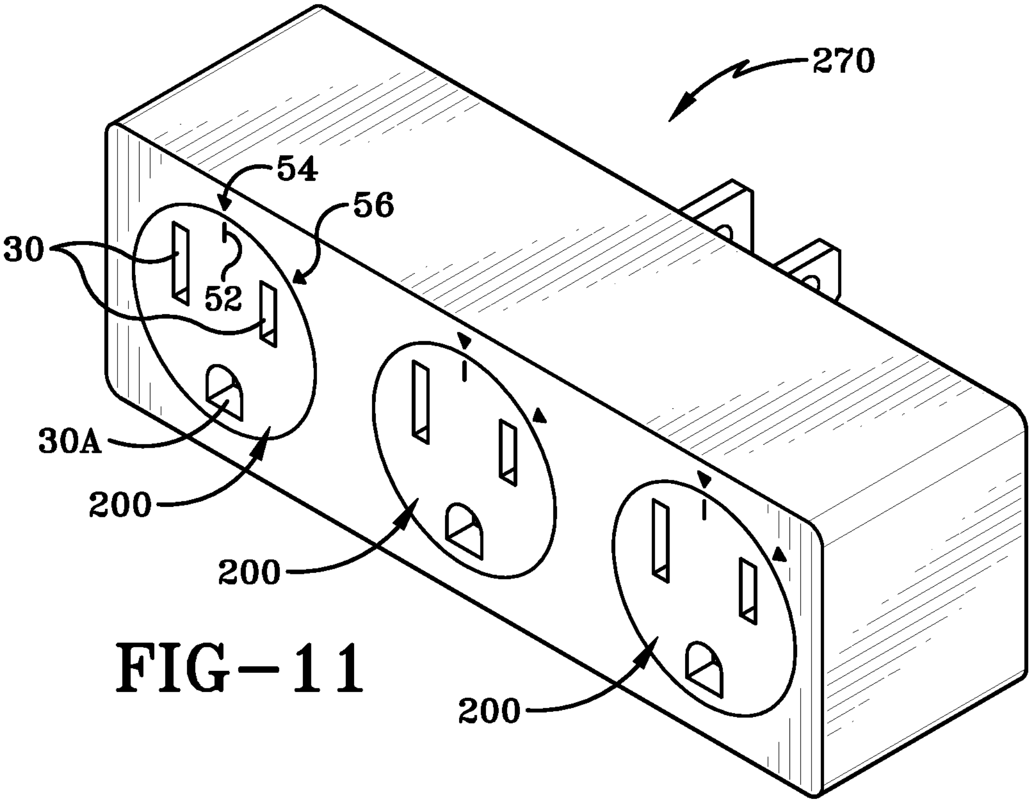
FIG. 11 is a perspective view of a power tap including three device faces.

FIG. 11 illustrates an electrical plug tap 270 having a plurality of electrical devices 200 therein. The electrical plug tap 270 may include any number of electrical devices 200 and the figures illustrating three electrical devices 200 should not be viewed as in any way limiting. Functionally, each electrical device 200 operates in a manner similar to the previously disclosed embodiments and therefore will not be repeated.

Figure 12:
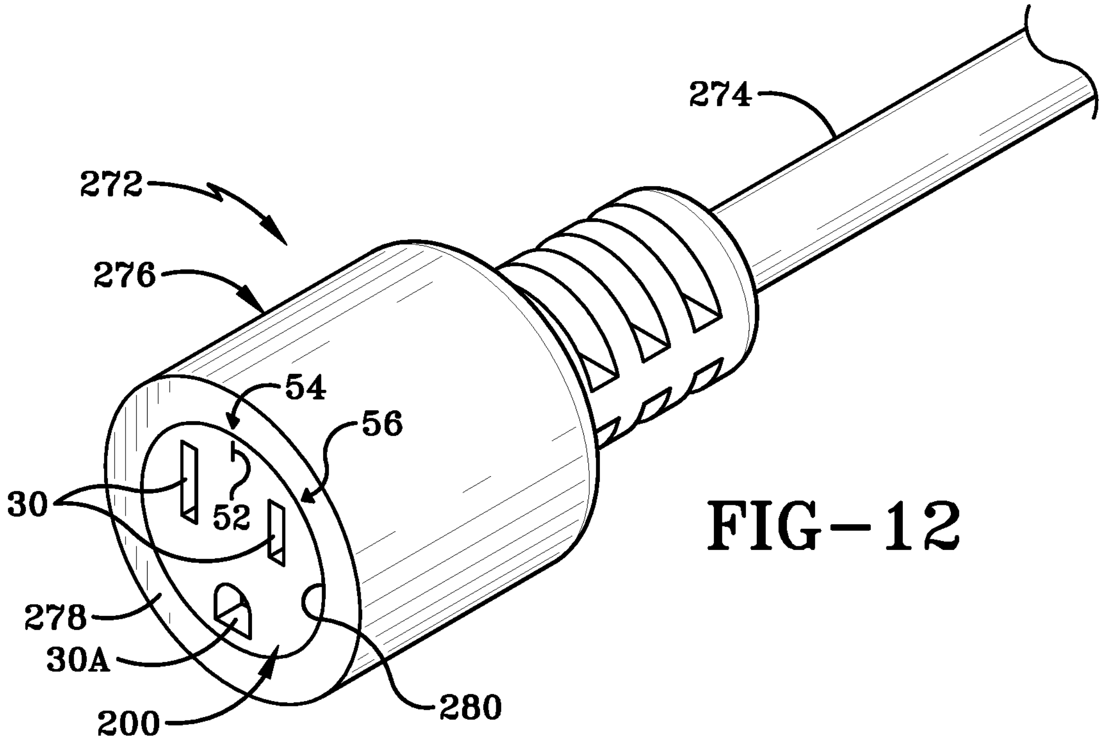
FIG. 12 is an electrical cord with a cord end having a single device face.

FIG. 12 illustrates an electrical cord 272 having a cord 274 connected to a cord end 276. Cord end 276 includes a cord end face 278 with an end chamber 280 having an electrical device 200 therein. Once again, electrical device 200 functions similar to previously described embodiments but is instead implemented in an electrical or extension cord to prevent an electrical plug from being inadvertently removed when the electrical device is in the locked position.

Figure 13:
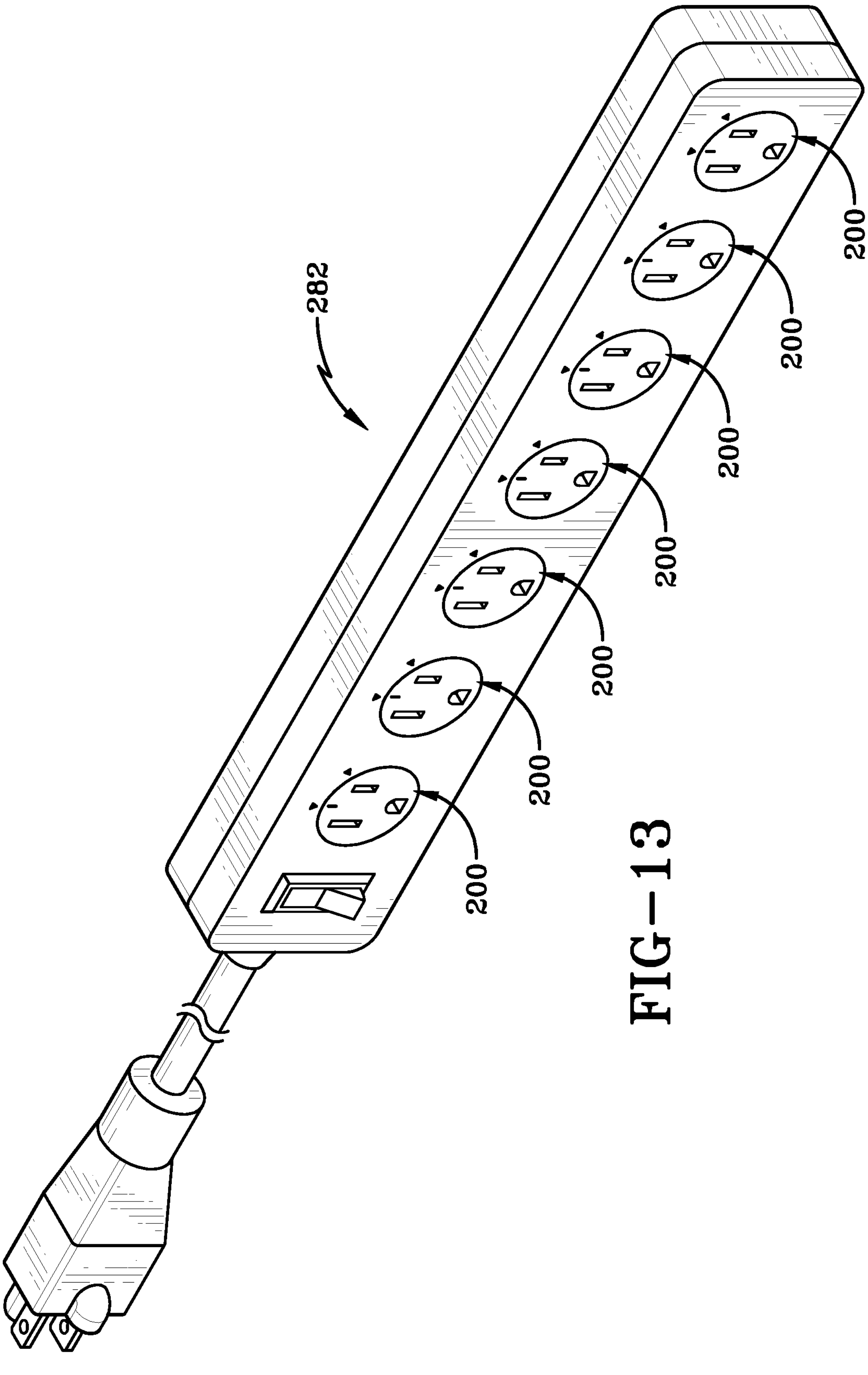
FIG. 13 is a perspective view of a power tap having a plurality of device faces.

FIG. 13 illustrates a power strip or surge protector 282 having a plurality of electrical devices 200. Similar to power tap 270, any suitable number of electrical devices 200 may be incorporated and the function of the electrical devices 200 is similar to previously disclosed embodiments.

Figure 14:
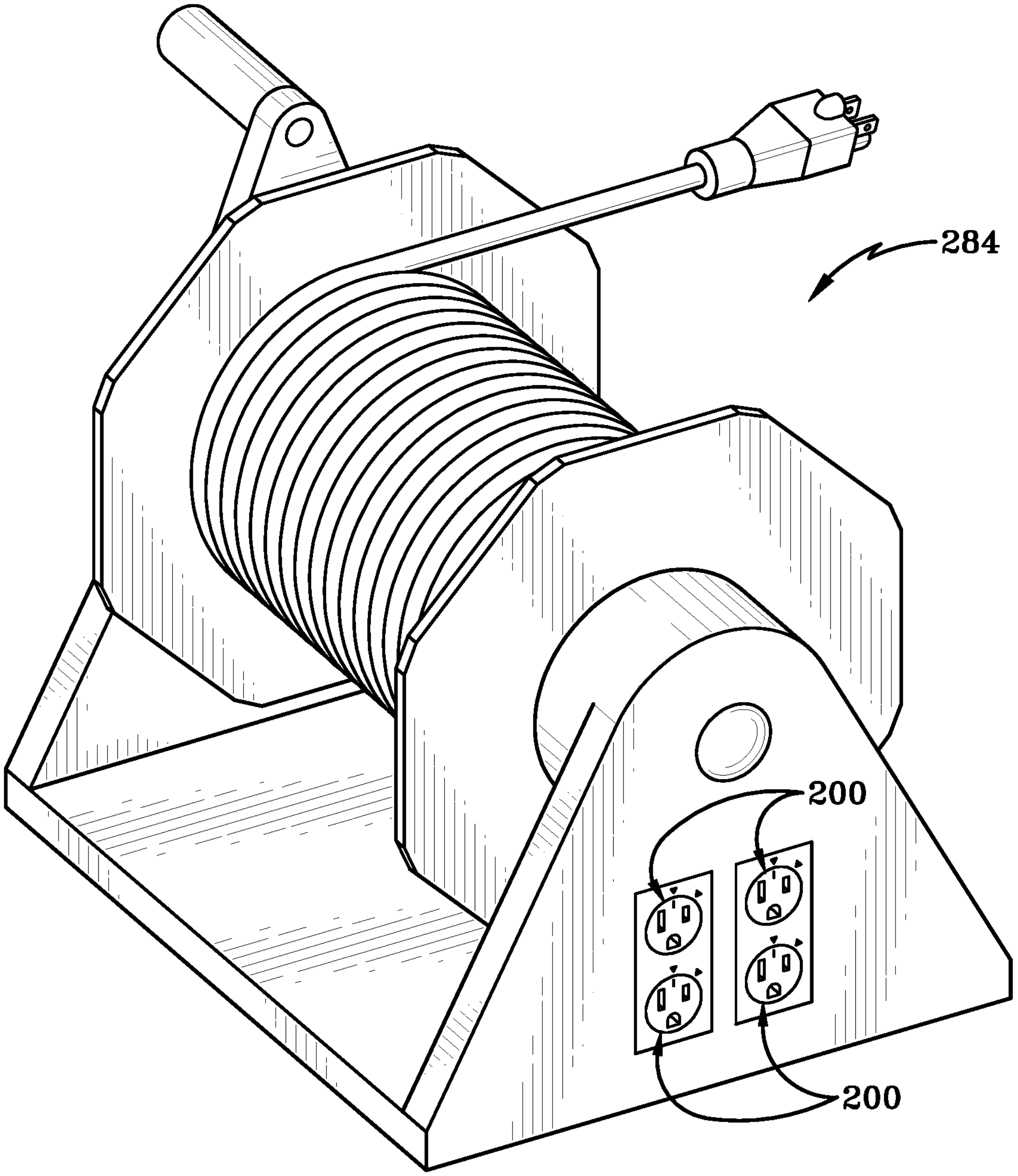
FIG. 14 is a perspective view of a cord reel having a plurality of device faces.

FIG. 14 illustrates a plurality of electrical devices 200 on a cord reel 284. Once again, any suitable number of electrical devices 200 may be incorporated and the function of the electrical devices 200 is similar to previously disclosed embodiments.

Figure 15:
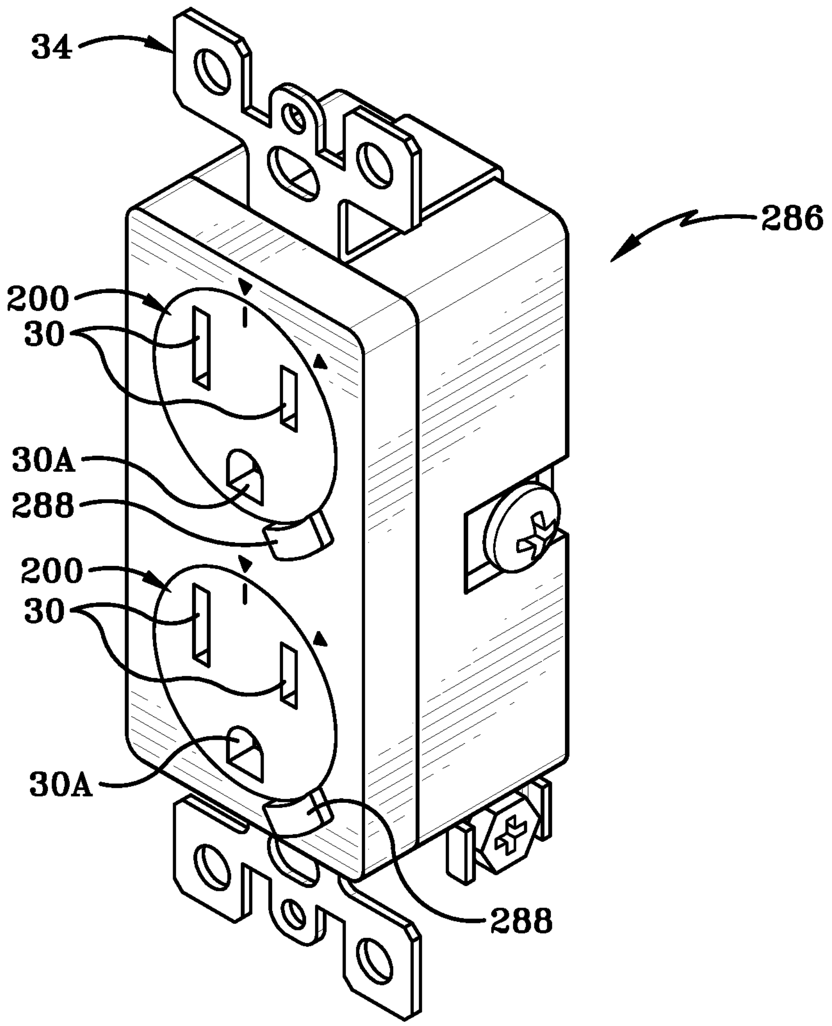
FIG. 15 is a perspective view of an electrical receptacle having a release button.
Figure 16:
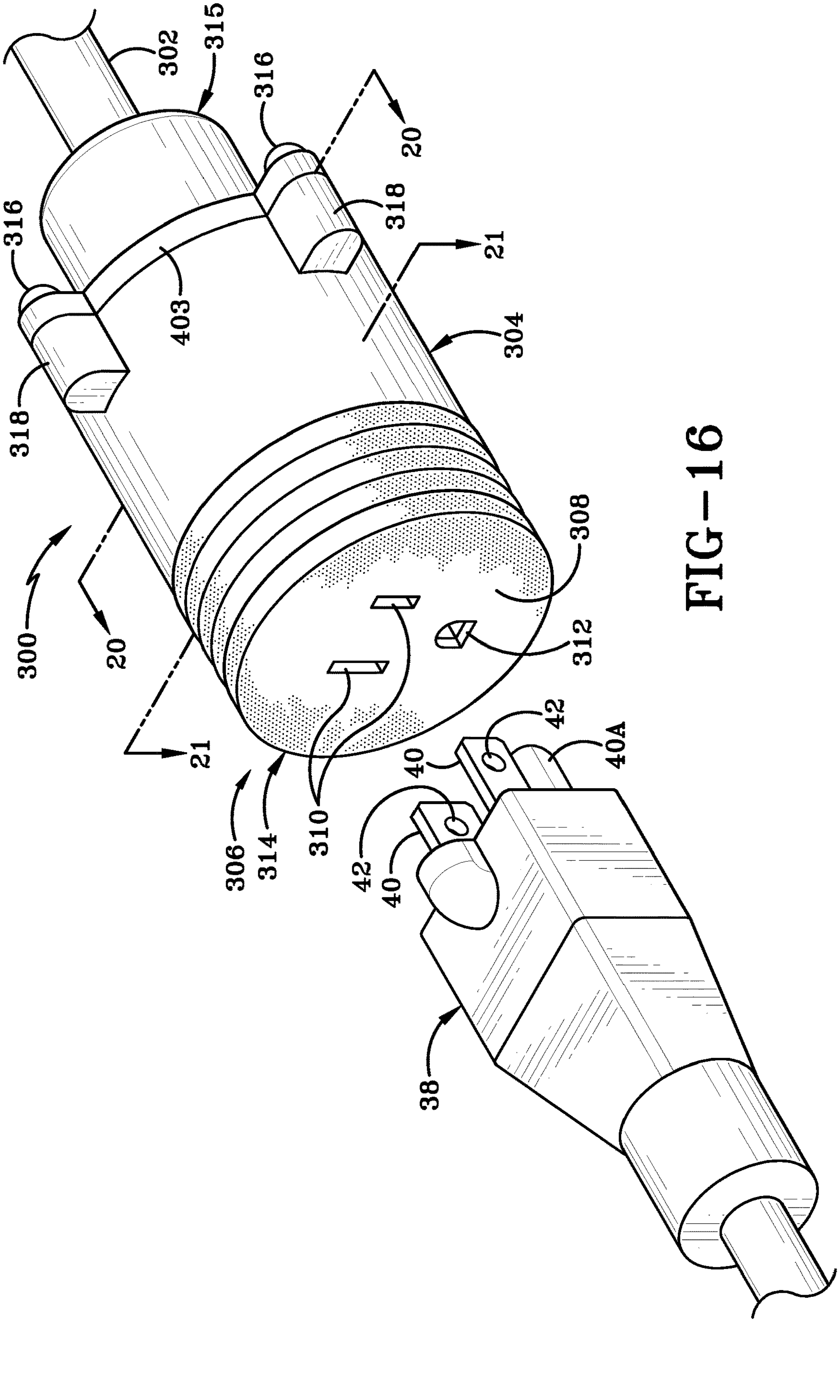
FIG. 16 is a perspective view of an electrical cord with an electrical plug separated.
Figure 17A:
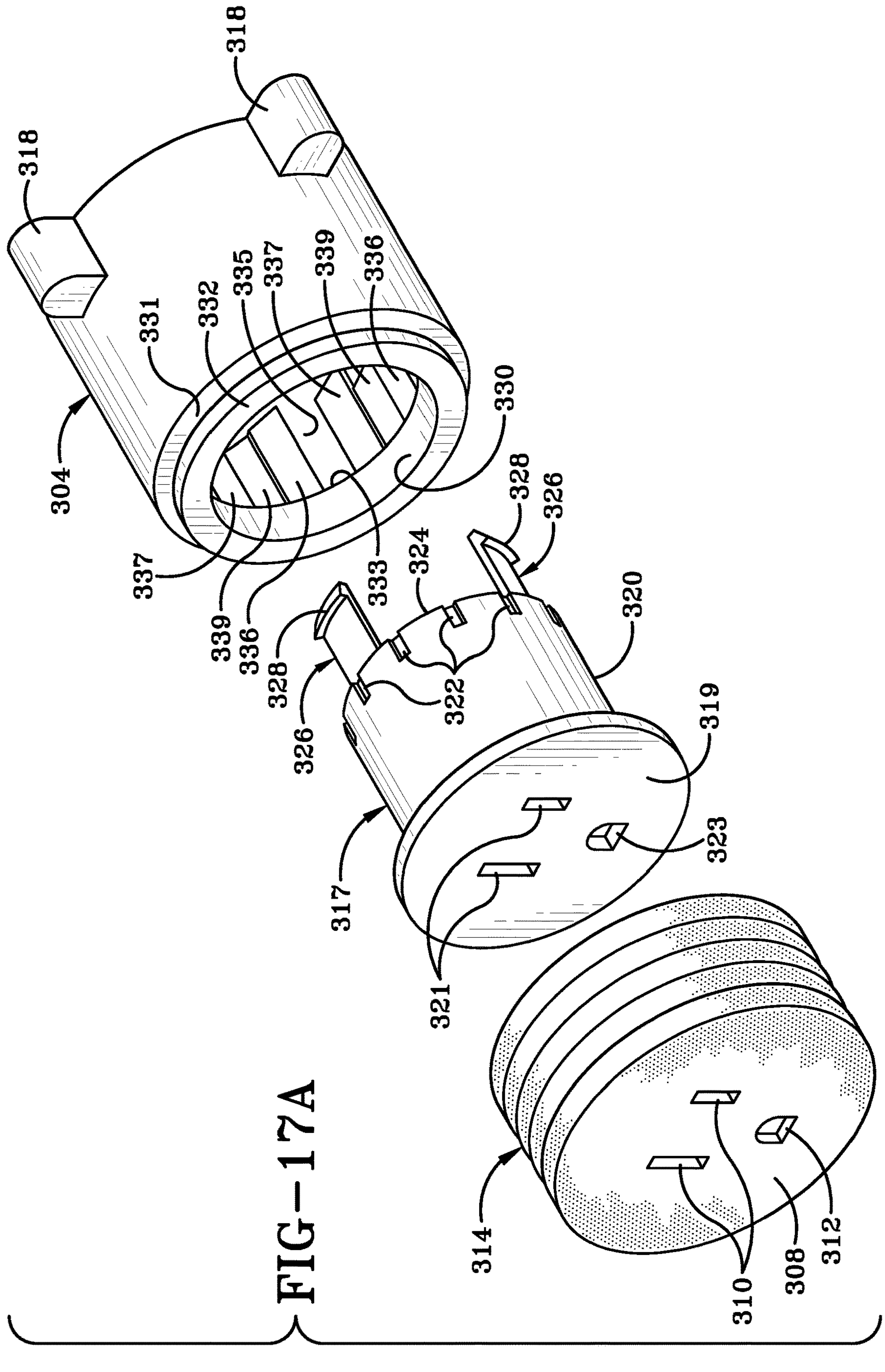
FIG. 17A is an exploded view a portion of the electrical cord.
Figure 17B:
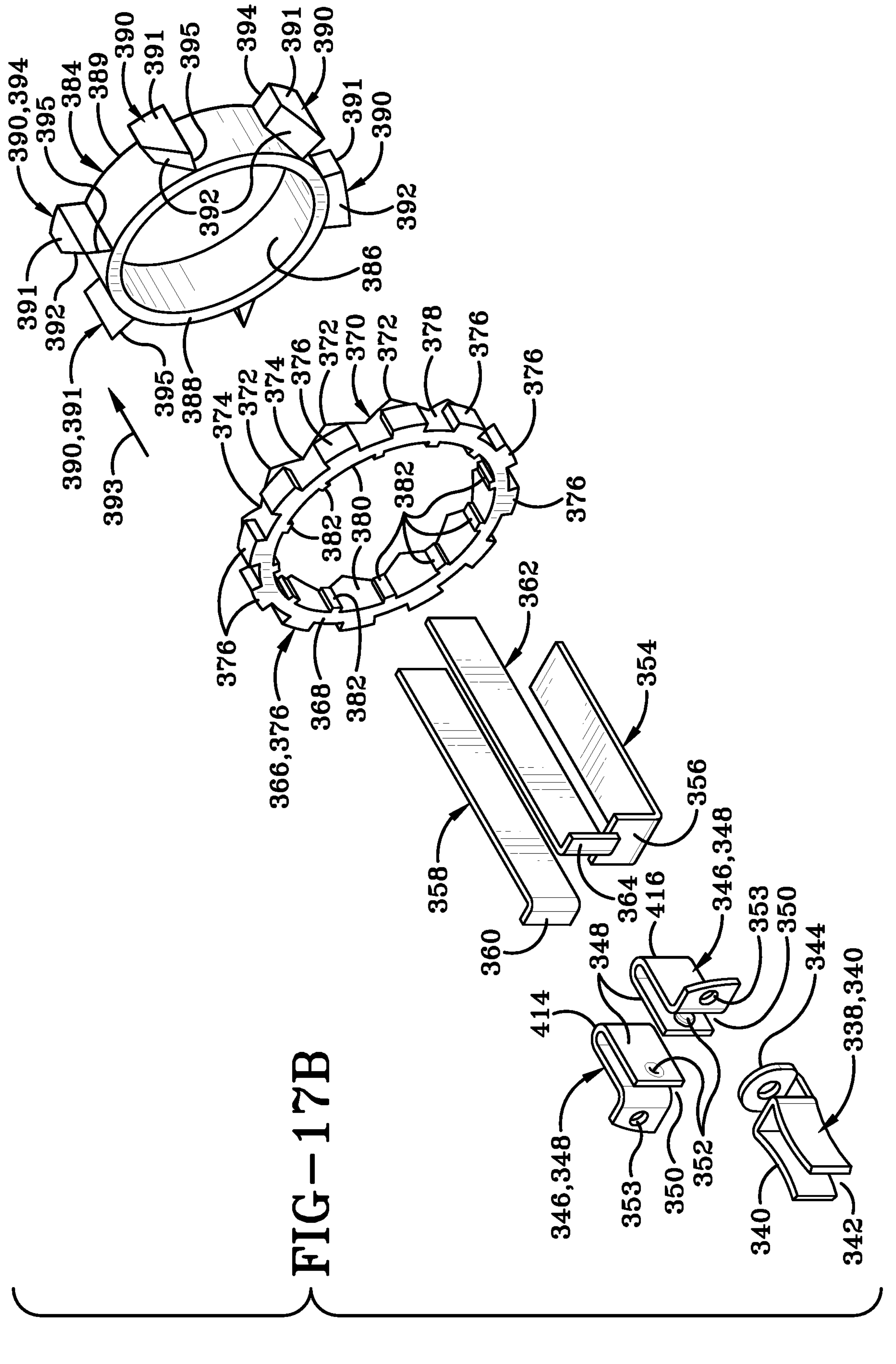
FIG. 17B is an exploded view of a portion of the electrical cord.
Figure 17C:
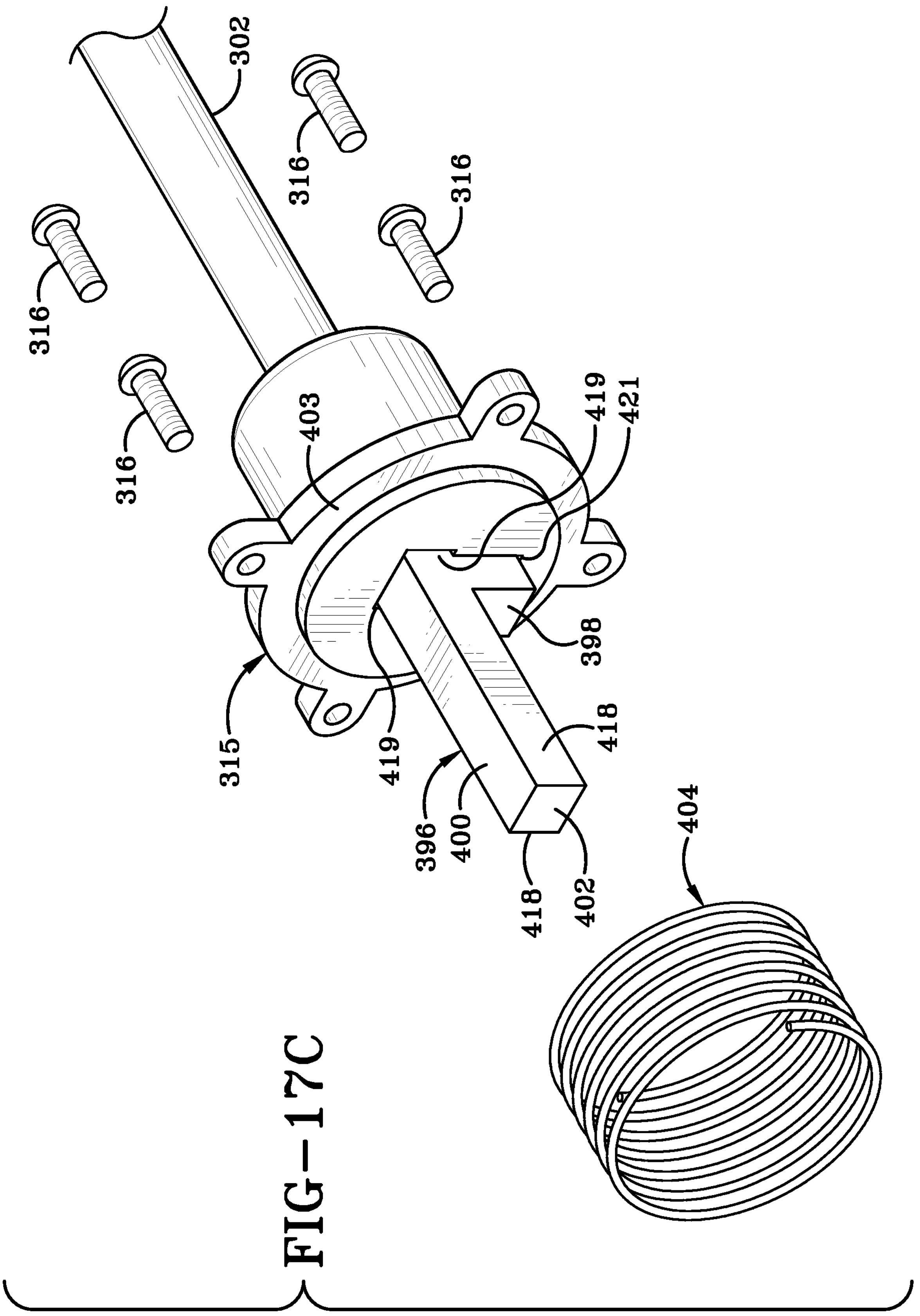
FIG. 17C is an exploded view of a portion of the electrical cord.
Figure 18:
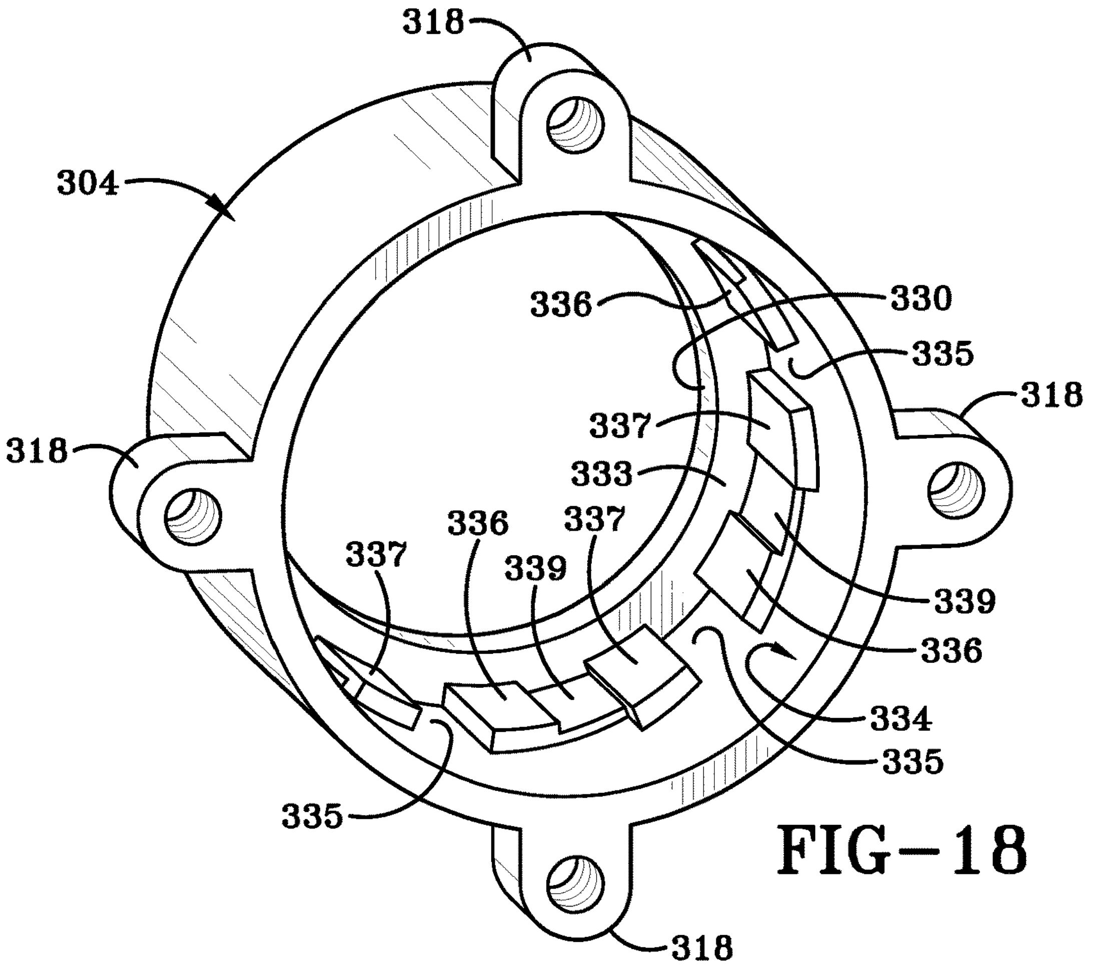
FIG. 18 is a rear perspective view of a portion of the electrical cord.

FIG. 15 illustrates an electrical receptacle 286 having electrical devices 200. In this embodiment, electrical devices 200 remain in a locked position until a user depresses a release button 288 on a front surface of the device. The release button 288 may be inactive when the electrical device is in any position other than the locked position.

FIGS. 16-24 illustrate various views of an electrical cord end 300 connected to a cord 302. Cord end 300 includes a body 304 with a first end 306 having a surface 308 with receptacle apertures 310 for plug blades 40 and receptacle aperture 312 for ground prong 40A. First end 306 may include a boot 314 made of rubber or any other suitable pliable material which is water resistant and flexible to provide movement with first end 308 and is preferably assists with sealing an electrical plug 38 against surface 308 when fully inserted to limit liquids from entering the electrical cord end 300. A mounting portion 315 connects to cord end mounting portion 318 with screws 316.

Engagement face 317 includes a front surface 319 both of which are positioned inside boot 314 and is also at least partially positioned within a cavity 334 of body 304 through opening 330. Receptacle openings 321 and ground prong openings 323 are positioned on front surface 319. Rotating face 317 also includes a cylindrical body 320 having an end 324 with slots 322 therein and tabs 326 with angled clips 328 at one end. Body 304 includes a front surface 332 with a plurality of engagement steps 335, 336, 337, and 339 therein and a groove 331 for receiving boot 314. Engagement step 335 corresponds with the unlocked position, while engagement steps 336 and 339 correspond to intermediate or non-stationary positions, and engagement step 337 corresponds with the locked position as will all be detailed below. Further, a surface 333 is positioned opposite surface 332 and forms a base of the various engagement steps.

A movable ground electrical contact 338 includes arms 340 forming an opening 342 therein for receiving ground plug 40A therein. The movable ground electrical contact 338 may also include a mounting portion 344 having a mounting aperture therein. Movable electrical contacts 346 include arms 348 defining an opening 350 therein for receiving plug blades 40 therein. One arm 348 of each moveable electrical contact may include a projection 352 extending into opening 350 and is used to fit within aperture 42 of plug blades 40 to help assist with retaining the electrical plug in the electrical cord end. The moveable electrical contacts are secured to the rest of the electrical cord end with mounting portions 353.

The cord end 300 also includes static contacts 358, 362, and 354. Static contact 358 includes a contact surface 360, while static contact 362 includes a contact surface 364, and static contact 354 includes a contact surface 356. In one implementation, static contacts 358 and 362 may selectively be a line/neutral line and the other may be a hot line. In most instances, static contact 354 is a ground contact. The static contacts 354, 358, and 362 may each be directly connected to electrical wires within cord 302 or any other suitable wires which may have constant electrical current as required.

A movable ring 366 includes an inner surface 380 with protrusions 382 extending inwards. An outer surface 378 includes protrusions 376 extending outwards form the outer surface 378. The movable ring 366 also includes a front surface 368 and a rear surface 370. Rear surface 370 includes peaks 372 and valleys 374 formed between each of the peaks 372. In one implementation, movable ring 366 is press-fit or otherwise secured to engagement face 317 preferably at slots 322. Specifically, protrusions 382 may be positioned within slots 322 so that the movable ring 366 moves inwards and outwards with engagement face 317 during operation.

A rotating ring 384 is engaged with movable ring 366 and therefore engagement face 317 due to its press-fit or otherwise interaction with movable ring 366. Rotating ring includes an inner surface 386, a front surface 388, a rear surface 389, and an outer surface 391. A plurality of protrusions 390 extend outward from outer surface 391 and each include a rear surface 394, an angled front surface 392, and an engaging tip 395. Angled front surface 392 is oriented to engage with movable ring 366 and the angled surface imparts a rotational movement on rotating ring 384 when the movable ring moves inward in the direction associated with arrow 393 as will be described in greater detail below. Further, the engaging tip 395 may follow the ramped surfaces of movable ring 366 instead of angled front surface 392 in one implementation.

Cord end 300 also includes a spring 404 which is engaged with a wall 403 on one end. A rod 396 may be fixed within the cord end and includes a stop 398 for the contacting the engagement face if necessary and a rod top wall 400, a rod wall end 402, and rod side walls 418 which may be in engagement or next to the static and/or movable electrical contacts.

Figure 19:
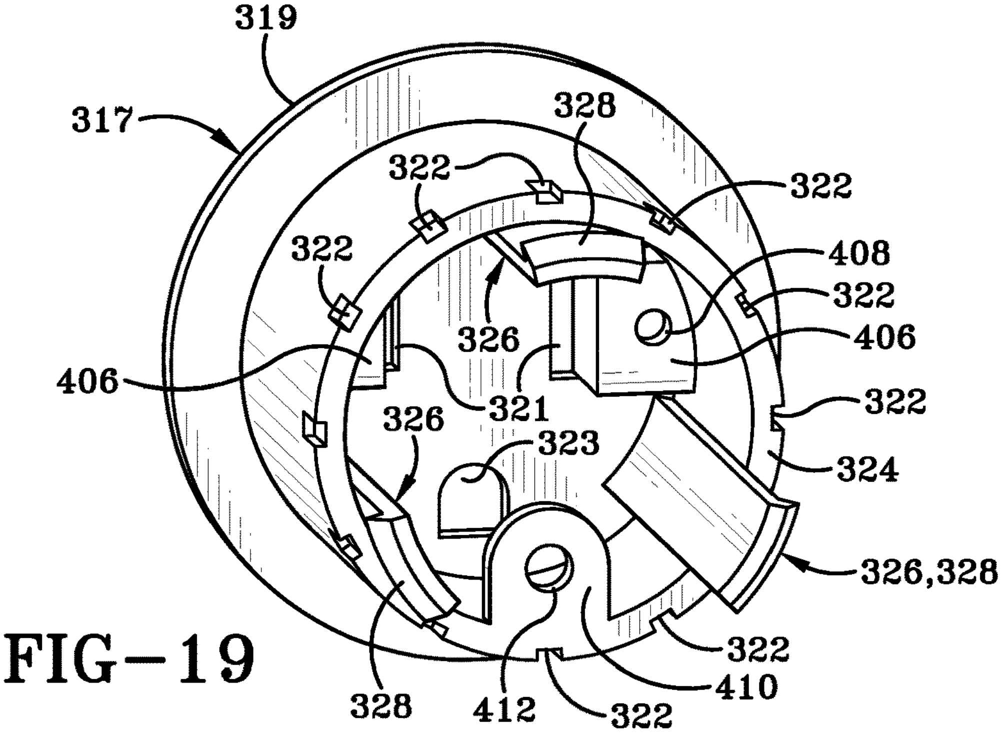
FIG. 19 is a rear perspective view of a portion of the electrical cord.
Figure 20:
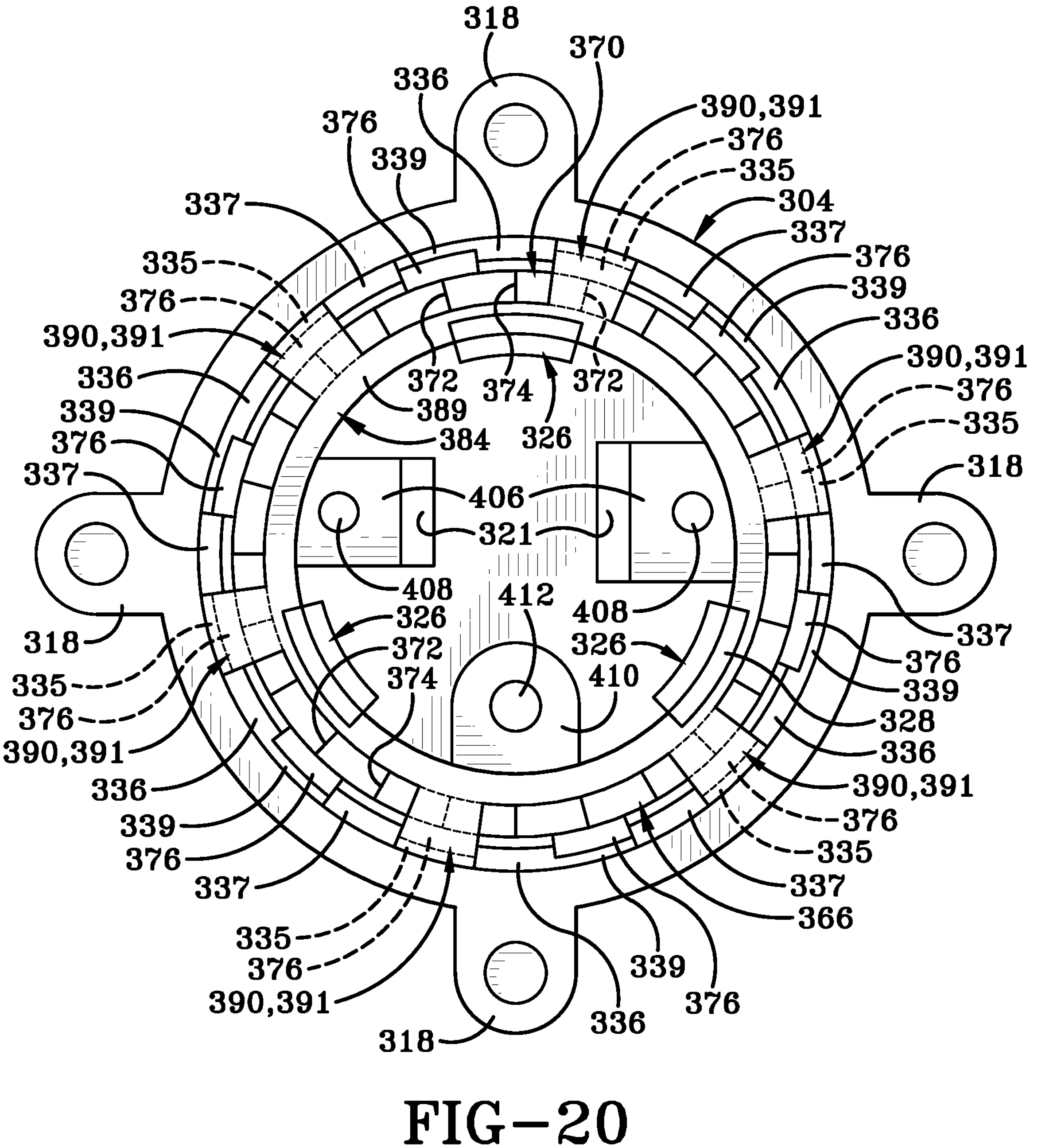
FIG. 20 is a sectional view taken generally about line 20-20 in FIG. 16.

Moving to FIG. 19, a perspective rear view of engagement face 317, a mounting structure 406 is shown for each movable electrical contact 346. Each mounting structure 406 may also include an aperture 408 for securing a river, screw or the like therein to secure the movable contacts 346 at mounting portion 353. Similarly, a mounting structure 410 is provided with an aperture 412 to secure movable ground contact at mounting portion 344 to the mounting structure 410 with a rivet 415 or similar hardware.

Figure 21:
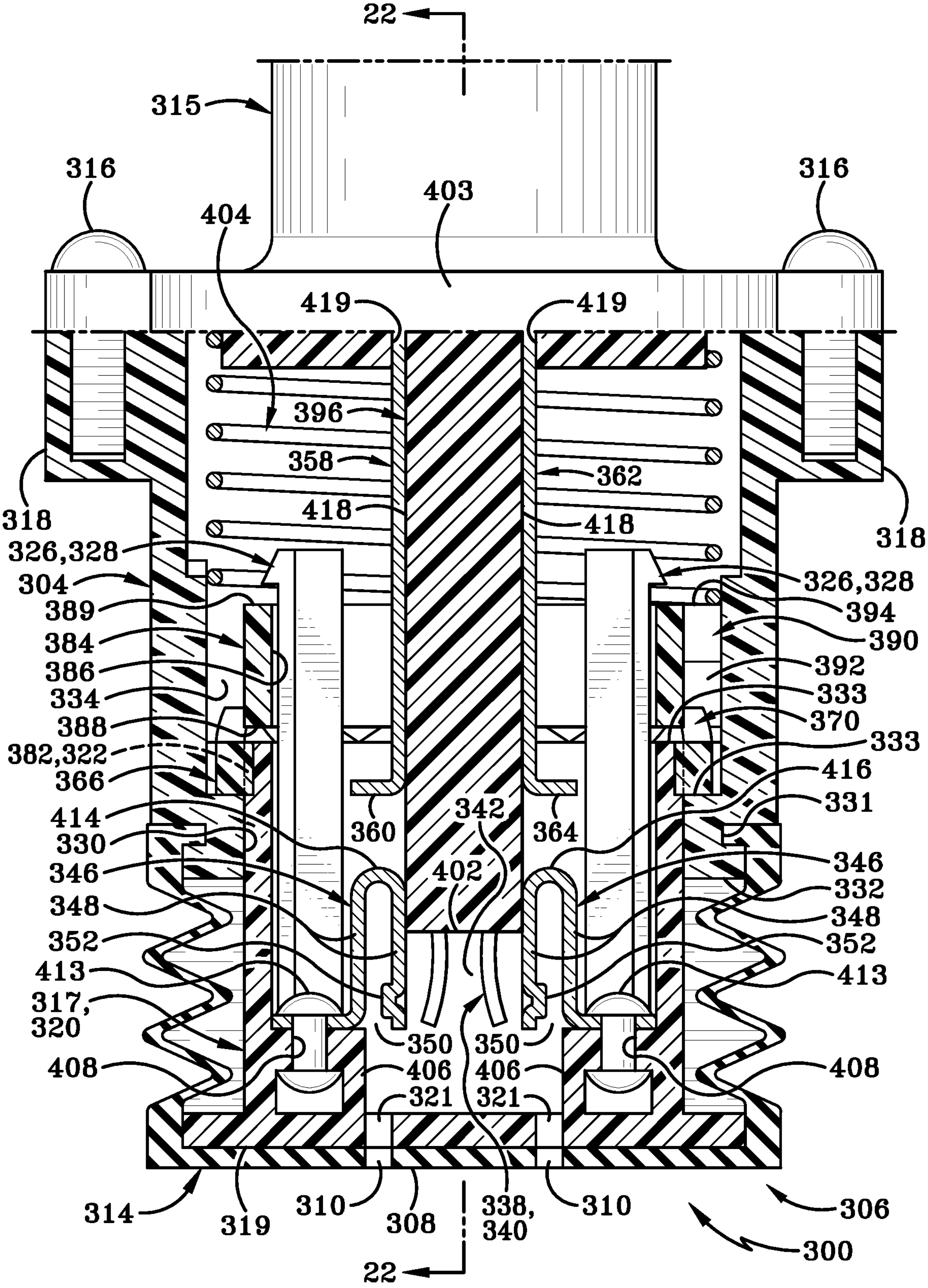
FIG. 21 is a sectional view taken generally about line 21-21 in FIG. 16.
Figure 22:
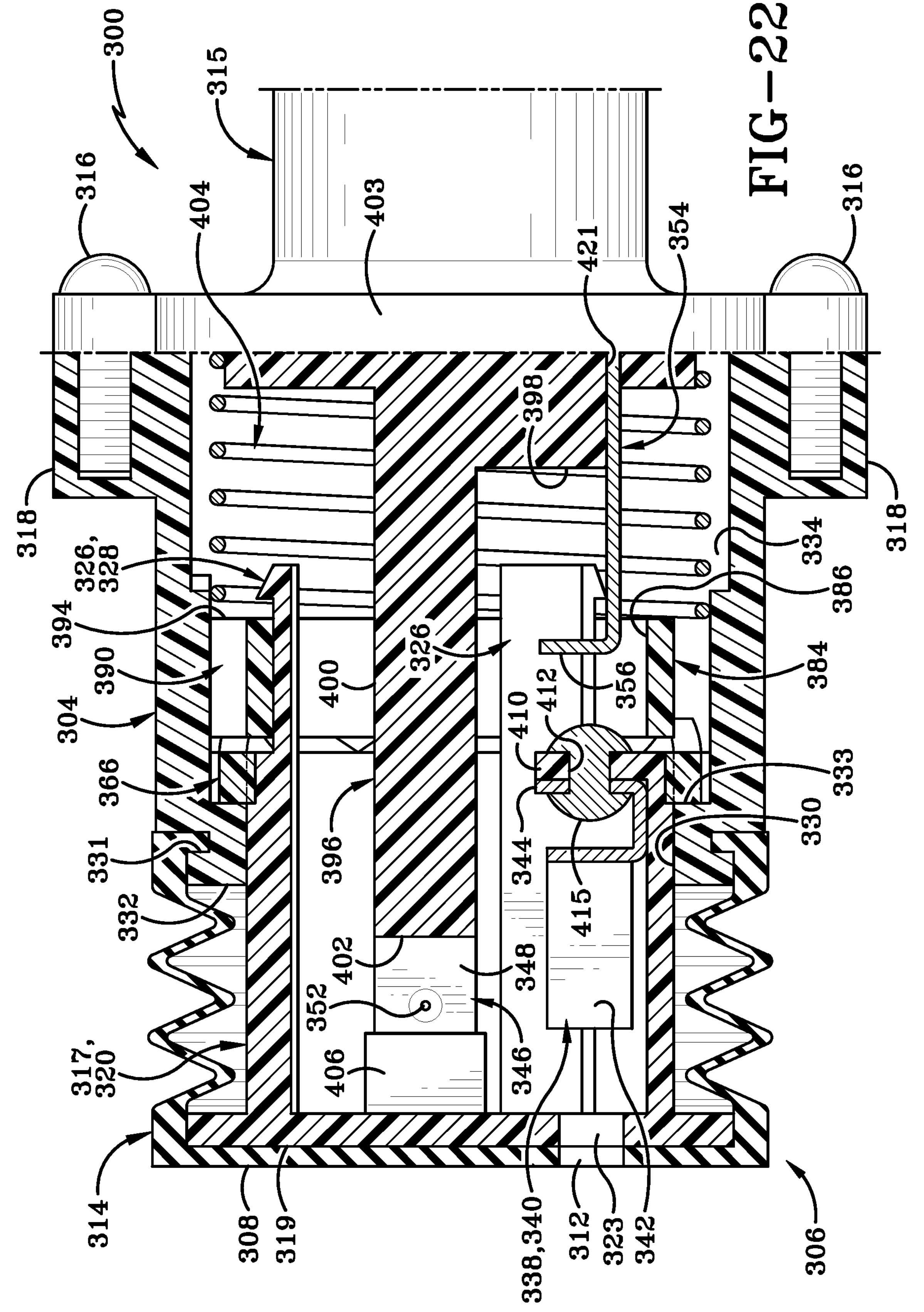
FIG. 22 is a sectional view taken generally about line 22-22 in FIG. 21.

FIGS. 21 and 22 illustrate various partial section views of the assembled cord end 300. Specifically, this view illustrates the cord end in the electrical inactive position where movable contacts 346 and 338 are not contacting, directly or via other electrical communication, static contacts 354, 358, or 362. Still further, movable contacts 346 each include a rear surface 414, 416 for selectively engaging the static contacts 358, 362 as will be shown in FIG. 24.

In terms of component contact, spring 404 interacts with wall 403 and rear surface 394 of rotating ring 384. As described above, rotating ring 384 in turn contacts movable ring 366 with angled front surface 392 engaging with peaks 372 and valleys 374 of the movable ring to impart both inward and outward movement of movable ring 366 with engagement face 317 connected thereto as described above. In addition, the inward and outward movement imparts a rotational movement on rotating ring 384 to reposition protrusions 376 against the appropriate engagement steps 335 in the electrically inactive position, engagement steps 339 in the electrically active position, and engagement steps 336/337 in the intermediate positions. Spring 404 assists by forcing the engagement face 317 and other components away from the cord end until the movable ring contacts the appropriate engagement step upon compression toward the cord end.

FIGS. 21 and 22 also illustrate the cord end 300 in the electrically inactive position with contact rear surfaces 414, 416 and rivet 415 spaced apart from appropriate contact surfaces 356, 360, and 364. Accordingly the cord end is not electrically active in this position. Still further, movable ring 366 engages with cavity 334 to prevent the engagement face 317 from being removed. Similarly, clips 328 engage with a rear surface 389 of rotating ring 384 to ensure that the engagement face 317, rotating ring 384 and movable ring 366 remaining engaged and move linearly together as appropriate.

Figure 23A:
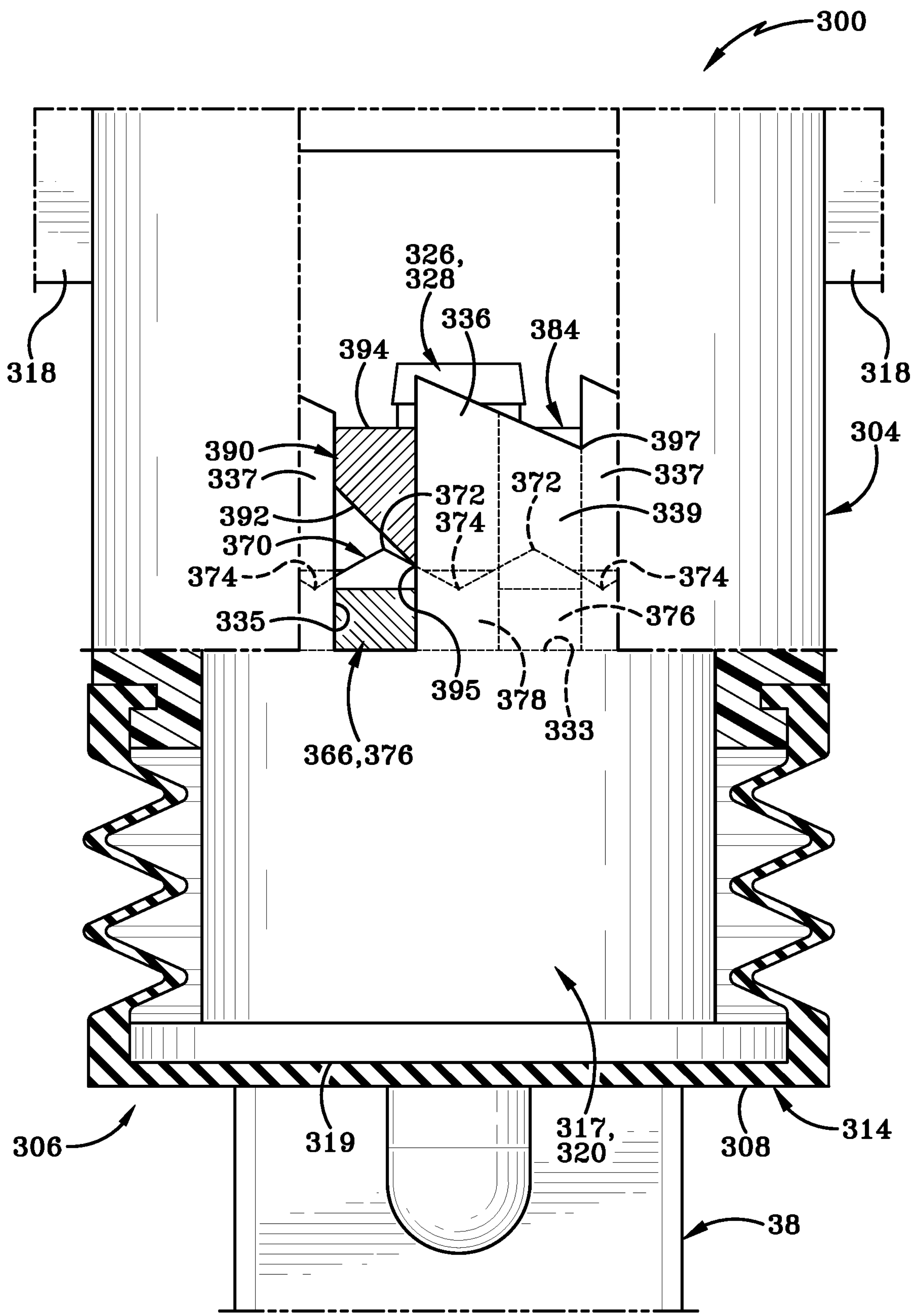
FIG. 23A is a partial sectional view with the electrical cord in the electrically inactive position.
Figure 23B:
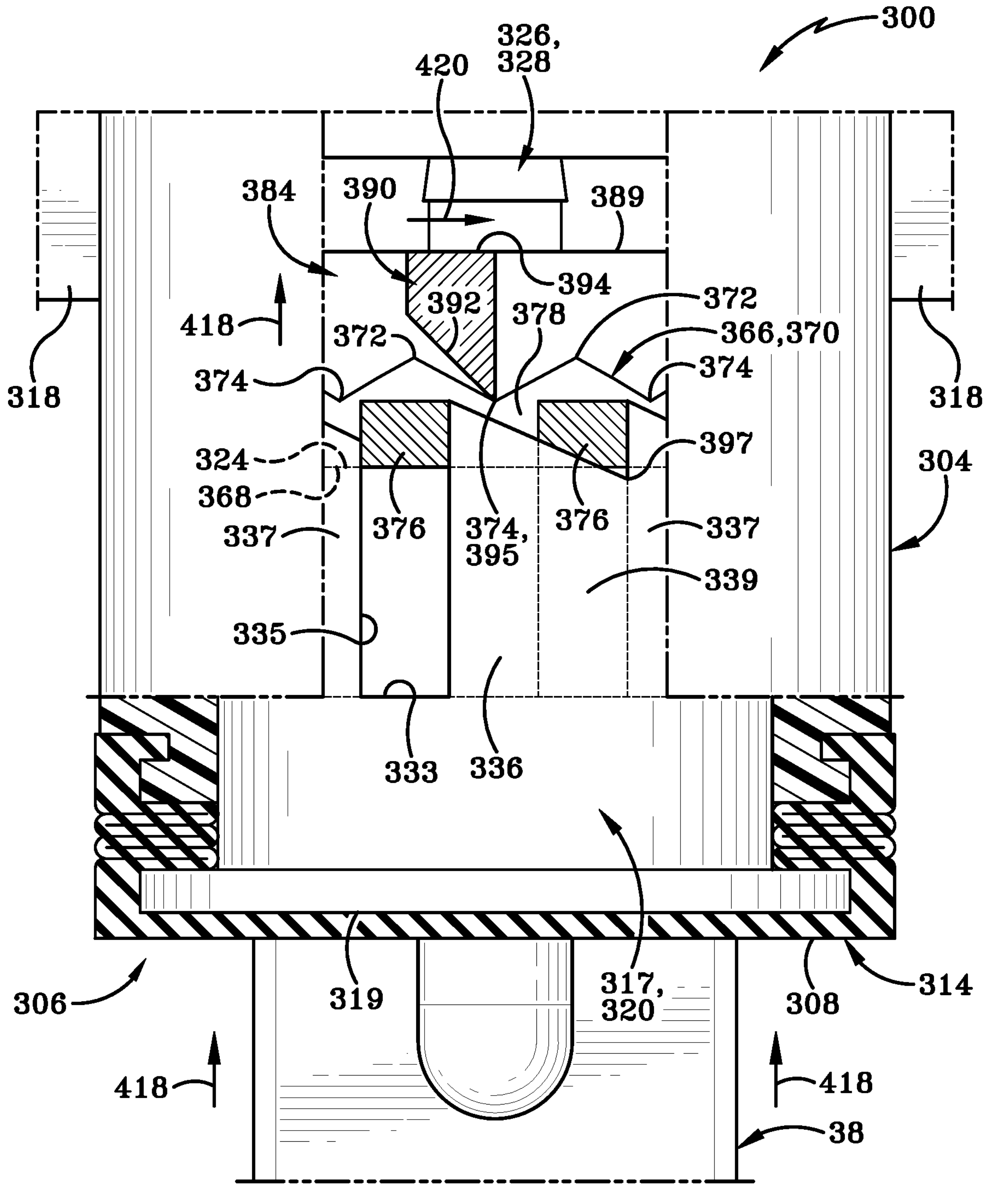
FIG. 23B is a partial sectional view with the electrical cord in an intermediate position.
Figure 23C:
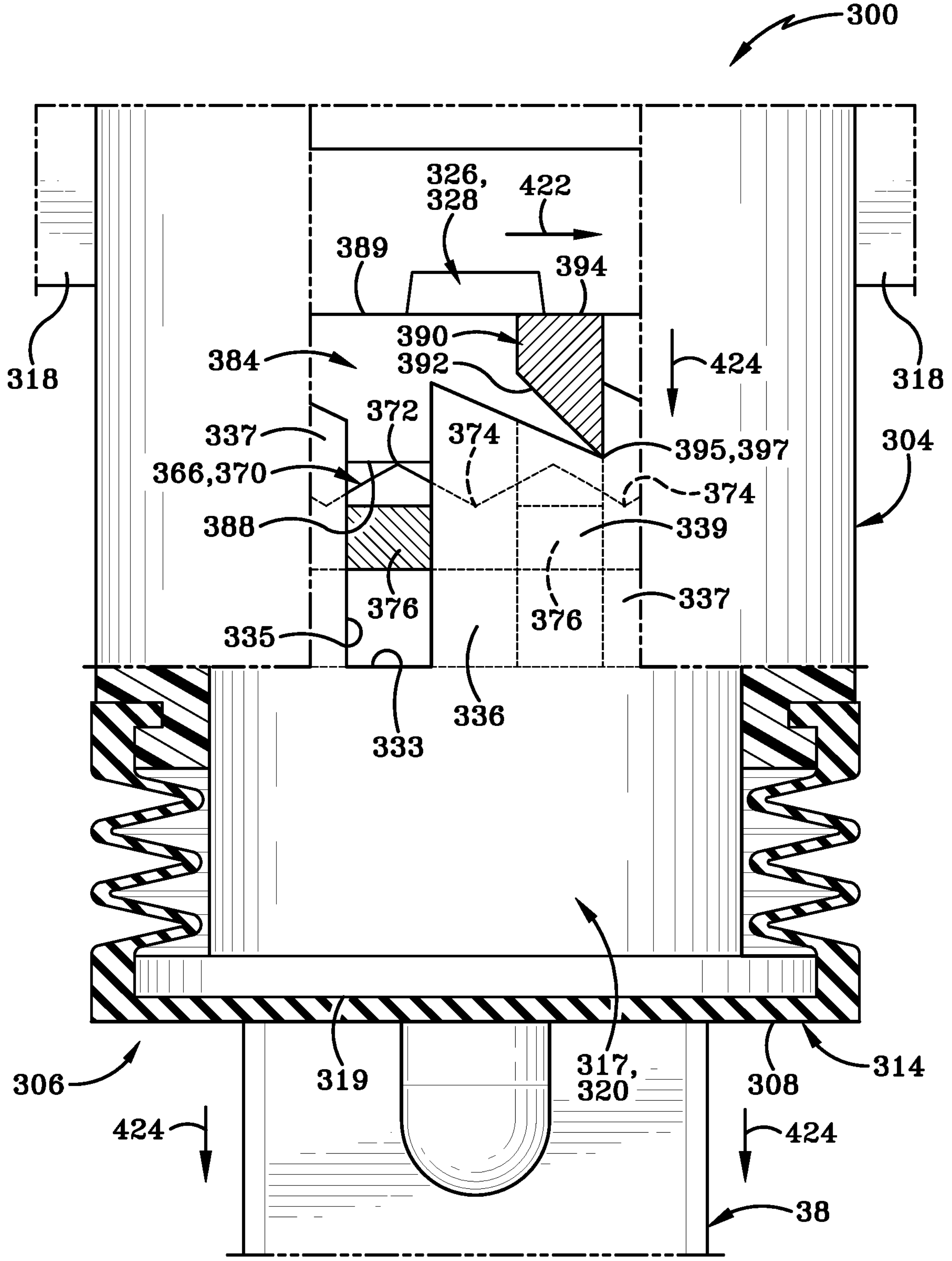
FIG. 23C is a sectional view with the electrical cord an electrically active position.
Figure 24:
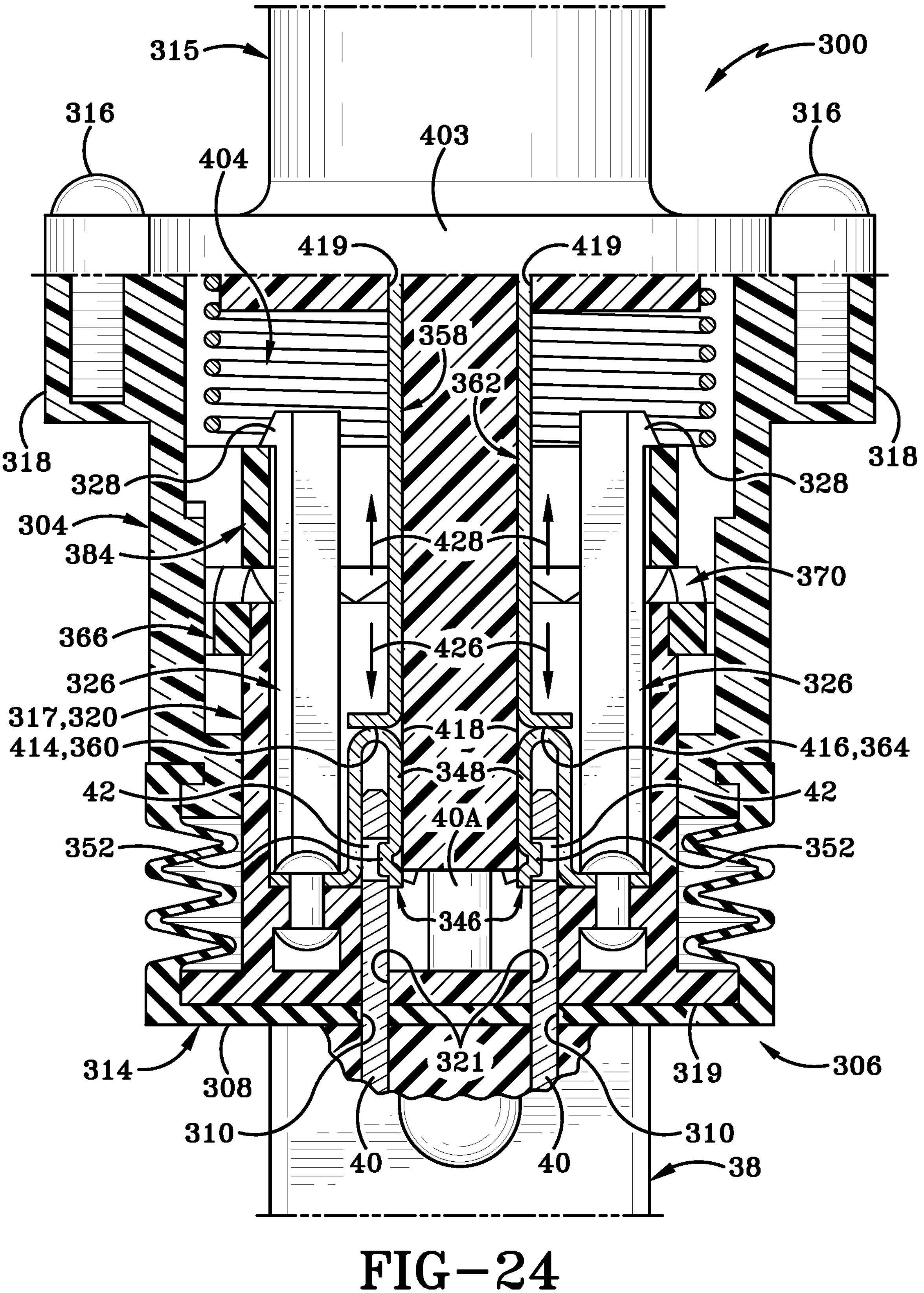
FIG. 24 is a sectional view of the electrical cord in the electrically active position from the same view as section 22-22.

FIGS. 23A, 23B, and 23C illustrates views of the cord end in the electrically inactive position, an intermediate position, and an electrically active position such as positioning tip 395 in a point 397 in one example for an electrically active position. When engagement face 317 is pushed in the direction associated with arrows 418, the spring 404 is overcome and the angled surface 392 of rotating ring 384 follows peaks 372 and valleys 374 of movable ring 366, rotates the rotating ring 384 in the direction associated with arrows 420, 422 until engagement step 337 is contacted by the angled surface 392. At this time, when the user removes the inward force, spring 404 forces the components in the direction associated with arrow 424. In this position, the cord end 300 remains in an electrically active position until the engagement face is moved inward again and the spring 404 is again overcome. After pressing the engagement face 317 inward, the angled surface 392 again imparts rotation on the rotating ring until the electrically inactive step 335 or opening is aligned. When the user removes the inward pressure, the cord end moves from the electrically active position to an electrically inactive position as shown in FIGS. 21 and 22. As discussed and shown in FIG. 24, the inward movement in the direction associated with arrows 428, the return force of spring 404 provides movement in the direction associated with arrows 426 until the movable and static electrical contacts are in electrical engagement. Once again, from the electrically inactive position, the cord end moves to an electrically active intermediate position shown in FIG. 23B and then to an electrically active position shown in FIG. 23C when the user removes the inward force. From the electrically active position shown in FIG. 23C, inward pressure again moves the electrical cord end to an electrically inactive position shown in FIG. 23A. Accordingly, the electrical cord end 300 can selectively provide any suitable number of electrically active or inactive positions to both secure the electrical device and provide a safer connection for the electrical cord end because the cord end is not always electrically active.

Figure 25:
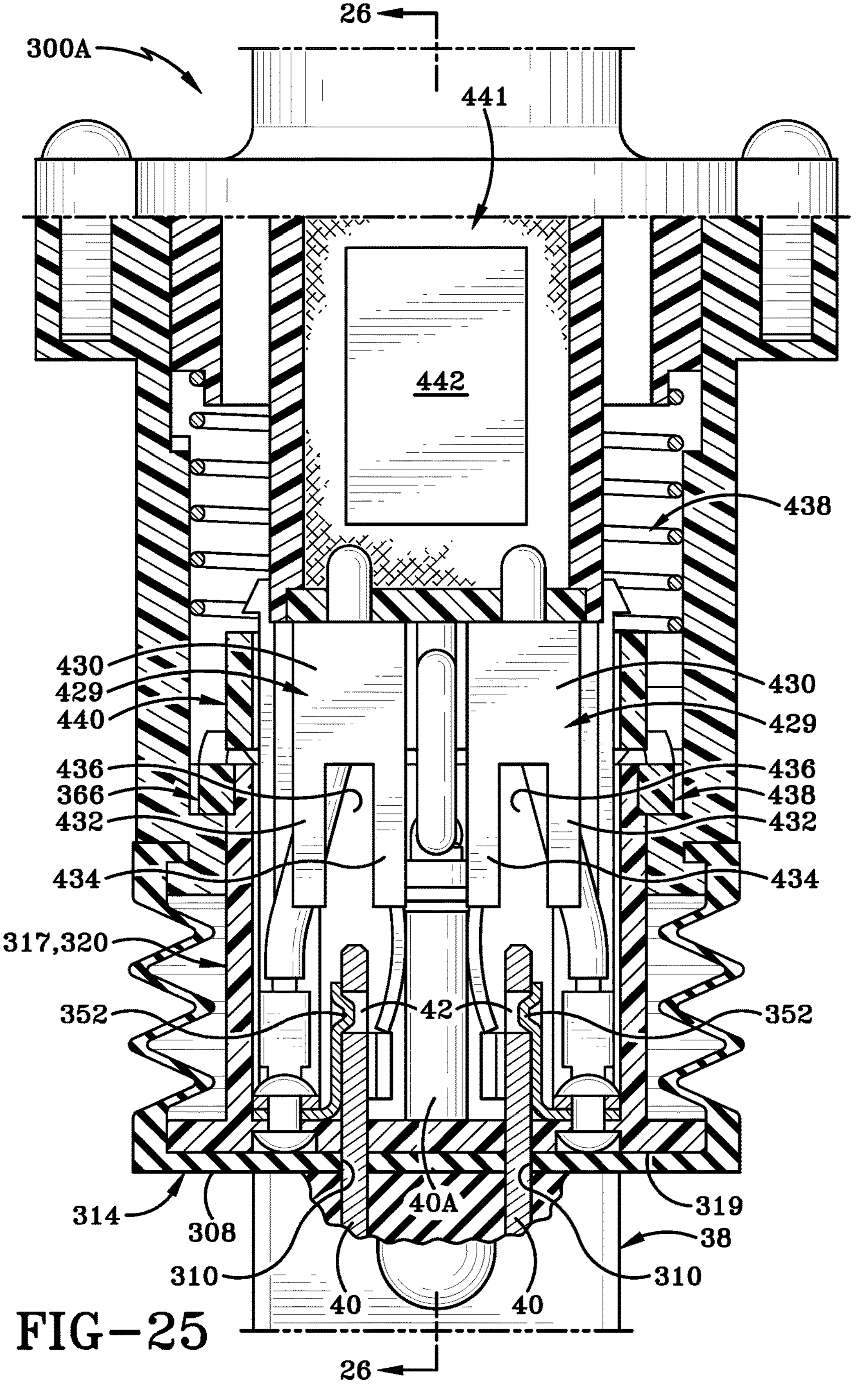
FIG. 25 is a sectional view taken generally about the same view as FIG. 22 in the electrically inactive position.
Figure 26:
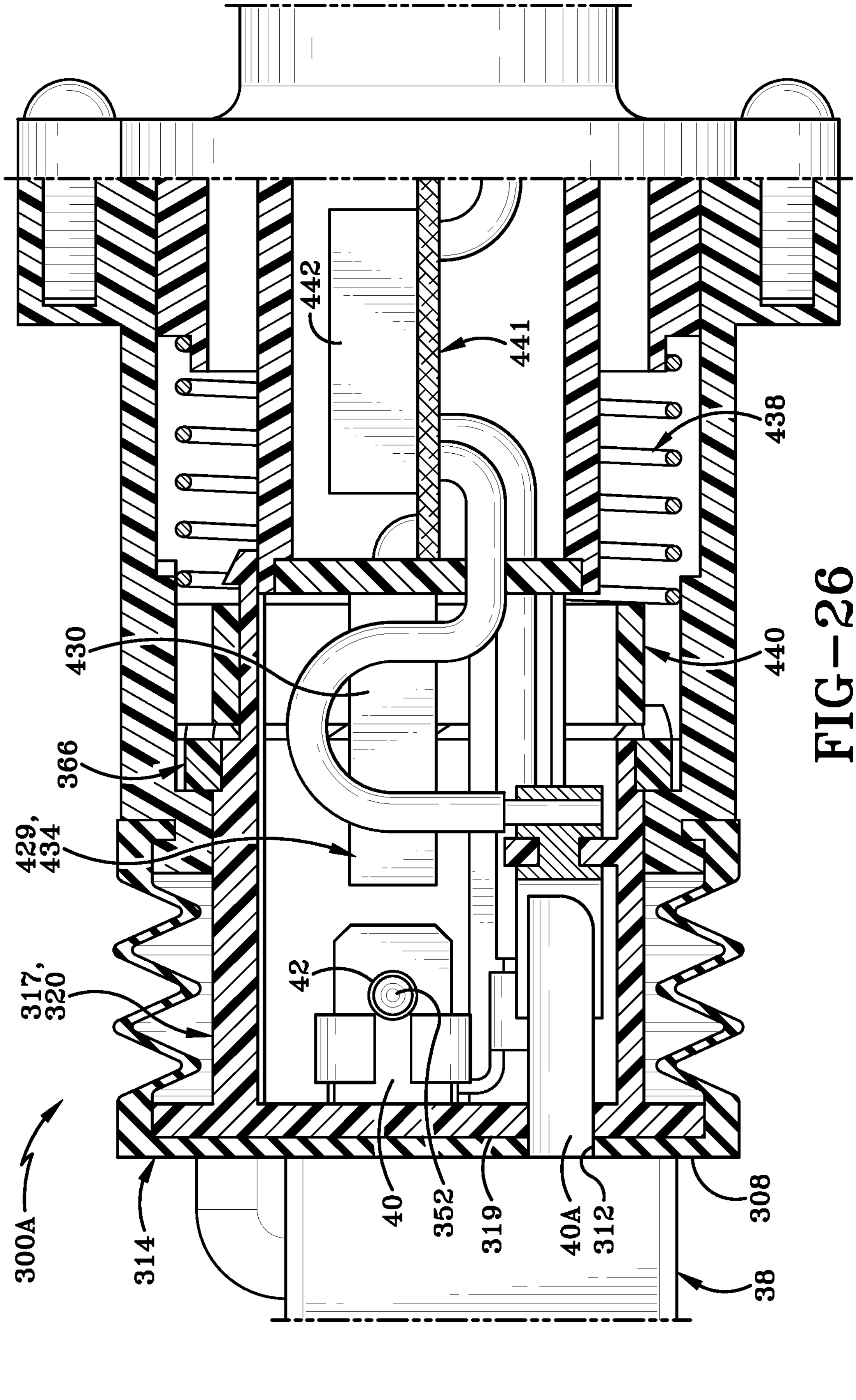
FIG. 26 is a sectional view taken generally about line 26-26 in FIG. 25.
Figure 27:
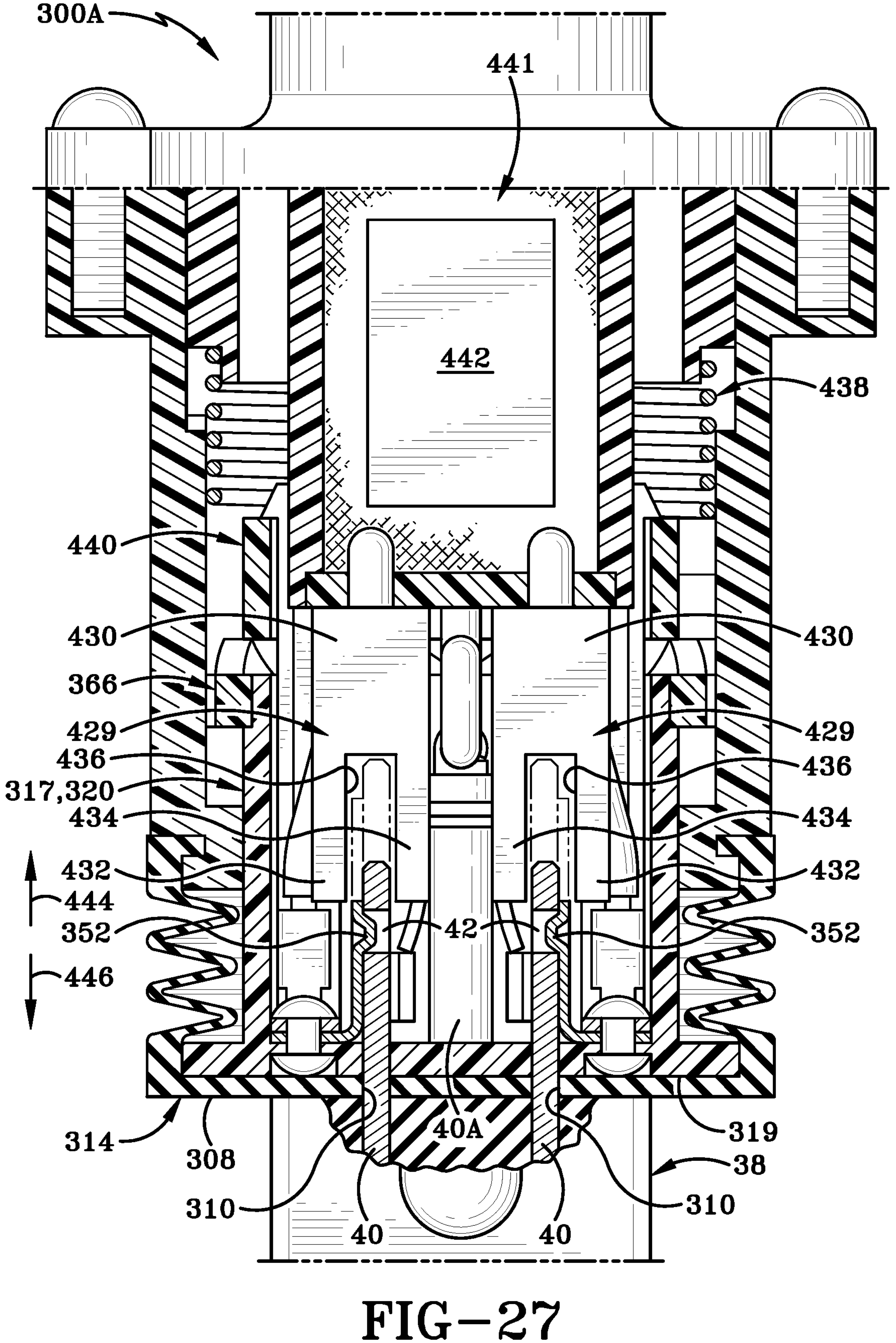
FIG. 27 is a sectional view taken about the same view as FIG. 25 with an electrical plug fully inserted and movable into the electrically active position.
Figure 28:
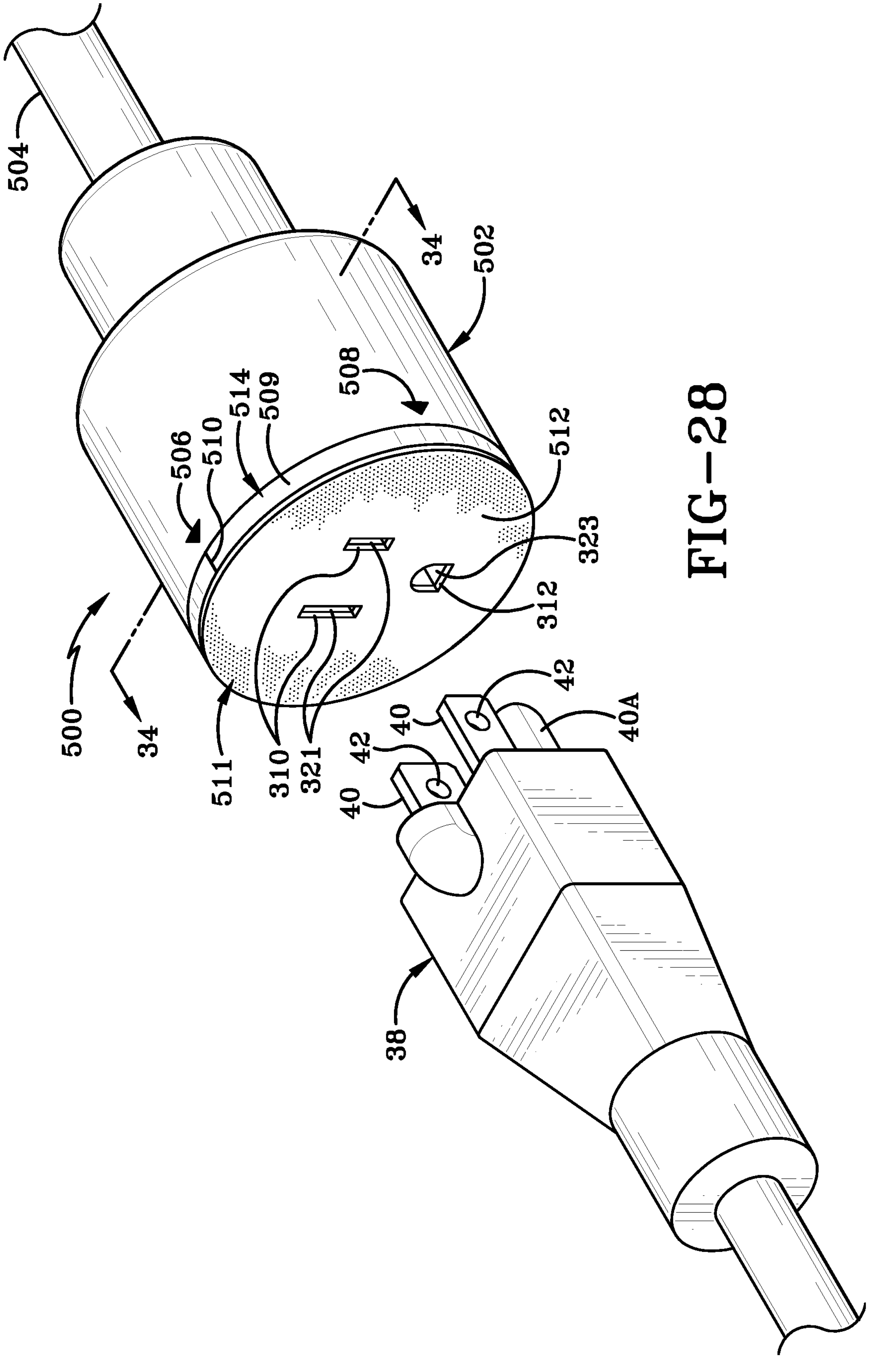
FIG. 28 is a perspective view of an electrical cord with the electrical plug separated.
Figure 29A:
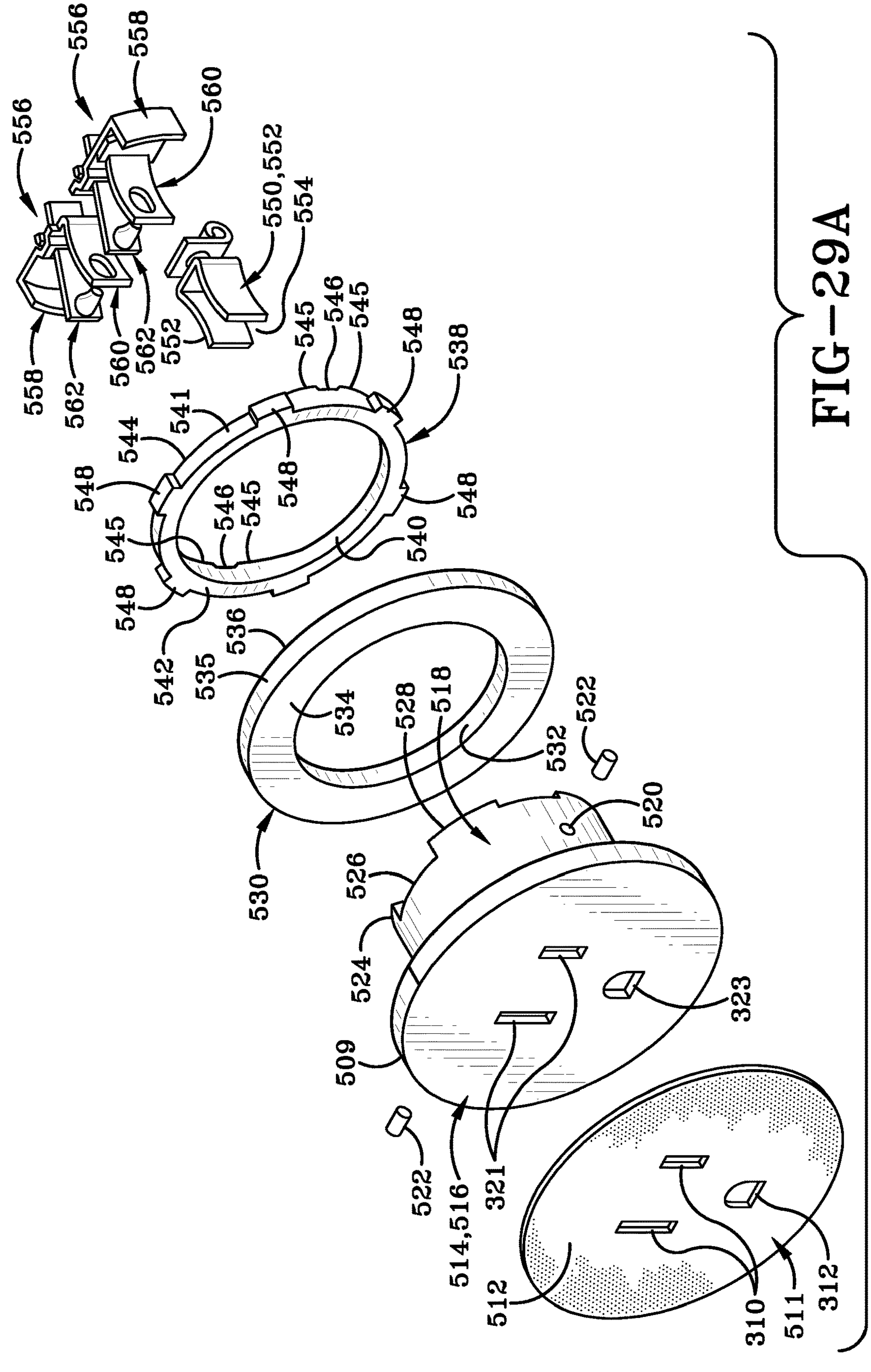
FIG. 29A is an exploded view of some of the components of the electrical cord.
Figure 29B:
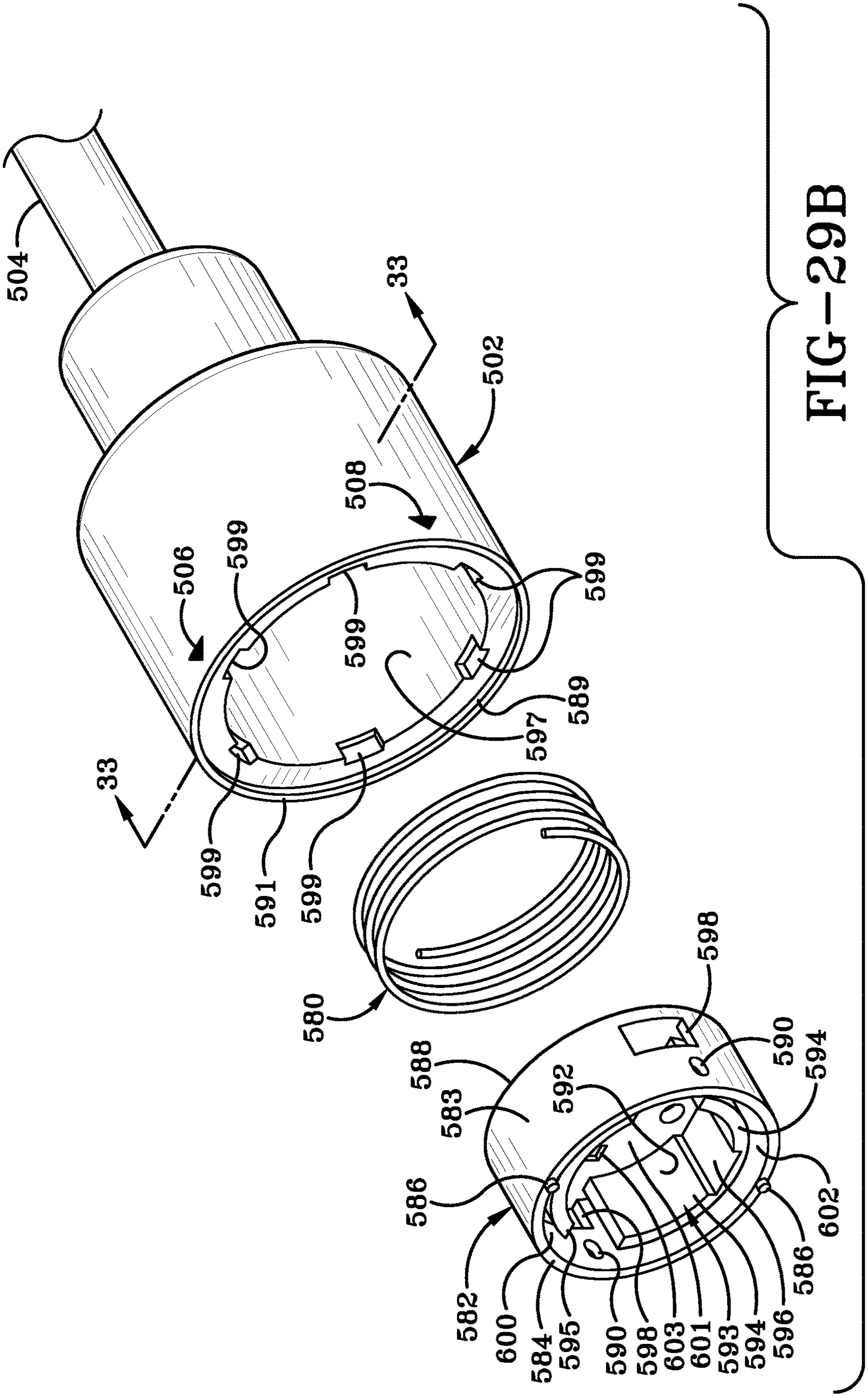
FIG. 29B is an exploded view of some of the components of the electrical cord.
Figure 30:
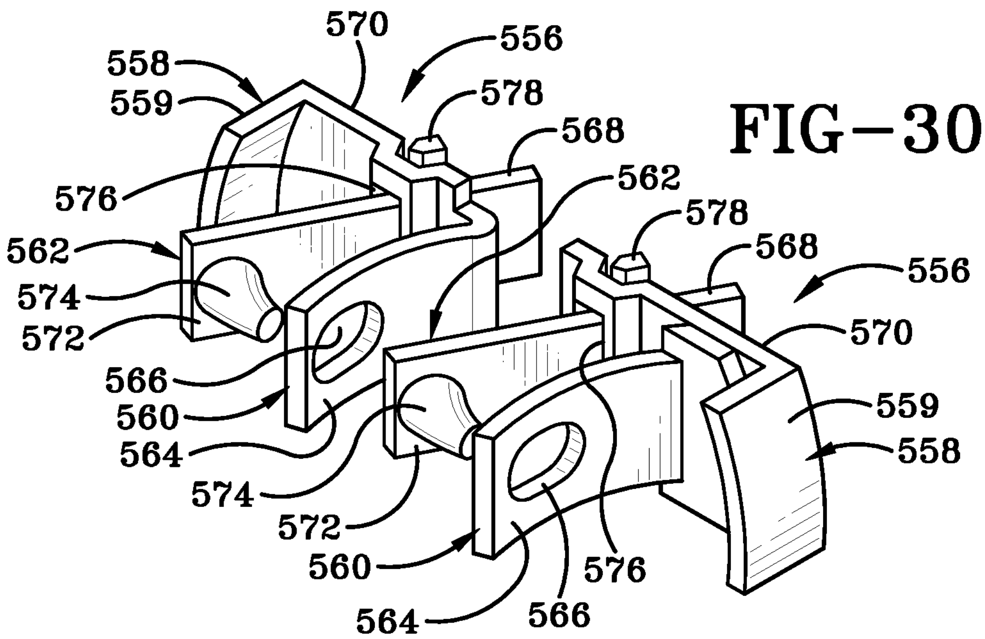
FIG. 30 is a perspective view of the electrical cord retaining prongs.

FIGS. 25-27 illustrate various view of a similar cord end 300A having a motion sensor or current sensor to detect the presence of an electrical plug 38 therein. A motion sensor 429 includes a body 430 having an outer arm 432, an inner arm 434, and a plug blade receiving region 436 formed there between. While two motion sensors 429 are shown, it is within the spirit and scope of the disclosure to provide only a single motion sensor or three or more motion sensors depends on the type of electrical plug. Motion sensors 429 are powered by a controller 442 on a circuit board 441 which is used to sense the presence at the motion sensor and then provide electrical continuity to the electrical contacts as previously discussed above.

The cord end 300A also includes a spring biased engagement face 317 with spring 438 contacting a rotating ring 440 similar to the previously disclosed structure whereby inward movement yields a rotational resultant which moves the cord end 300A from an electrically active position to an electrically inactive position and from an electrically inactive position to an electrically active position. In this instance, electrical plug prongs 40 cannot reach the motion sensor blade receiving region until the engagement face 317 is pushed inward in the direction associated with arrow 444 and moved to the electrically active position shown in dashed lines in FIG. 27. The user can once again push the engagement face 317 inward to force the adjustment mechanism (movable ring and rotating ring) to utilize spring 438 to force the engagement face 317 in the direction associated with arrow 446. Accordingly, the remaining structure and operation is similar to those embodiments described above and therefore will not be repeated for the sake of brevity.

FIGS. 28-40 illustrate various views of a cord end 500 having a body 502 and a cord 504. Body 502 includes a an unlocked arrow 506, a locked arrow 508 and a pointer line 510, with the pointer line 510 rotating with an engagement face 514. Engagement face 514 includes a first end 509 with an insert 511 having a surface 512. Insert 511 may be composed of rubber, silicone, or any other suitable material which may be pliable to help assist with more efficient sealing against electric plug 38 is inserted into receptacle apertures 310 and ground aperture 312.

Engagement face 514 includes a front surface 516 and a rear portion 518 with apertures 520 for receiving dowels 522. A rear end 524 includes recessed regions 526 and projections 528. Engagement face 514 may also include receptacle apertures 310 and ground aperture 312.

A washer 530 includes an inner surface 532, a front surface 534, a rear surface 536, and an outer surface 535. An adjustment ring 538 includes an inner surface 540, an outer surface 541, a front surface 542, and a rear surface 544. Rear surface 544 also includes ramped regions 545 with recessed regions 546. Further, outer surface 541 also includes projections 548.

A ground contact 550 includes a pair of arms 552 with an opening 554 between the arms 552. Electrical contacts 556 are used for hot and line/neutral contacts. Each electrical contact includes a mount 558 having a rear wall 570 and an end portion 559. A static arm 560 extends from rear wall 570 and includes an apertures 566 in end 564 arranged to selectively receive a protrusion 574 on movable arm 562 at end 572. Movable arm 562 extends through a hole 576 and hole 576 is used as leverage when end 568 is forced in a direction opposite the directed movement of protrusions 574. A tab 578 also prevents the movable arm from moving too far through hole 576 and also assist with the leverage necessary to insert protrusion 574 into aperture 566.

A spring 580 is positioned within a cavity 597 in the assembled position. A cam device 582 includes an outer surface 583 with apertures 590 and windows 598 therein and a rear wall 588. A front wall 584 includes a cavity 592 with pins 586 extending forward from the front wall 584. A lower cam 593 includes walls 594 with a recess 596. A top cam wall 595 is also formed in cam device 582. Moving to body 502, a front end 591 includes a recessed edge 589 with recesses 599 therein.

Figure 31:
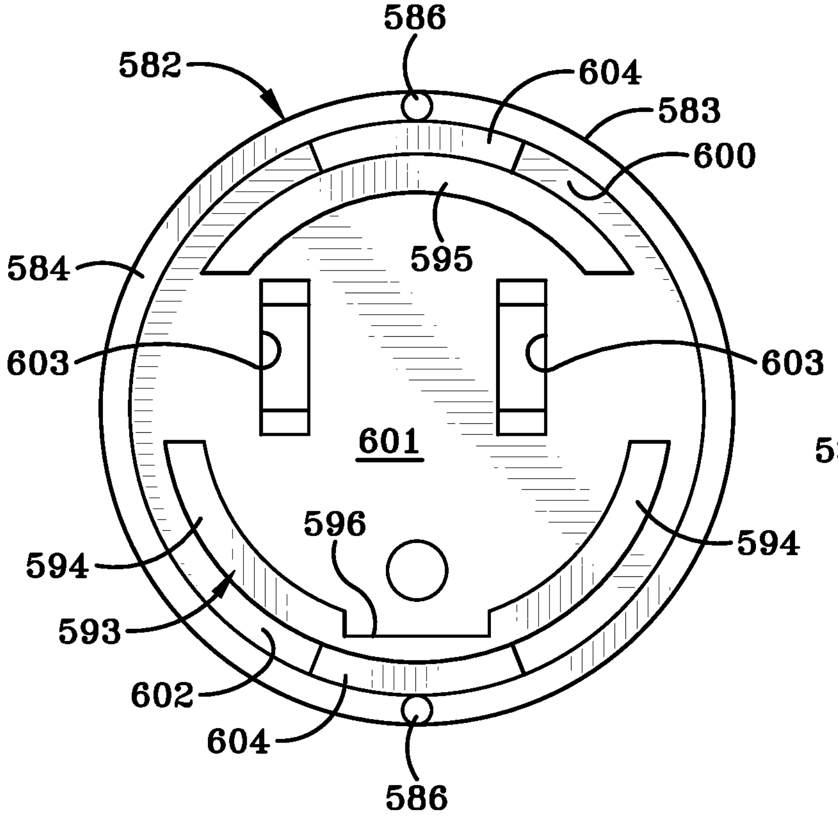
FIG. 31 is a front view of the cam device.
Figure 32:
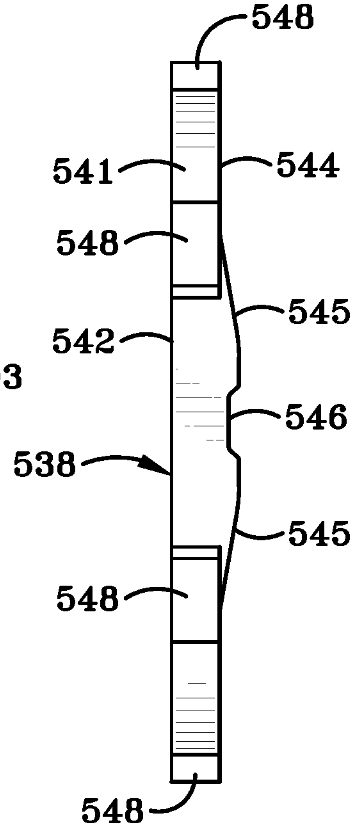
FIG. 32 is a side view of the adjustment mechanism.

FIG. 31 illustrates a front view of cam device 582 with a rear wall 601 having apertures 603 therein for receiving electrical contacts 556. Top cam wall 595 and lower cam wall 593 each extend forward from rear wall 601. A first passage 600 is formed in cavity 592 between front wall 584 and upper cam wall 595. A projection 604 extends forward from rear wall 601 in passage 600. A projection 604 extends forward from rear wall 601 in passage 602. Passage 602 is formed in cavity 592 between lower cam wall 593 and front wall 584. In one implementation, projections 604 interact with and are engaged with recesses 526 in engagement face 514 such that the engagement face and the cam device rotate together due to this engagement between the projections and recesses.

Figure 33:
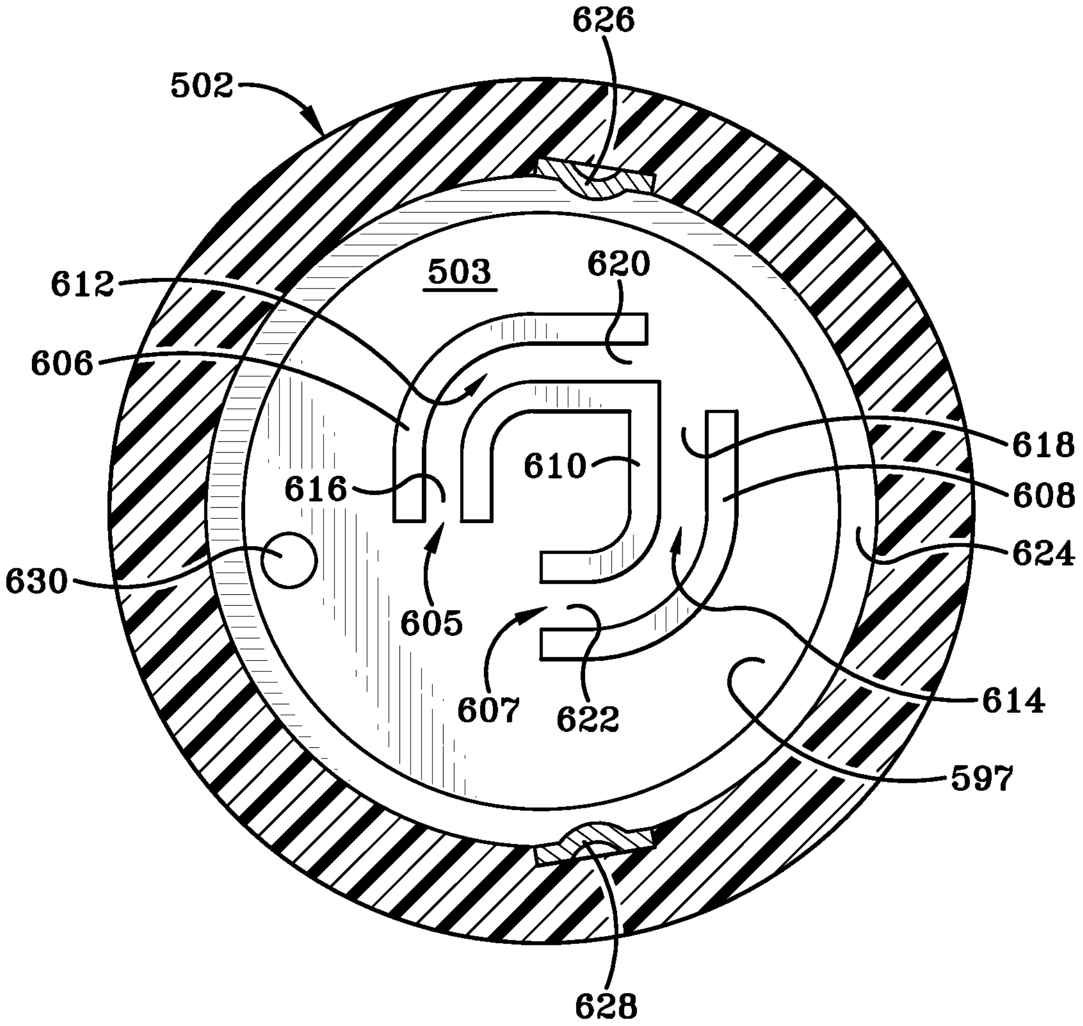
FIG. 33 is sectional view taken generally about line 33-33 in FIG. 29B.

FIG. 33 illustrates body 502 in section with a first track 605 and a second track 607 extending forward from a back wall 503. First track 605 includes an outer wall 606 and a shared inner wall 610 forming a channel 612. Channel 612 may include an unlocked position electrical plug prong receiving position 616 and a locked position electrical plug prong receiving position 620. Second track 607 includes an outer wall 608 and utilizes the shared inner wall 610 to form a channel 614. Channel 614 may include an unlocked position electrical plug prong receiving position 618 and a locked position electrical plug prong receiving position 622. Body 502 also includes a spring channel 624 arranged to receive one end of spring 580, while the other end contacts a rear wall 588 of cam device 582. A hot static contact 626 and a neutral/line static contact 628 are both positioned within cavity 597 and are arranged to connect with mounts 558 of each of the electrical contacts 556 to provide electrical continuity when rotated to the locked position. In this manner, the cord end 500 may be selectively electrically inactive when in the unlocked position and electrically active in the locked position. Still further, a ground cable 630 extending into cavity 597 and connects with ground contact 550.

Figure 34:
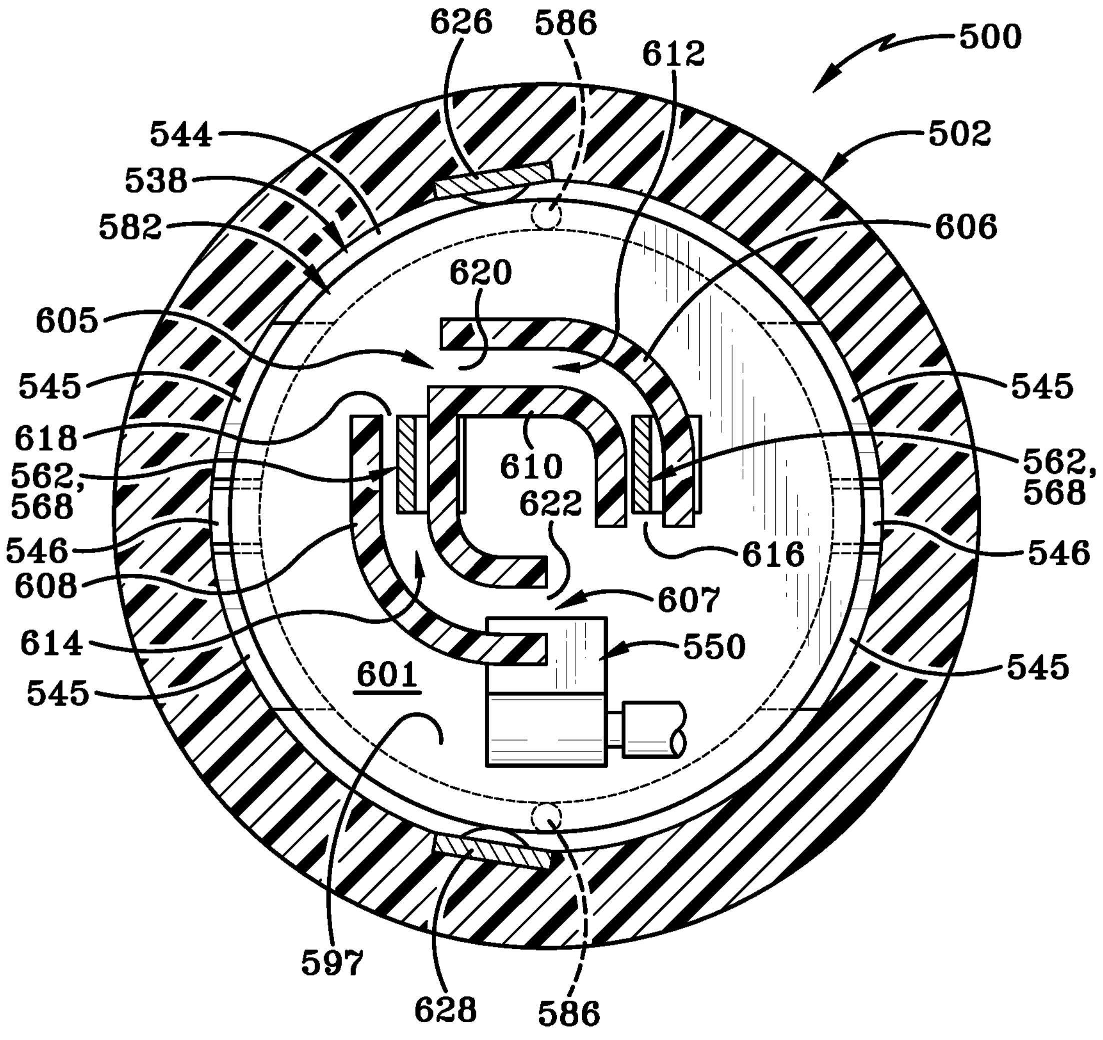
FIG. 34 is a sectional view taken generally about line 34-34 in FIG. 28.

FIG. 34 illustrates the view before the electrical plug blades are inserted into the cord end and positioned within channels 612 and 614 at the unlocked receiving positions 616 and 618.

Figure 35:
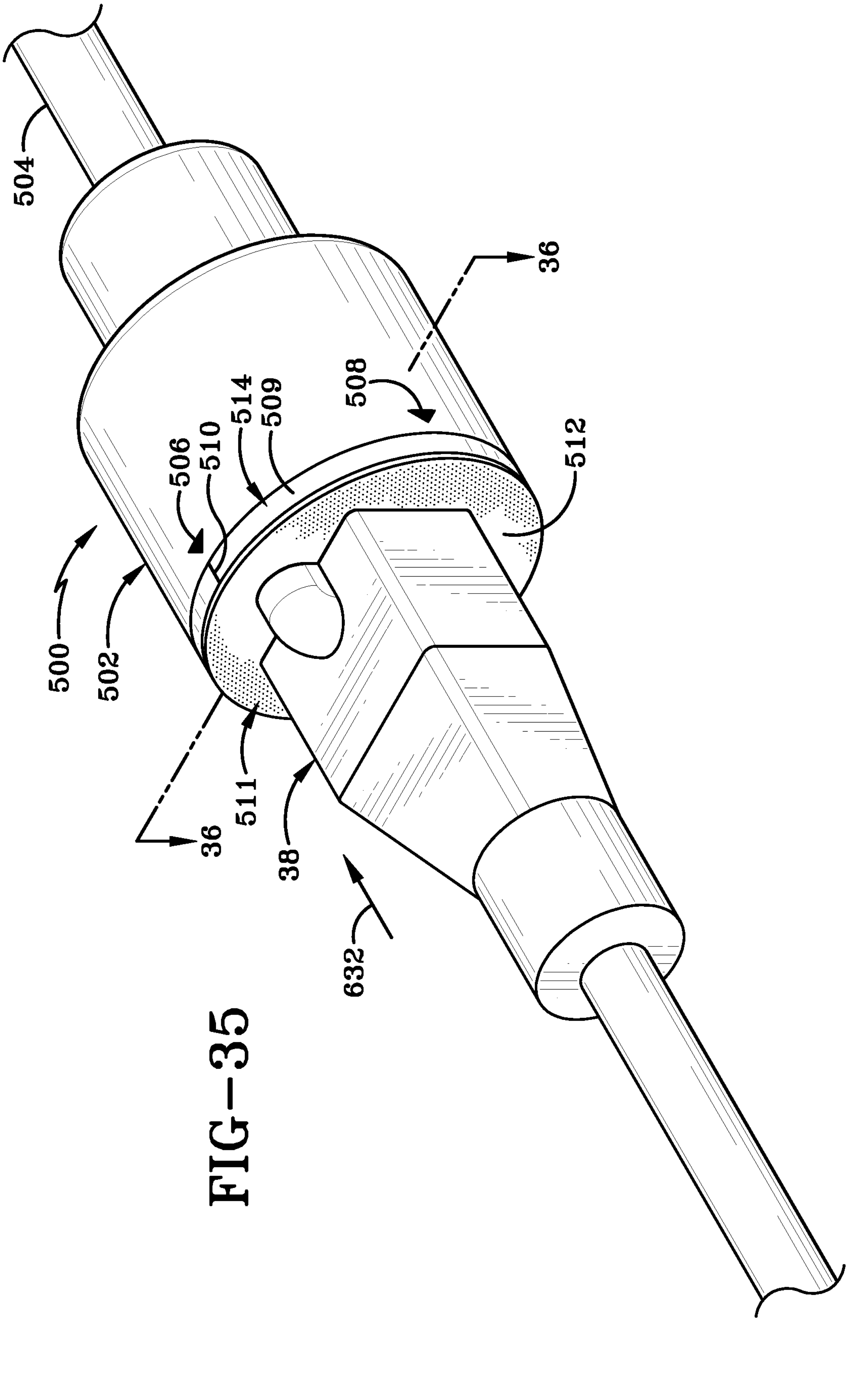
FIG. 35 is a perspective view of the electrical cord with an electrical plug inserted.
Figure 36:
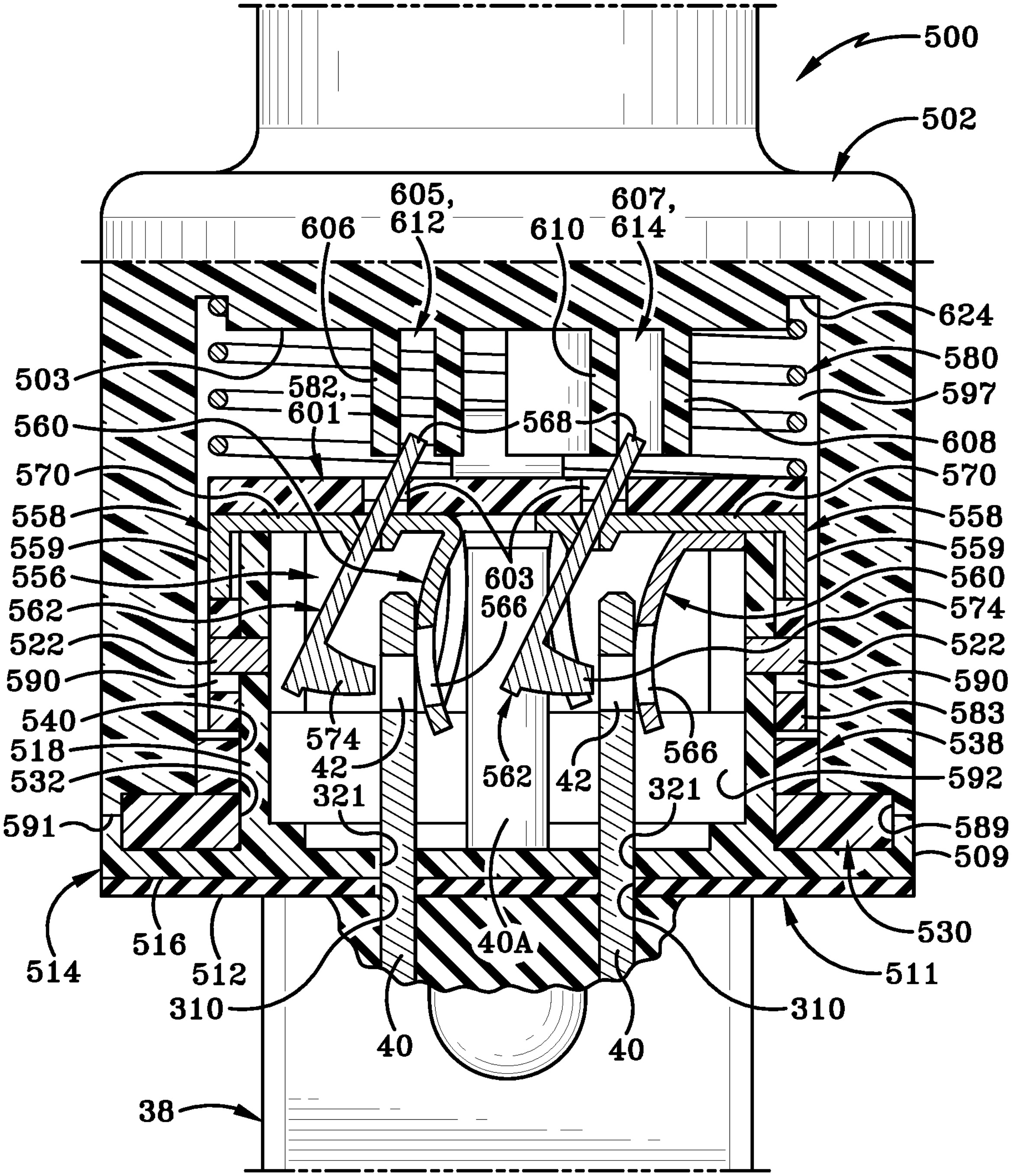
FIG. 36 is a sectional view taken generally about line 36-36 in FIG. 35.

FIGS. 35 and 36 illustrate the electrical plug inserted into the cord end 500 in the direction associated with arrows 632 until the electrical plug is fully seated against insert 511 and plug blades 40 and ground prong 40A are fully within cord end 500. In this orientation, electrical contacts 556 are not in the locked position and plug blades 40 contacts only static arms 560. Further, the cord end 500 may be electrically inactive or electrically active in this position depending on how static contacts 626 and 628 are arranged.

Figure 37:
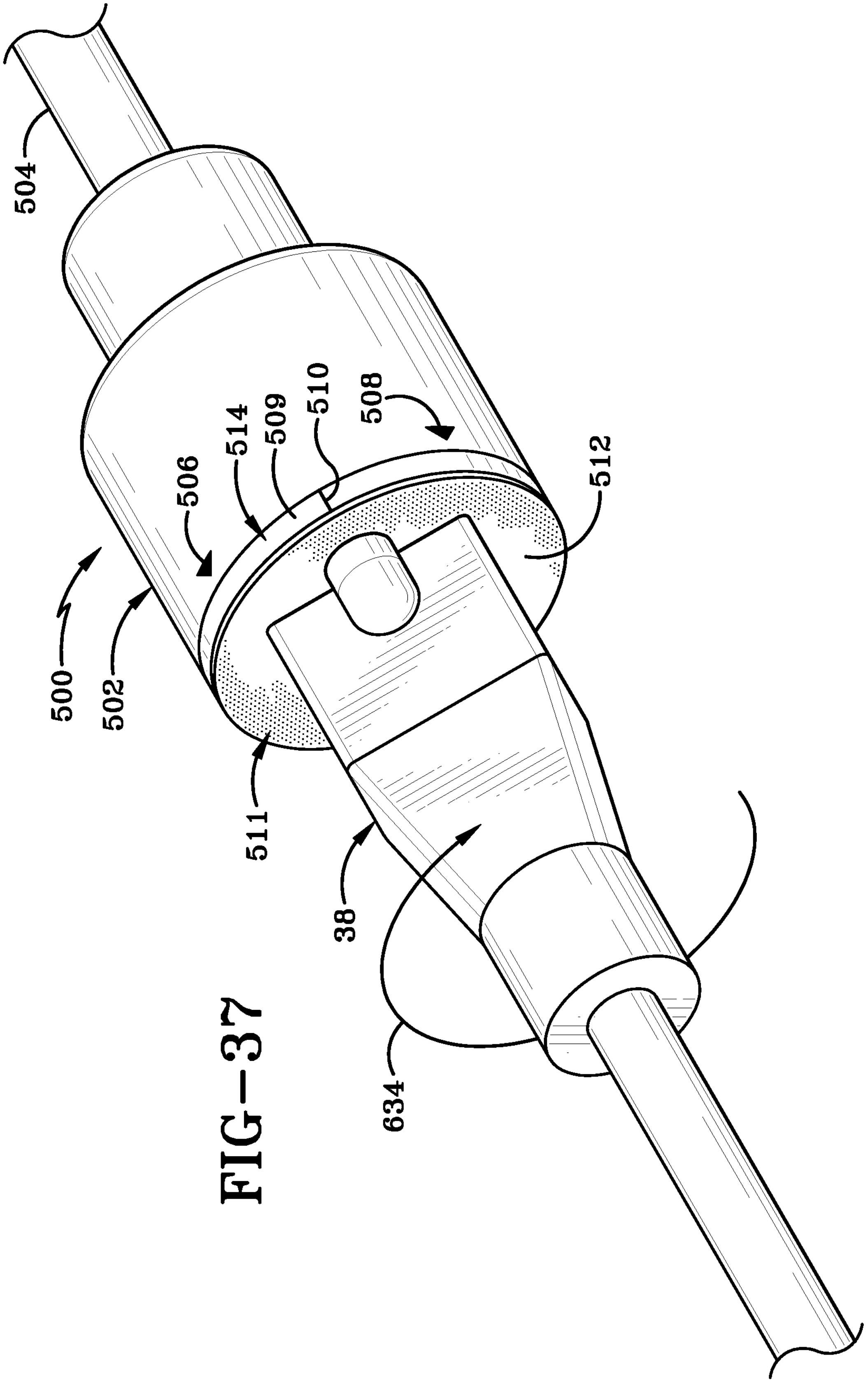
FIG. 37 is a perspective view the electrical plug inserted in the electrical cord and partially rotated to a locked position.

FIG. 37 illustrates the cord end 500 with engagement face 514 rotated in the direction associated with arrow 634 to partially engage the cord end movable arm 562.

Figure 38:
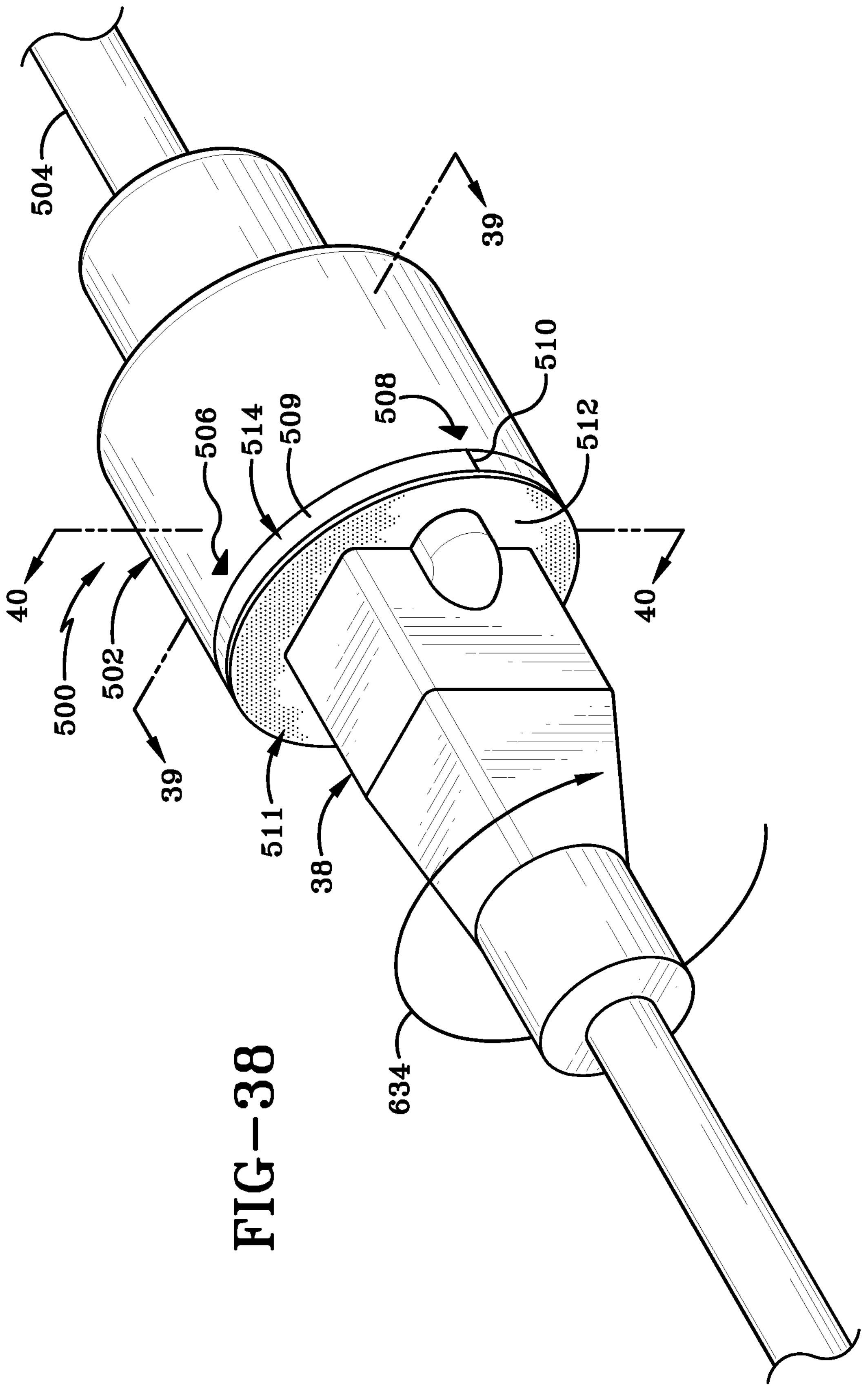
FIG. 38 is a perspective view of the electrical plug inserted in the electrical cord and rotated to a locked position.
Figure 39:
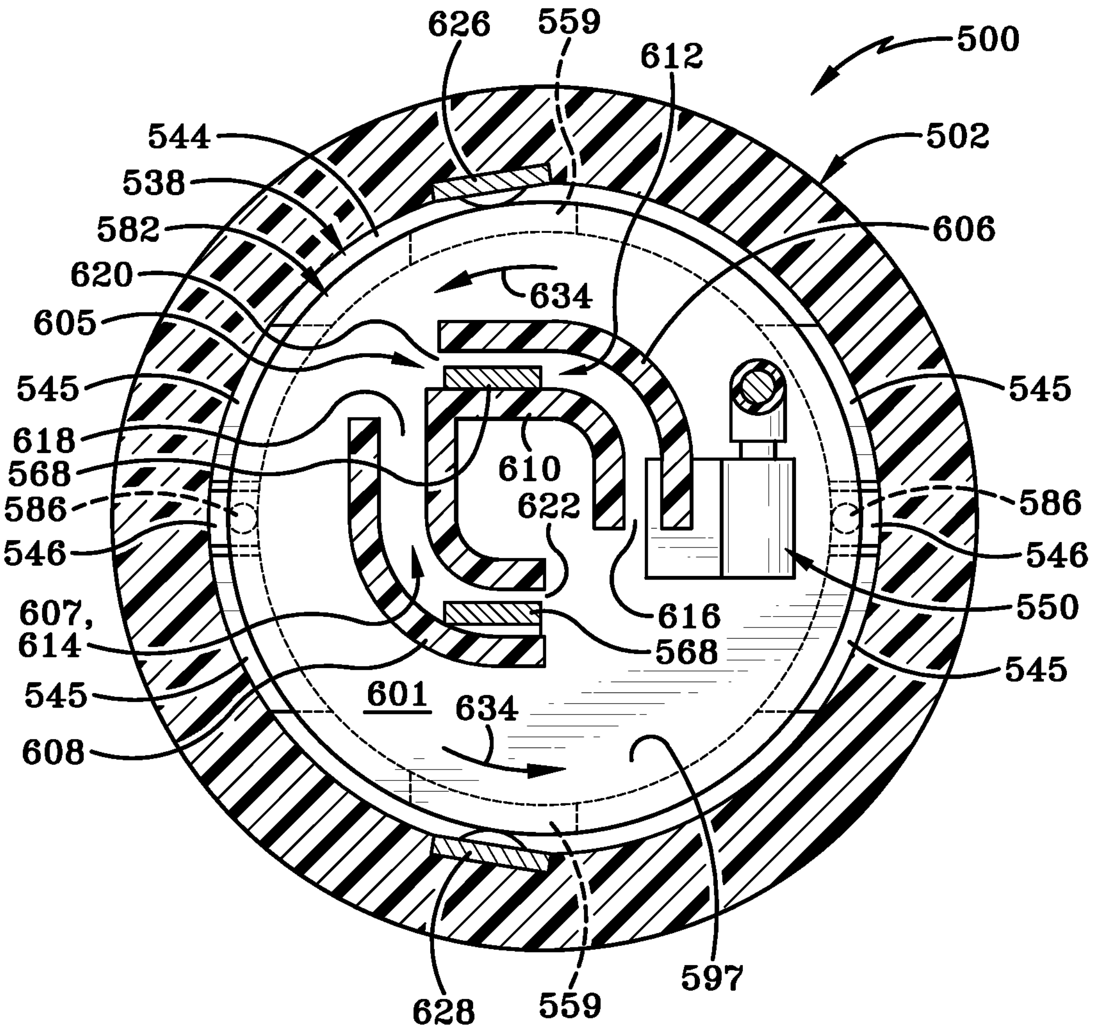
FIG. 39 is a sectional view of the electrical cord taken generally about line 39-39 in FIG. 38.
Figure 40:
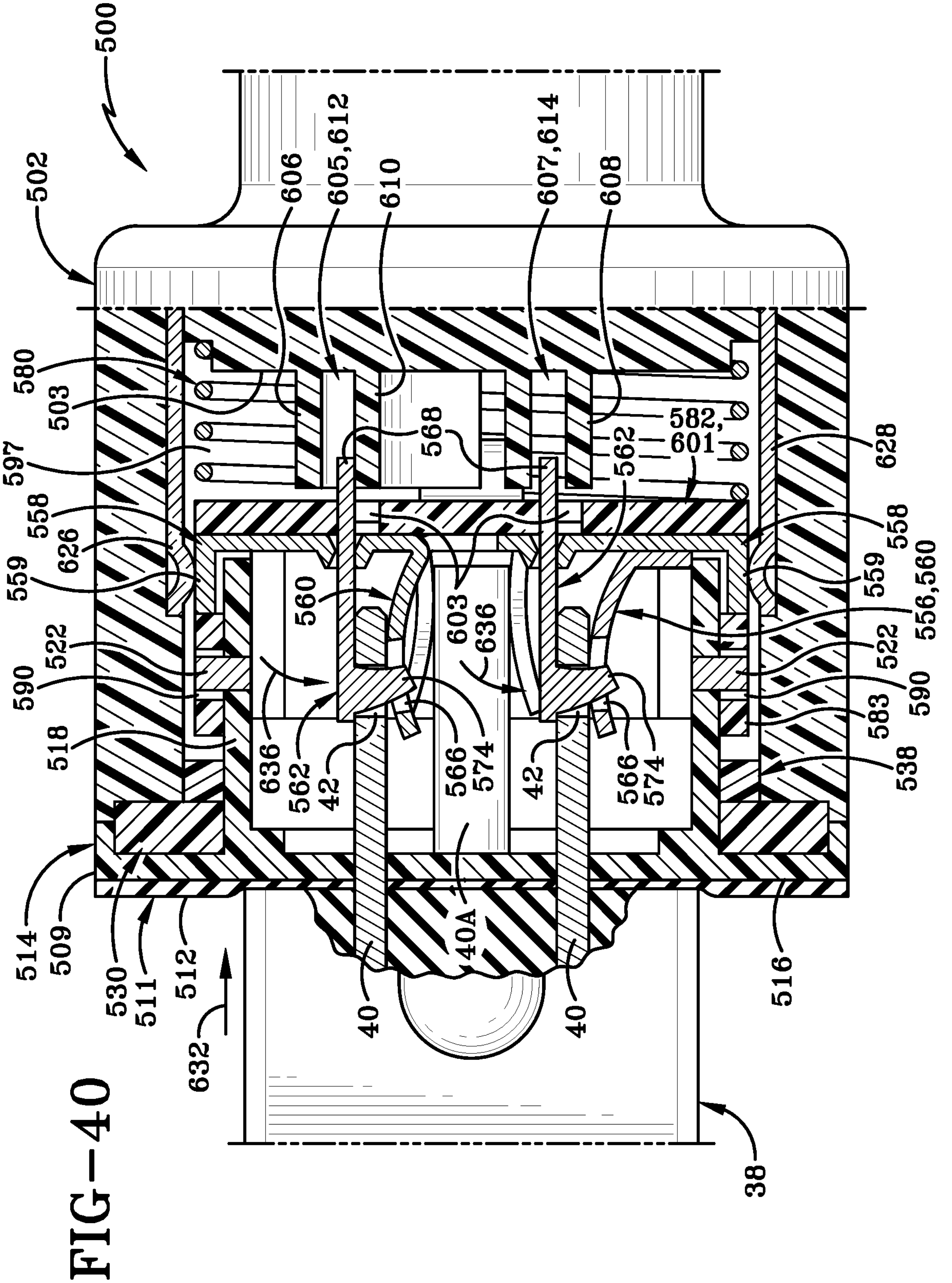
FIG. 40 is a sectional view of the electrical cord taken generally about line 40-40 in FIG. 38.
Figure 41:
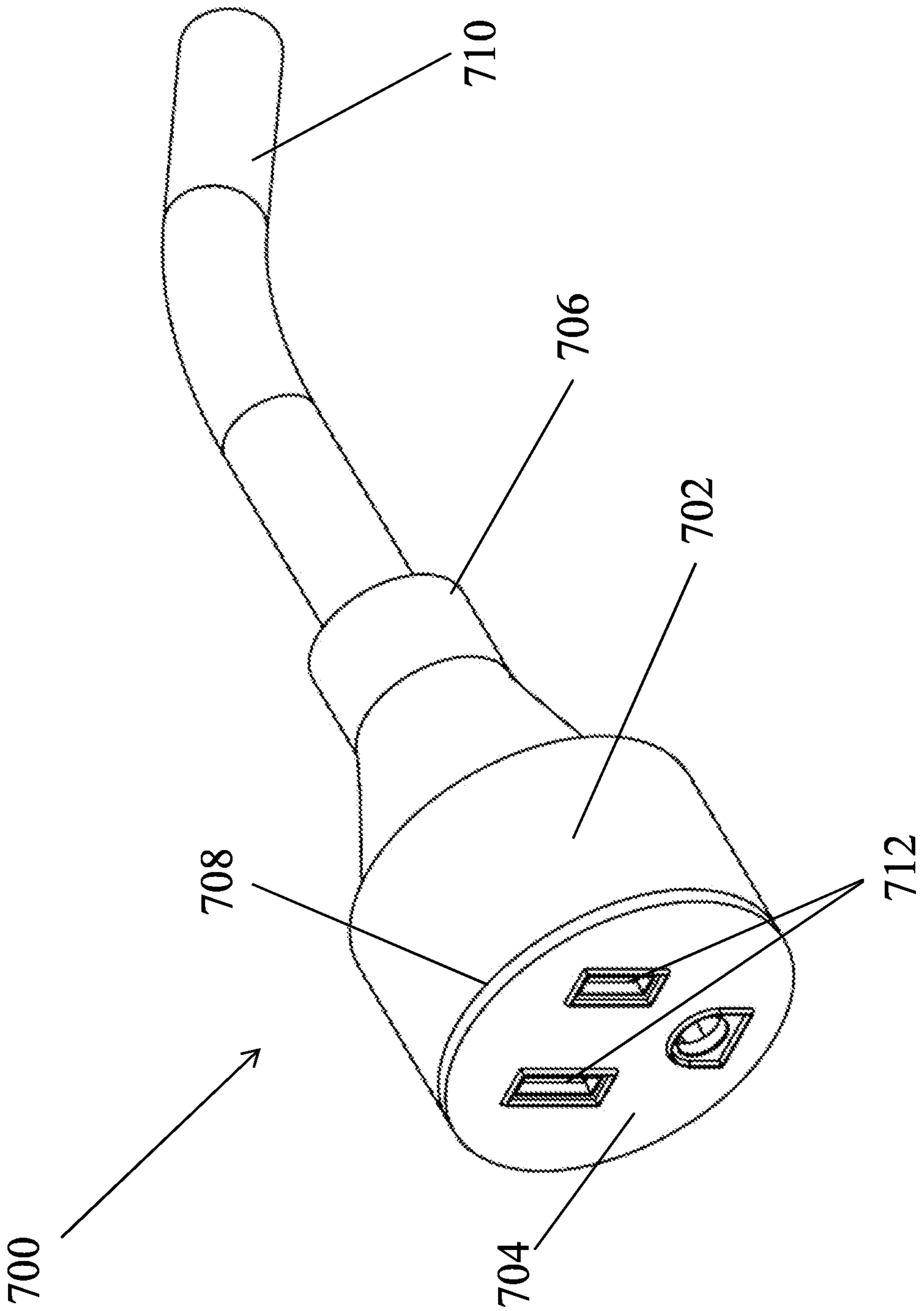
FIG. 41 is a perspective view of an electrical cord with a front plate.
Figure 42:
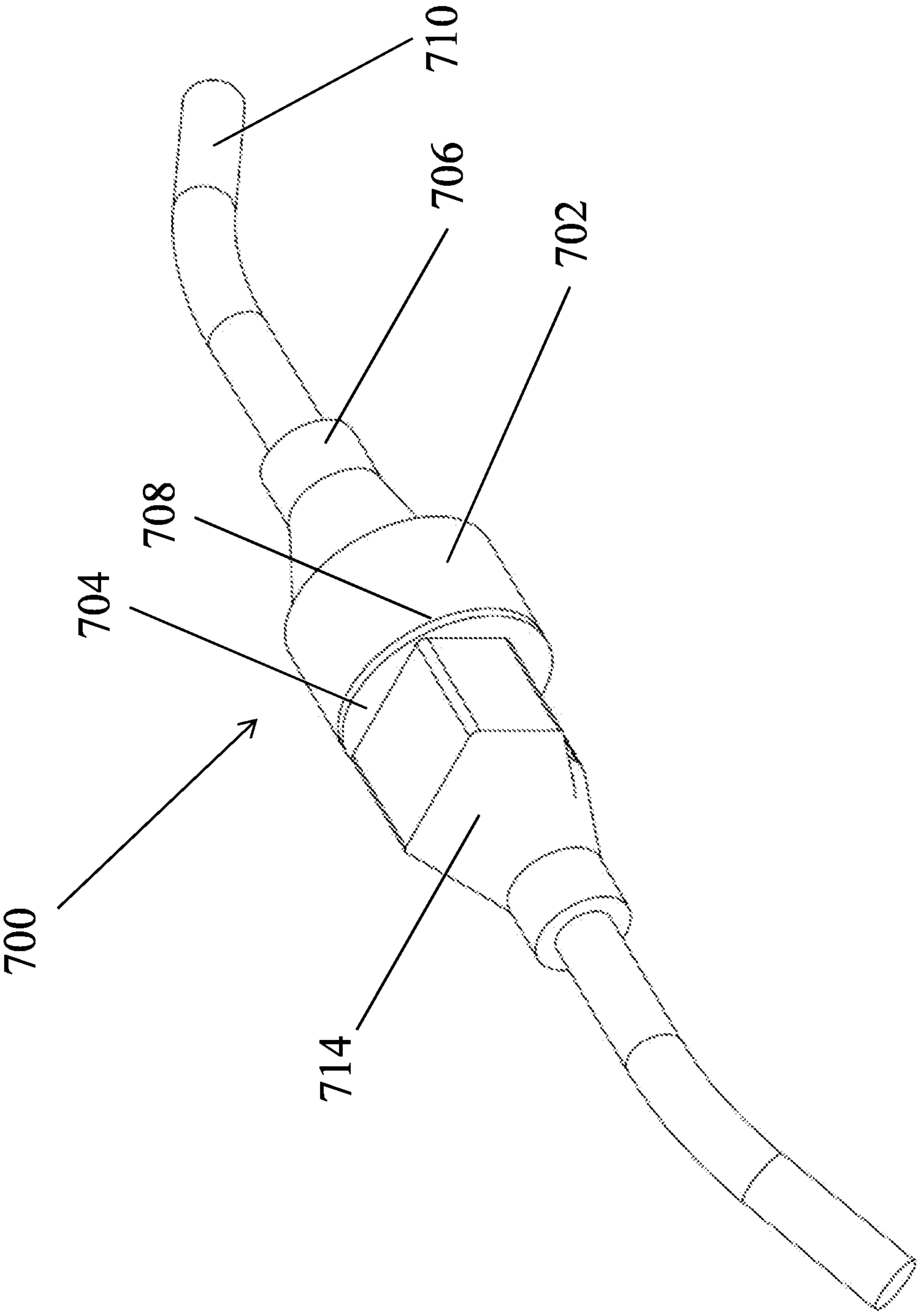
FIG. 42 is a perspective view of the electrical cord from FIG. 41 with a plug inserted.

FIGS. 38-40 illustrate the cord end 500 with engagement face 514 rotated in the direction associated with arrow 634 to fully engage the cord end movable arm 562 through plug blade apertures 42 and static arm aperture 566. Still further, this rotation positions the hot static contact 626 and neutral/line static contact in electrical communication with mounts 558 to convey electrical current through electrical contacts 556 and ultimately to the electrical plug blades 40 and ground prong 40A of the electrical plug therein.

As seen in FIG. 39, during rotation in the direction associated with arrows 634, ends 568 of electrical contact 556 remain within channels 612 and 614 and when the ends 568 reach the locked receiving position shown in FIG. 39, the ends 568 are biased in a direction to force movable arm 562 end 564 in the direction associated with arrows 636, thereby positioning protrusions 574 within apertures 566. This position maintains the electrical plug within cord end 500 because the protrusions 574 extend through apertures 42 in plug blades 40. Alternatively, if a given retention force must permit removal, the protrusions can extend only partially into apertures 42 to limit the retention force necessary to remove the electrical plug. As can be seen, the angle orientation of channels 612 and 614 ensures that proper movement of ends 568 are achieved in a small and compact structure.

In order to remove the electrical plug easily and electrically de-active cord end 500, the user simply rotates the engagement face 514 in a direction opposite arrows 634 until the protrusions are withdrawn from apertures 42 and apertures 566. This movement may also electrically deactivate the cord end at electrical contacts 556 because electrical contacts 556 may no longer be in electrical communication with static contacts 626 and 628.

Referring back to FIG. 36, the interaction of some components can be seen more clearly. Specifically, washer 530 is positioned between engagement face 514 and recessed edge 589. While not specifically shown within recesses 599, adjustment ring 538 is positioned with projections 548 within recesses 599. In order to ensure a consistent rotation, engagement face 514, insert 511, electrical contacts 556, and cam device 582 are connected together with dowels 522 at apertures 520 and apertures 590, while electrical contacts 556 extend out of windows 598. An additional operation feature is the increased tension provided by the adjustment ring 538 ramped portions 545 which, during rotation to the locked position, force cam device 582 into spring 580 to thereby move the entire electrical contacts 556 in the direction associated with arrows 632. This allows compression of the insert 511 as shown in FIG. 40 due to the protrusions pulling the plug blades 40 at apertures 42 in the direction associated with arrows 632 during rotation to the locked position. Still further, washer 530 may be glued, sonically welded, or attached to the cord end in any suitable manner to prevent removal of the components during normal operation. Still further, other suitable means of securing the components may include pins or projections which limit or prevent removal of components but still allow appropriate rotation. Again, any suitable components may also be glued, welded, or otherwise attached to the cord end or each other to ensure the components are not removed during operation without departing from the spirit and scope of the present disclosure.

In the locked position, the removal force may be higher. The removal force in the locked position may be between 32 and 38 pounds of removal force or between 25 and 50 pounds of removal force in another implementation. As can be seen, any suitable holding force may be utilized in the locked position between 25 to 50 plus pounds of force as the electrical code, UL, and various requirements may specify. In another implementation, the locking force may be less than 20 or 15 pounds. Accordingly, any suitable unlocked and locked force may be utilized to secure the electrical cord within the receptacle. While the above description relates to a three prong electrical plug, a similar analysis may be accomplished for a two prong electrical plug whereby the two prong electrical plug may have higher or lower removal force in the locked or unlocked positions selectively between 0 and 50 plus pounds.

In another aspect, the electrical receptacle or cord end may include an electrical current control or cutoff circuit. In this instance, the electrical contact mechanisms may be electrically isolated from the electrical connection screws and other line voltage until the electrical receptacle is moved to the active, engaged, or locked position. Any of the electrical devices or electrical cords may include a control which applies a small amount of voltage to test for the presence of plug blades while a water probe is used to detect the presence of water. If the controller detects a short circuit or if the water probe detects the presence of water, electrical current is denied or shut off, even after previously flowing, to the electrical contacts. In another implementation, an indicator light may be utilized to provide user feedback on the operational status of the electrical cord or device.

In another implementation, spring biased or automatically closing shutter doors may be positioned directly behind or within receptacle openings 30, 30A, 310, and 312 with rubber gaskets or other suitable water resistant feature to prevent water from entering. The electrical receptacle or electrical cord may also include switches which prevent electrical current from flowing to the electrical contacts unless all relevant receptacle openings are in the open position. In another implementation, self-sealing rubber grommets or door covers are utilized which permit the electrical plug blades and ground prong to pass through but seal around the blades and prong once inserted and further refill the same electrical receptacle and cord receptacle openings once an electrical plug is removed. The electrical circuitry may also fail to energize the electrical receptacle or electrical cord when an electrical plug is only partially inserted to prevent electrocution.

In another aspect, a person of skill in the art will immediately appreciate that any of the electrical receptacles or cord ends may include multiple devices on a single unit. For example, two rotating and/or locking faces may move together or independently of each other.

While these and other embodiments illustrate the use of a side-wired receptacle, a person of skill in the art will immediately appreciate that a back wired, side wired, hard wired, or any other suitable connection method to the structural wiring system may be utilized without departing from the spirit and scope of the present disclosure.

In another implementation, illustrated in FIGS. 41 through 44C, an electrical receptacle 700 has a body 702 with a front plate 708 with a thickness 703 and a front surface 704, a rear end 706 opposite the front surface 704, and at least two separate and distinct prong receptacles 712 extending through the thickness 703 of the front plate 708. The front plate 708 and the rest of the body 702 may be one unitary piece. The body 702 may be located on an electrical cord 710 which extends away from the rear end 706. The electrical cord 710 may have an end configured to electrically couple with an electrical device (not shown). Alternatively, the body 702 may be a wall electrical device. The body 702 may be cylindrical. The front surface 704 has at least two prong receptacles 712 that are configured to receive an electrical plug 714 that has at least two electrical prongs 716.

Figure 43A:
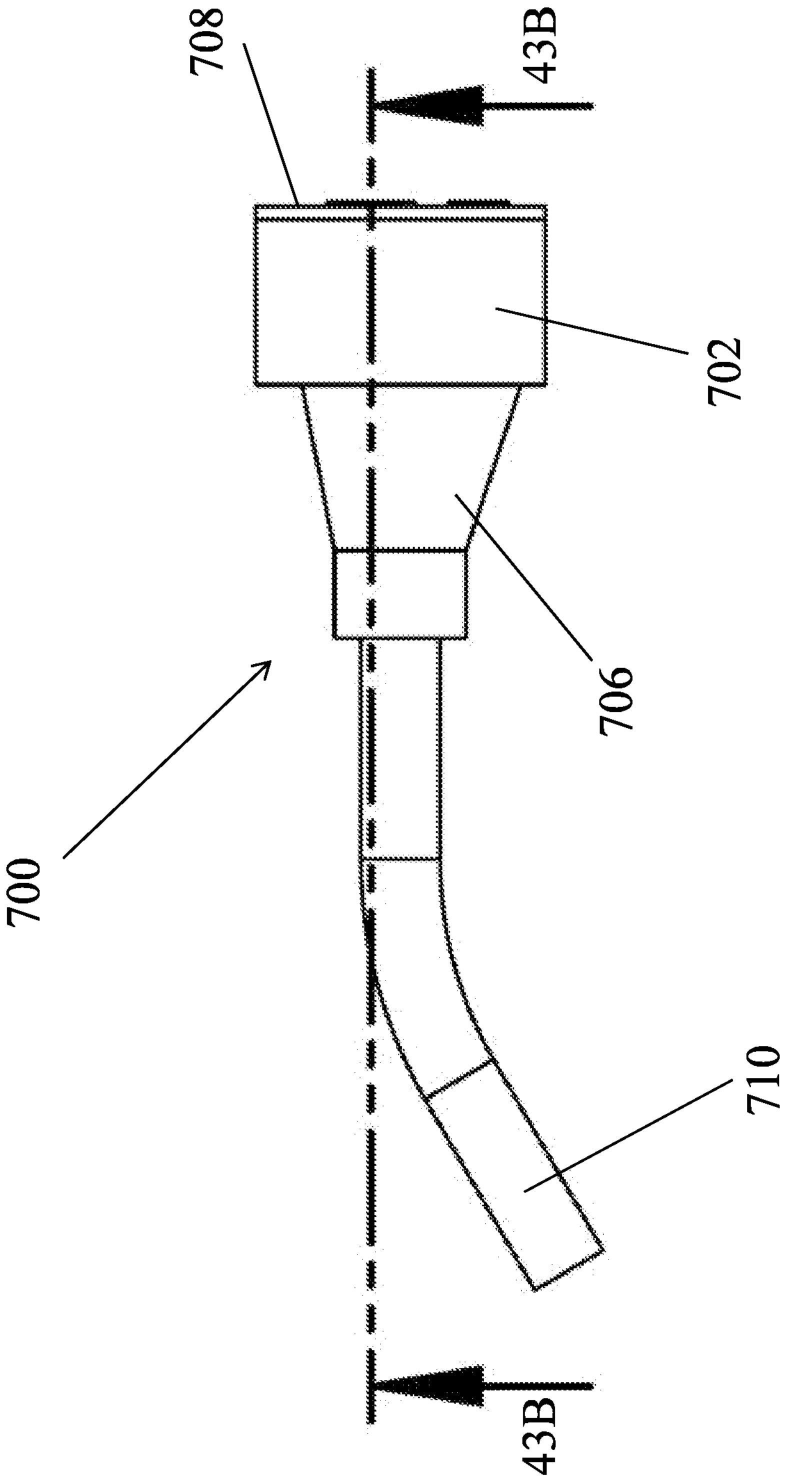
FIG. 43A is a side view of the electrical cord from FIG. 41.
Figure 43B:
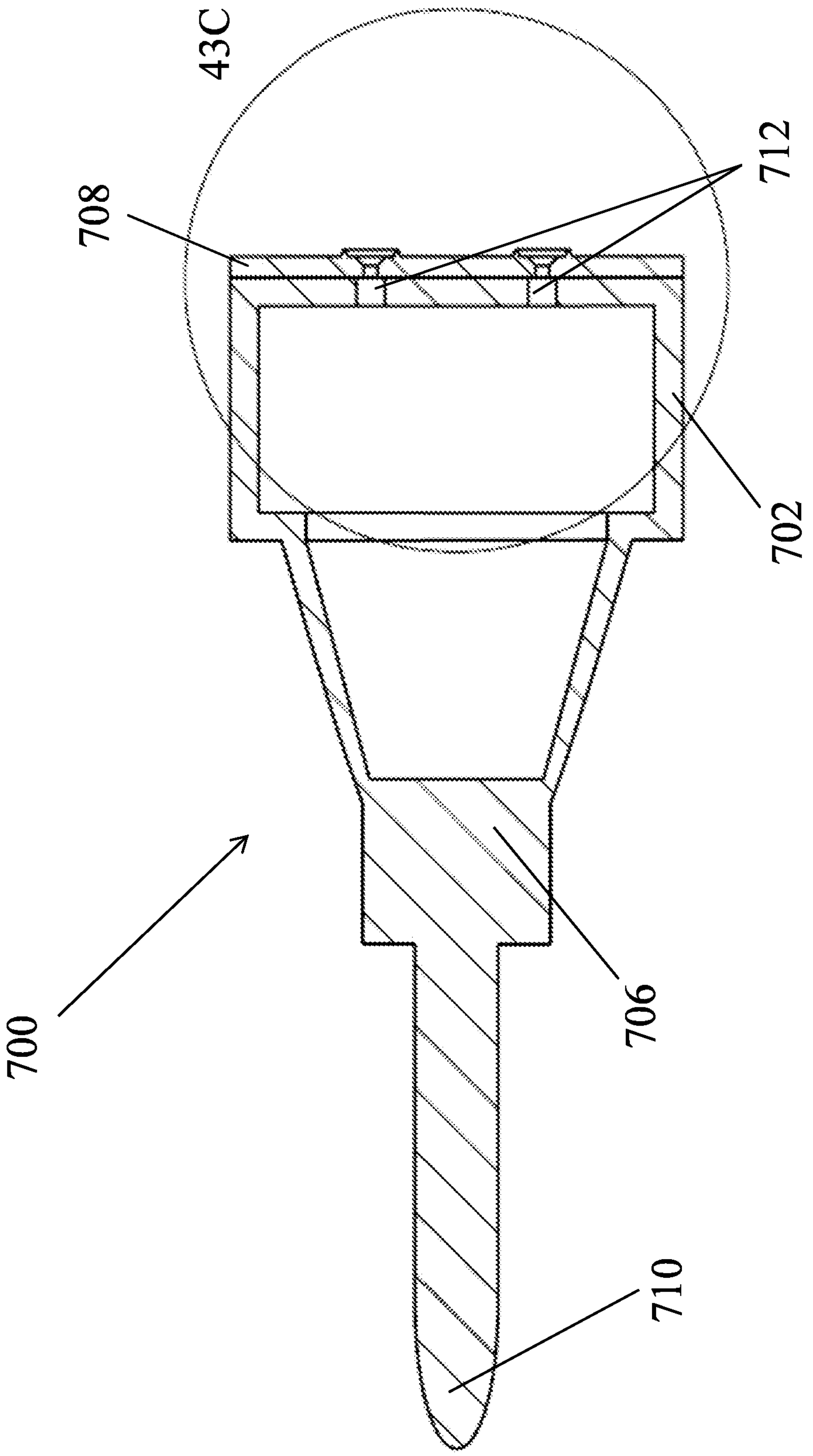
FIG. 43B is a section view taken along line 43B-43B in FIG. 43A.
Figure 43C:
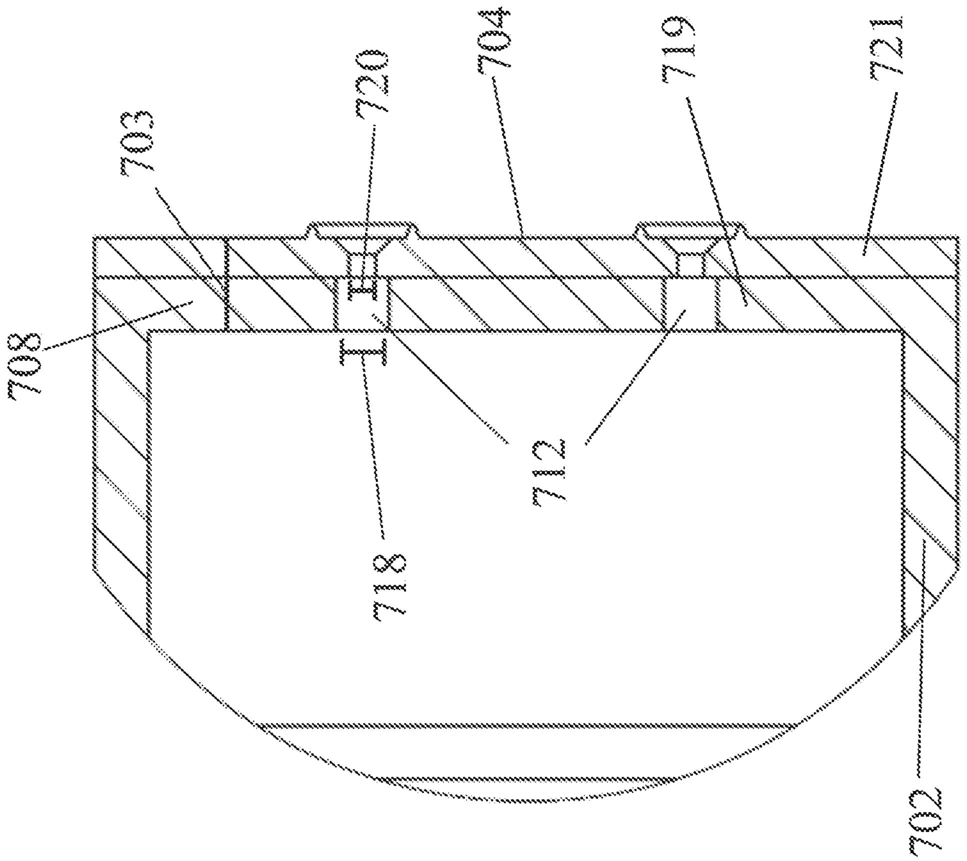
FIG. 43C is a close-up view of the electrical cord contained within circle 43C in FIG. 43B, showing the plug receptacles when there is no plug inserted.

FIGS. 43A-43C illustrate the electrical receptacle 700 when there is no electrical plug 714 inserted. The at least two prong receptacles 712 have a first width 718 within the thickness 703 of the front plate 708. The first width 718 is sized and shaped to receive the at least two electrical prongs 716 of the electrical plug 714. The at least two prong receptacles 712 also have a second width 720 within the thickness 703 of the front plate 708. The second width 720 is smaller than the first width 718 and is closer to the front surface 704 than the first width 718. Because the second width 720 is smaller than the first width 718, the portion of the thickness 703 that has the second width 720 fits tighter around the at least two electrical prongs 716 than does the portion of the thickness 703 that has the first width 718. This tighter fit helps to prevent contaminants such as dirt and water from entering the at least two prong receptacles 712. The electrical receptacle 700 with the front plate 708 may be implemented on any of the preceding embodiments of the locking electrical device disclosed herein. For example, the front plate 708 could be used on any of the embodiments shown in FIGS. 11-15.

In addition, the tighter fit increases the removal force required to remove the electrical plug 714 from the at least two prong receptacles 712. In different implementations, the removal force may be between 15 and 50 pounds, between 15 and 30 pounds, between 30 and 40 pounds, between 40 and 50 pounds, between 15 and 20 pounds, between 20 and 30 pounds, less than 50 pounds, or less than 15 pounds. The removal force is adjusted by increasing or decreasing the second width 720. An implementation of the electrical receptacle 700 may have a smaller second width 720, which would create a greater removal force for that implementation, while a different implementation may have a larger second width 720, and therefore a smaller removal force. The removal force is also influenced by the material chosen for the front plate 708.

Figure 44A:
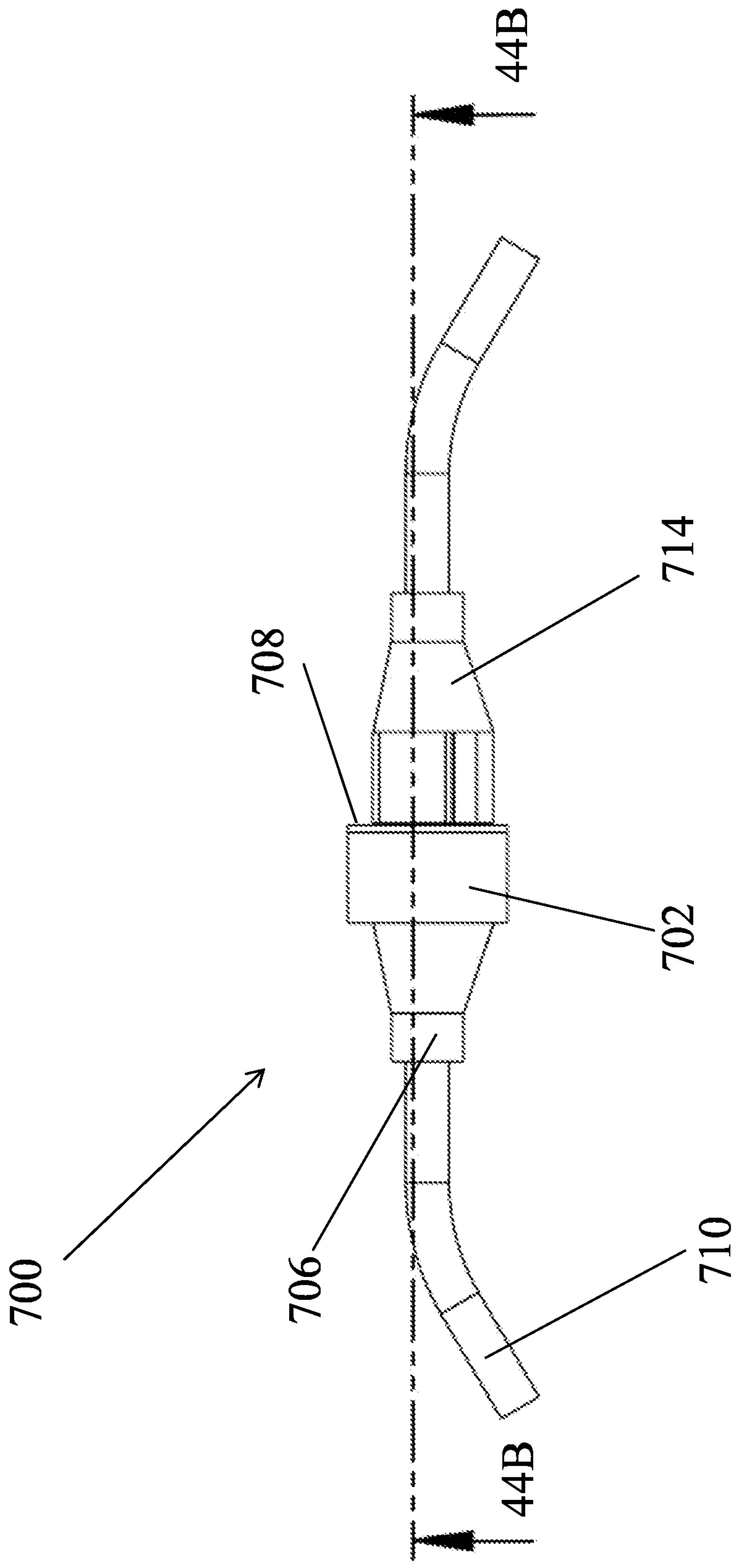
FIG. 44A is a side view of the electrical cord from FIG. 41 with a plug inserted.
Figure 44B:
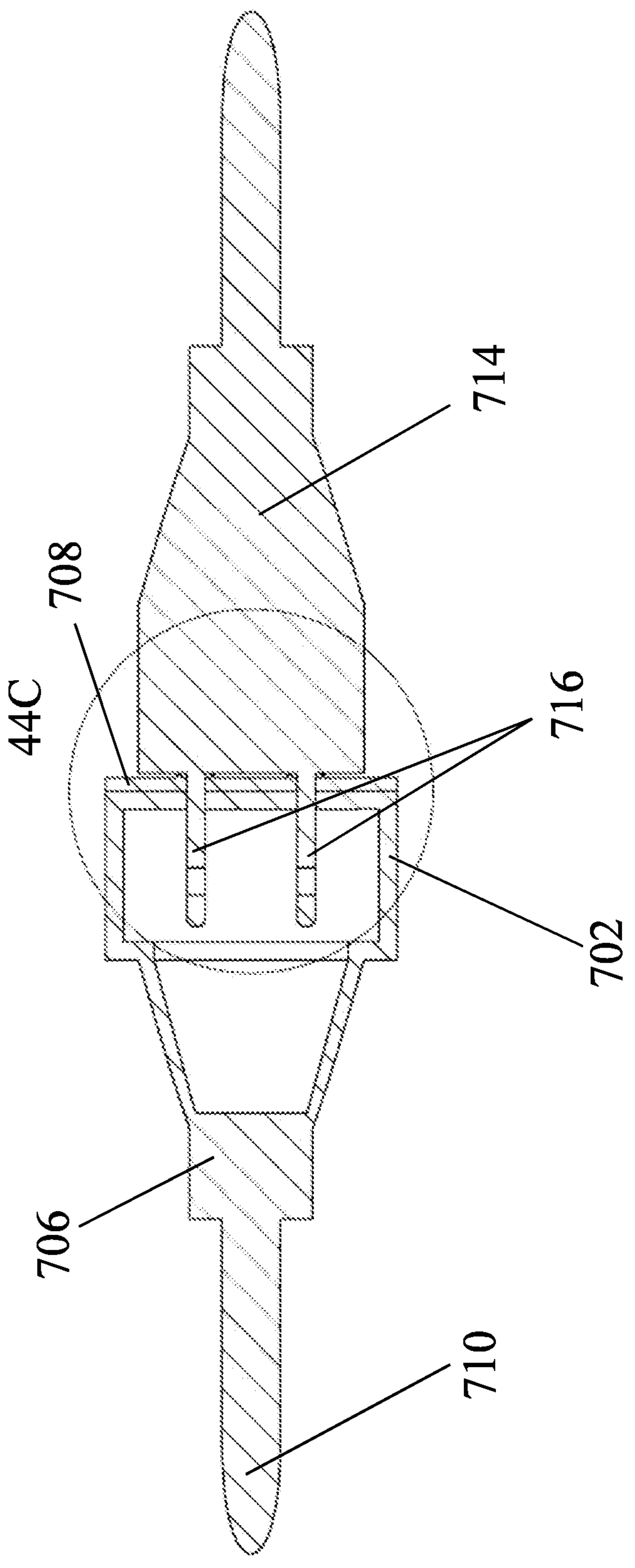
FIG. 44B is a section view taken along line 44B-44B in FIG. 44A.
Figure 44C:
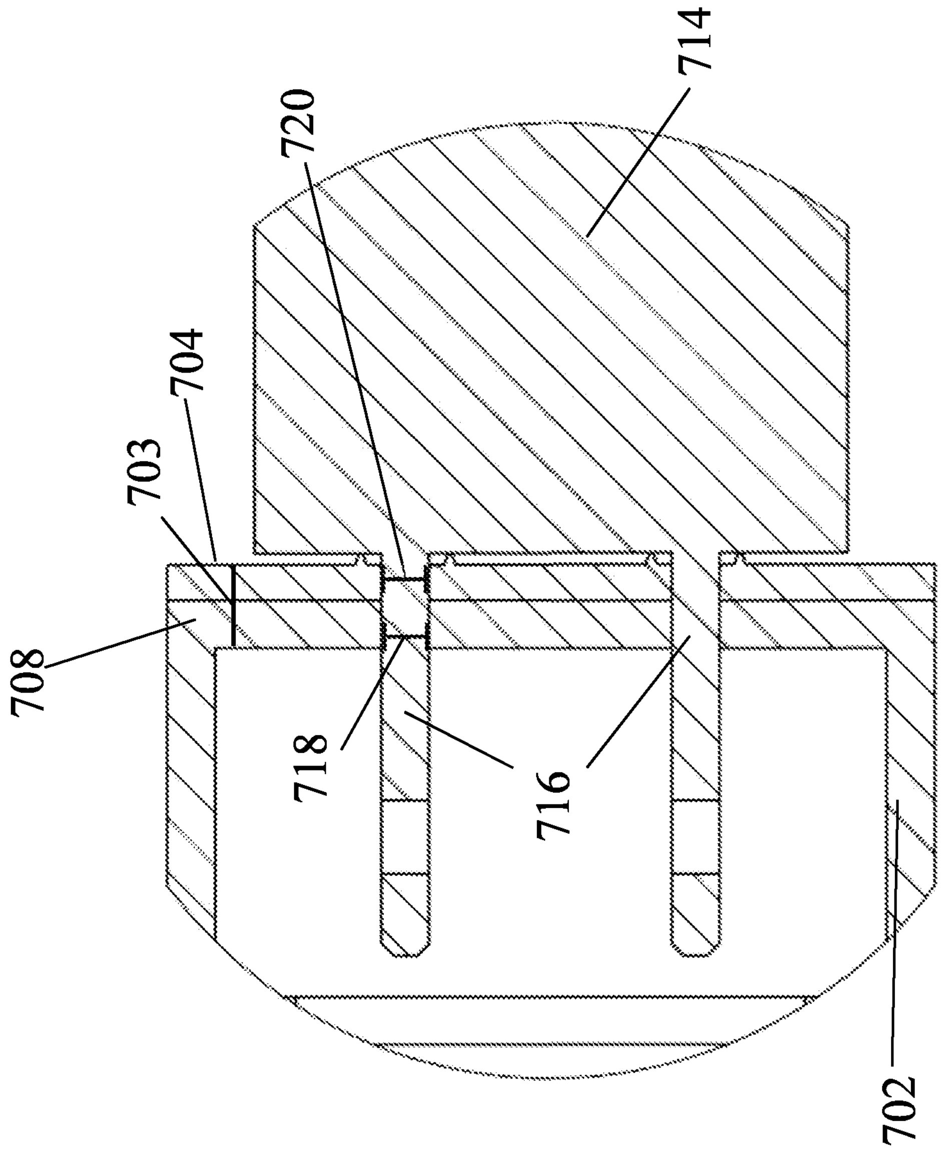
FIG. 44C is a close-up view of the electrical cord contained within circle 44C in FIG. 44B, showing the plug receptacles when there is a plug inserted.

FIGS. 44A-44C illustrate the electrical receptacle 700 when there is an electrical plug 714 inserted. As shown in FIG. 44C, in some implementations the portion of the thickness 703 with the second width 720 stretches to accommodate the at least two electrical prongs 716, leading the second width 720 to approach the first width 718 while the electrical plug 714 is inserted.

It will be understood that implementations are not limited to the specific components disclosed herein, as virtually any components consistent with the intended operation of a method and/or system implementation for an electrical receptacle or cord end may be utilized. Components may comprise any shape, size, style, type, model, version, class, grade, measurement, concentration, material, weight, quantity, and/or the like consistent with the intended operation of a method and/or system implementation for an electrical receptacle or cord end.

The concepts disclosed herein are not limited to the specific implementations shown herein. For example, it is specifically contemplated that the components included in a particular implementation of an electrical receptacle or cord end may be formed of any of many different types of materials or combinations that can readily be formed into shaped objects and that are consistent with the intended operation of an electrical receptacle or cord end. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical receptacle or cord end may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical receptacle or cord end, it should be readily apparent that a number of modifications may be made without departing from the spirit thereof and that these implementations may be applied to other electrical receptacles and cord ends. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. An electrical receptacle comprising:

an inner front plate having at least two prong receptacles with a first width; and an outer front plate having at least two prong receptacles, at least one of the at least two prong receptacles of the outer front plate having a second width, wherein the at least two prong receptacles of the inner front plate are aligned with the at least two prong receptacles of the outer front plate;

wherein the electrical receptacle is configured to receive an electrical plug having two flat plug prongs, wherein the second width is less than a width of one of the two flat plug prongs, and wherein, when the electrical plug is inserted into the electrical receptacle, the second width of the at least one of the at least two prong receptacles is configured to increase to accommodate the flat plug prong.

2. The electrical receptacle of claim 1, wherein the second width is smaller than the first width when the electrical plug is removed from the electrical receptacle.

3. The electrical receptacle of claim 1, wherein the electrical receptacle is positioned on an extension cord.

4. The electrical receptacle of claim 1, wherein the electrical receptacle is positioned on an electrical wall outlet.

5. The electrical receptacle of claim 1, wherein the front plate and the electrical receptacle body are a unitary piece.

6. The electrical receptacle of claim 1, wherein the first layer and the second layer are formed of separate and distinct plates.

7. An electrical receptacle comprising:

an electrical receptacle body having a front plate with a thickness, the front plate having at least two separate and distinct prong receptacles extending through the thickness of the front plate;

wherein the electrical receptacle is configured to receive an electrical plug having two flat plug prongs, wherein a width of at least one of the at least two prong receptacles is less than a width of one of the two flat plug prongs, and wherein, when the electrical plug is inserted into the electrical receptacle, the width of the at least one of the at least two prong receptacles is configured to increase to accommodate the flat plug prong.

8. The electrical receptacle of claim 7, wherein the thickness of the front plate is divided into a first layer and a second layer, wherein the prong receptacles extend through the first layer of the front plate with a first width and through the second layer of the front plate with a second width, and wherein the second width is smaller than the first width.

9. The electrical receptacle of claim 8, wherein the first layer and the second layer are formed of separate and distinct plates.

10. The electrical receptacle of claim 7, wherein the electrical receptacle is positioned on an extension cord.

11. The electrical receptacle of claim 7, wherein the electrical receptacle is positioned on an electrical wall outlet.

12. The electrical receptacle of claim 7, wherein the front plate and the electrical receptacle body are a unitary piece.

13. An electrical receptacle comprising: a front plate with a thickness, the front plate having at least two prong receptacles extending through the thickness of the front plate, wherein the electrical receptacle is configured to receive an electrical plug having at least two plug prongs and wherein, when the electrical plug is inserted into the electrical receptacle, a width of at least one of the at least two prong receptacles is configured to increase to accommodate the plug prong" has been changed to—An electrical receptacle comprising: a front plate with a thickness including a first layer and a second layer, the front plate having at least two prong receptacles, at least one of the at least two prong receptacles having a first width at the first layer and a second width at the second layer, the second width being smaller than the first width and the at least two prong receptacles extending through the thickness of the front plate, wherein the electrical receptacle is configured to receive an electrical plug having at least two plug prongs and wherein, when the electrical plug is inserted into the electrical receptacle, a width of at least one of the at least two prong receptacles is configured to stretch outward increase to accommodate the plug prong.

14. The electrical receptacle of claim 13, wherein the width of at least one of the at least two prong receptacles is less than a width of one of the two plug prongs.

15. The electrical receptacle of claim 13, wherein the first layer and the second layer are formed of separate and distinct plates.

16. The electrical receptacle of claim 13, the front plate having a front surface, wherein the second layer is closer to the front surface than the first layer.

17. The electrical receptacle of claim 13, wherein the electrical receptacle is positioned on an extension cord.

18. The electrical receptacle of claim 13, wherein the electrical receptacle is positioned on an electrical wall outlet.

19. The electrical receptacle of claim 13, wherein the front plate and the electrical receptacle body are a unitary piece.

* * * * *